US010165301B2

(12) United States Patent
Fukushima et al.

(10) Patent No.: US 10,165,301 B2
(45) Date of Patent: *Dec. 25, 2018

(54) MOVING PICTURE CODING DEVICE, MOVING PICTURE CODING METHOD, AND MOVING PICTURE CODING PROGRAM, AND MOVING PICTURE DECODING DEVICE, MOVING PICTURE DECODING METHOD, AND MOVING PICTURE DECODING PROGRAM

(71) Applicant: JVC KENWOOD Corporation, Yokohama-shi (JP)

(72) Inventors: Shigeru Fukushima, Yokosuka (JP); Hiroya Nakamura, Yokosuka (JP); Hideki Takehara, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,664

(22) Filed: Aug. 2, 2018

(65) Prior Publication Data
US 2018/0343466 A1    Nov. 29, 2018

Related U.S. Application Data

(63) Continuation of application No. 15/983,189, filed on May 18, 2018, now Pat. No. 10,080,031, which is a
(Continued)

(30) Foreign Application Priority Data

Dec. 28, 2011  (JP) .................................. 2011-289285
Dec. 28, 2011  (JP) .................................. 2011-289286

(51) Int. Cl.
*H04N 7/12*    (2006.01)
*H04N 19/52*   (2014.01)
(Continued)

(52) U.S. Cl.
CPC ........... *H04N 19/52* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

| 2009/0177952 A1 | 7/2009 | Yokosato et al. |
| 2011/0176615 A1* | 7/2011 | Lee ........................ H04N 19/52 375/240.16 |

(Continued)

FOREIGN PATENT DOCUMENTS

| JP | 2011147172 A | 7/2011 |
| JP | 2014509480 A | 4/2014 |
| WO | 2012102927 A1 | 8/2012 |

OTHER PUBLICATIONS

Chen et al. (Document: JCTVC-F402, "MVP index parsing with fixed number of candidates", Joint Collaborative Team on Video Coding (JCT-VC) of ITU-T SG16 WP3 and ISO/IEC JTC1/SC29/WG11, 6th Meeting: Torino, IT, Jul. 14-22, 2011).*
(Continued)

*Primary Examiner* — Dakshesh D Parikh
(74) *Attorney, Agent, or Firm* — Brundidge & Stanger, P.C.

(57) ABSTRACT

A motion vector predictor candidate generating unit makes a prediction based on a motion vector of one of coded neighboring blocks that are neighboring to a coding target block in space or time and generates a plurality of motion vector predictor candidates. A motion vector predictor redundant candidate removing unit removes the motion vector predictor candidates having identity among the motion vector predictor candidates predicted based on a coded neighboring block that is neighboring in space from
(Continued)

a motion vector predictor candidate list with at least one being left. A motion vector predictor selecting unit selects a motion vector predictor from the plurality of motion vector predictor candidates. A first bitstream generating unit codes information representing the selected motion vector predictor.

3 Claims, 34 Drawing Sheets

Related U.S. Application Data continuation of application No. 14/298,542, filed on Jun. 6, 2014, now Pat. No. 10,015,514, which is a continuation of application No. PCT/JP2012/008325, filed on Dec. 26, 2012.

(51) Int. Cl.
*H04N 19/176* (2014.01)
*H04N 19/174* (2014.01)
*H04N 19/70* (2014.01)
*H04N 19/182* (2014.01)
*H04N 19/172* (2014.01)
*H04N 19/159* (2014.01)
*H04N 19/105* (2014.01)
*H04N 19/184* (2014.01)
*H04N 19/436* (2014.01)

(52) U.S. Cl.
CPC ......... *H04N 19/172* (2014.11); *H04N 19/174* (2014.11); *H04N 19/176* (2014.11); *H04N 19/182* (2014.11); *H04N 19/184* (2014.11); *H04N 19/70* (2014.11); *H04N 19/436* (2014.11)

(56) References Cited

U.S. PATENT DOCUMENTS

2012/0195368 A1* 8/2012 Chien ................ H04N 19/52
375/240.02

2012/0320984 A1* 12/2012 Zhou ................ H04N 19/50
375/240.16

OTHER PUBLICATIONS

JCTVC-H0239, "Non-CE9: Simplification on AMVP list construction", Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.
Hellman et al., "Decoder Performance Restrictions due to Merge/MVP Index Parsing," Joint Collaborative Team on Video Coding (JCT-VC) of ITU-T SG16 WP3 and ISO/IEC JTC1/SC29/WG11, 6th Meeting: Torino, IT, Jul. 14-22, 2011.
Wiegand et al. (Document: JCTVC-E603, Joint Collaborative Team on Video Coding (JCT-VC) of ITU-T SG16 WP3 and ISO/IEC JTC1 /SC29/WG11 5th Meeting: Geneva, CH, Mar. 16-23, 2011) (hereinafter Wiegand).
Notification of Reasons for Refusal in Japanese Patent Application No. 2011-289286, dated Feb. 10, 2015.
Thomas Wiegand et al., "WD3: Working Draft 3 of High-Efficiency Video Coding," Joint Collaborative Team on Video coding (JCT-VC) of ITU-T SG16 WP3 and ISO/IEC JTC1/SC29/WG11 JCTVC-E603, ITU-T, Jun. 2011, Section 8.4.2.1-Section 8A.2.1.6.
Chen et al., U.S. Appl. No. 61/561,601, "Performing Motion Vector Prediction for Video Coding," filed Nov. 18, 2011.
Thomas Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, 5th Meeting: Geneva, CH, Mar. 16-23, 2011.
International Search Report in PCT International Application No. PCT/JP2012/008325, dated Mar. 26, 2013.
International Preliminary Report on Patentability and Written Opinion in PCT International Application No. PCT/JP2012/008325, dated Jul. 1, 2014.
Notification of Reasons for Refusal in Japanese Patent Application No. 2011-289286, dated Jan. 14, 2014.
Notification of Reasons for Refusal in Japanese Patent Application No. 2011-289286, dated May 27, 2014.

* cited by examiner

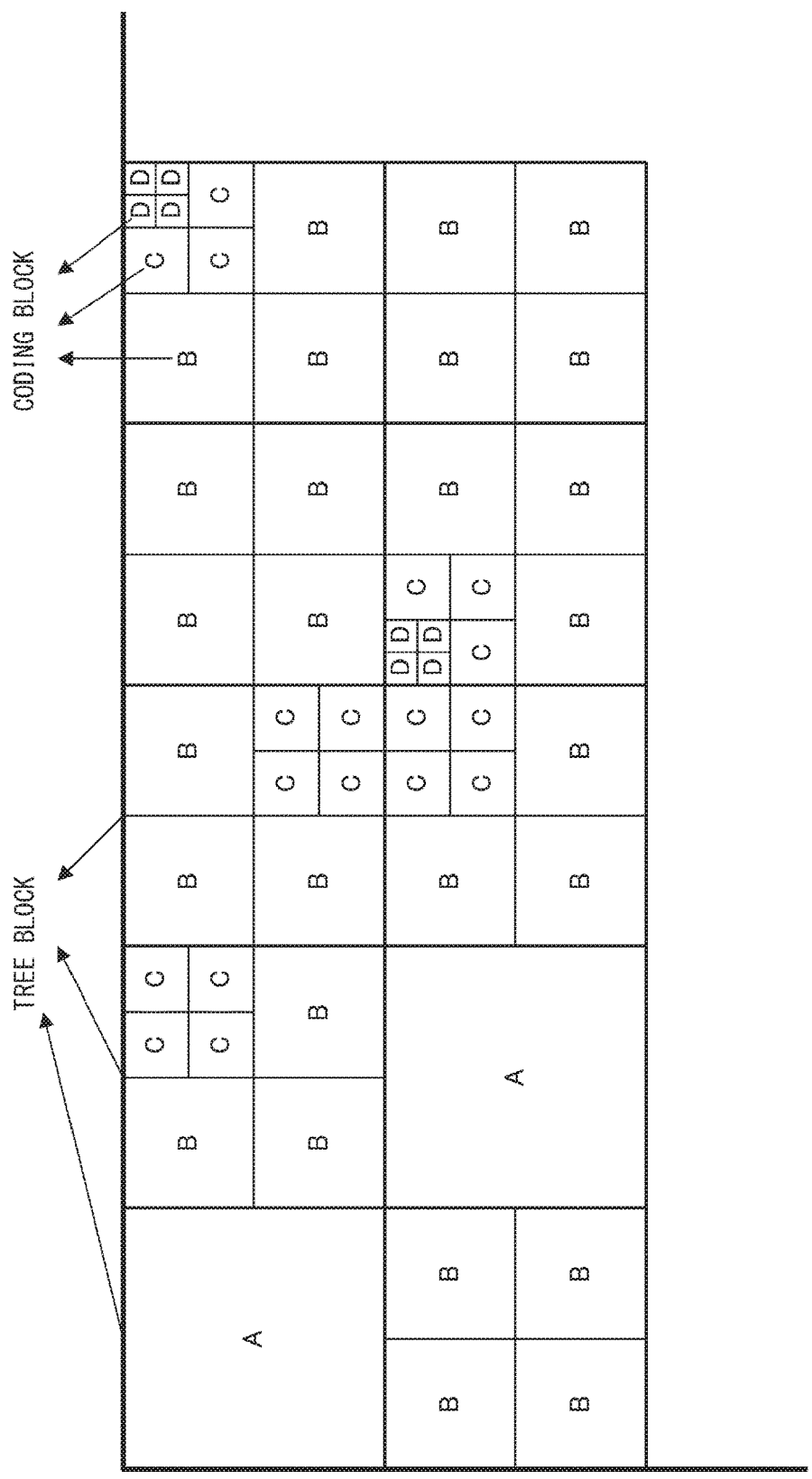

FIG.23

|  |  | mvp_idx_LX | |
| --- | --- | --- | --- |
|  |  | 0 | 1 |
| availableFlagLXCol | 0 | FIRST SPATIAL CANDIDATE | SECOND SPATIAL CANDIDATE |
|  | 1 | TIME CANDIDATE | FIRST SPATIAL CANDIDATE | ns is defined. In the case of
MOVING PICTURE CODING DEVICE, MOVING PICTURE CODING METHOD, AND MOVING PICTURE CODING PROGRAM, AND MOVING PICTURE DECODING DEVICE, MOVING PICTURE DECODING METHOD, AND MOVING PICTURE DECODING PROGRAM

CROSS-REFERENCE TO RELATED APPLICATION

This application is a Continuation of application Ser. No. 15/983,189, filed May 18, 2018; which is a Continuation of application Ser. No. 14/298,542, filed Jun. 6, 2014, now U.S. Pat. No. 10,015,514; which is a Continuation of International Application No. PCT/JP2012/008325, filed on Dec. 26, 2012, which in turn claims the benefit of Japanese Application No. 2011-289285, filed on Dec. 28, 2011 and Japanese Application No. 2011-289286, filed on Dec. 28, 2011, the disclosures of which Applications are incorporated by reference herein.

BACKGROUND OF THE INVENTION

1. Field of the Invention

The present invention relates to moving picture coding and decoding technologies, and more particularly, to moving picture coding and decoding technologies using motion compensation.

2. Description of the Related Art

As a representative compression coding system of a moving picture, there is a specification of MPEG-4 AVC/H.264 (hereinafter, referred to as AVC). In the AVC, a motion compensation is used in which a picture is partitioned into rectangular blocks, a picture that has been coded/decoded is set as a reference picture, and a motion from the reference picture is predicted. A technique predicting a motion in accordance with such a motion compensation is called an inter prediction. In the inter prediction according to the AVC, a plurality of pictures can be used as reference pictures, the most appropriate picture is selected from among such a plurality of pictures for each block, and the motion compensation is performed. A reference index is assigned to each reference picture, and the reference picture is specified using the reference index. In addition, in a B picture, maximally two pictures are selected from among reference pictures that have been coded/decoded so as to be used for inter predictions. Such predictions made from the two reference pictures are classified into an L0 prediction (list 0 prediction) that is mainly used for a prediction for the forward direction and an L1 prediction (list 1 prediction) that is mainly used for a prediction for the backward direction.

In addition, a bi-prediction that uses the two inter predictions of the L0 and L1 predictions is defined. In the case of the bi-prediction, bi-directional predictions are made, inter-predicted signals according to the L0 and L1 predictions are multiplied by weighting coefficients, and resultant signals overlap each other with offset values being added thereto, whereby a final inter-prediction picture signal is generated. The weighting coefficients and the offset values used for a weighted prediction are set to representative values in units of pictures for each reference picture of each list and coded. As coding information relating to an inter prediction, for each block, there are a prediction mode specifying both predictions of the L0 prediction and the L1 prediction and, for each reference list of each block, a reference index specifying a reference picture and a motion vector representing the direction of motion and the amount of motion of the block, and such coding information is coded/decoded.

In a moving picture coding system performing the motion compensation, in order to reduce the coding amount of a motion vector generated in each block, a prediction process is performed for the motion vector. According to the AVC, by using a strong correlation between a motion vector of a coding target and motion vectors of neighboring blocks disposed on the periphery thereof, a motion vector predictor is calculated by making a prediction based on the neighboring blocks disposed on the periphery, a motion vector difference that is a difference between the motion vector of the coding target and the motion vector predictor is calculated, and the motion vector difference is coded, whereby the coding amount is reduced.

More specifically, as illustrated in FIG. 34A, a median is calculated based on motion vectors of neighboring blocks A, B, and C disposed on the periphery and is set as a motion vector predictor, and a difference between a motion vector and the motion vector predictor is taken, whereby the coding amount of the motion vector is reduced. However, as illustrated in FIG. 34B, in a case where the sizes or the shapes of the coding target block and neighboring blocks are different from each other, when a plurality of neighboring blocks are present on the left side, an uppermost block out of the neighboring blocks, or when a plurality of neighboring blocks are present on the upper side, a leftmost block out of the neighboring blocks is set as a prediction block, and a prediction is made based on the motion vector of the determined prediction block.

In addition, according to a technology disclosed in Patent Literature 1, a prediction vector is calculated based on motion vectors of a plurality of neighboring blocks of a processing target block and reference picture information, and accordingly, the accuracy of the prediction vector is improved, whereby an increase in the coding amount of a coding vector is suppressed.

CITATION LIST

Patent Literature

[Patent Literature 1] Japanese Patent Application Laid-Open No. 2011-147172

However, according to the method described in Patent Literature 1, since only one prediction vector is acquired, the prediction accuracy of the motion vector predictor is lowered depending on a picture, and the coding efficiency may be low.

In such a situation, the inventors of the present invention have recognized the necessity for decreasing the total coding amount by further compressing coding information in a moving picture coding system using motion compensation.

SUMMARY OF THE INVENTION

The present invention is contrived in consideration of such a situation, and an object thereof is to provide a moving picture coding and decoding technology for improving the coding efficiency by reducing the coding amount of a motion vector difference by calculating candidates for a motion vector predictor. In addition, another object thereof is to provide a moving picture coding and decoding technology for improving the coding efficiency by reducing the coding amount of coding information by calculating candidates for the coding information.

In order to solve the problem, a moving picture coding device according to an aspect of the invention is one that codes a moving picture using motion compensation in units of blocks acquired by dividing each picture of the moving picture, and the moving picture coding device includes: a motion vector predictor candidate generating unit (121, 122) configured to derive a plurality of motion vector predictor candidates by making a prediction based on a motion vector of one of coded blocks that are neighboring to a coding target block in space or time and construct a motion vector predictor candidate list; a motion vector predictor redundant candidate removing unit (123) configured to remove the motion vector predictor candidates having identity among the motion vector predictor candidates predicted based on a coded block that is neighboring in space from the motion vector predictor candidate list with at least one being left; a motion vector predictor selecting unit (126) configured to select a motion vector predictor from the motion vector predictor candidate list; a differential vector calculating unit (127) configured to calculate a motion vector difference based on a difference between the selected motion vector predictor and the motion vector used for motion compensation; and a coding unit (109) configured to code information representing the selected motion vector predictor together with the motion vector difference.

According to another aspect of the present invention, there is also provided a moving picture coding device. This device is a moving picture coding device that codes a moving picture using motion compensation in units of blocks acquired by dividing each picture of the moving picture and includes: a motion vector predictor candidate generating unit (121, 122) configured to derive a plurality of motion vector predictor candidates by making a prediction based on a motion vector of one of coded blocks that are neighboring to a coding target block in space or time and construct a motion vector predictor candidate list; a motion vector predictor redundant candidate removing unit (123) configured to remove the motion vector predictor candidates having a same motion vector value among the motion vector predictor candidates predicted based on a coded block that is neighboring in space from the motion vector predictor candidate list with one being excluded; a motion vector predictor selecting unit (126) configured to select a motion vector predictor from the motion vector predictor candidate list; a differential vector calculating unit (127) configured to calculate a motion vector difference based on a difference between the selected motion vector predictor and the motion vector used for motion compensation; and a coding unit (109) configured to code information representing the selected motion vector predictor together with the motion vector difference.

According to another aspect of the present invention, there is provided a moving picture coding method. This method is a moving picture coding method for coding a moving picture using motion compensation in units of blocks acquired by dividing each picture of the moving picture and includes: deriving a plurality of motion vector predictor candidates by making a prediction based on a motion vector of one of coded blocks that are neighboring to a coding target block in space or time and constructing a motion vector predictor candidate list; removing the motion vector predictor candidates having identity among the motion vector predictor candidates predicted based on a coded block that is neighboring in space from the motion vector predictor candidate list with at least one being left; selecting a motion vector predictor from the motion vector predictor candidate list; calculating a motion vector difference based on a difference between the selected motion vector predictor and the motion vector used for motion compensation; and coding information representing the selected motion vector predictor together with the motion vector difference.

According to another aspect of the present invention, there is also provided a moving picture coding method. This method is a moving picture coding method for coding a moving picture using motion compensation in units of blocks acquired by dividing each picture of the moving picture and includes: deriving a plurality of motion vector predictor candidates by making a prediction based on a motion vector of one of coded blocks that are neighboring to a coding target block in space or time and constructing a motion vector predictor candidate list; removing the motion vector predictor candidates having a same motion vector value among the motion vector predictor candidates predicted based on a coded block that is neighboring in space from the motion vector predictor candidate list with one being excluded; selecting a motion vector predictor from the motion vector predictor candidate list; calculating a motion vector difference based on a difference between the selected motion vector predictor and the motion vector used for motion compensation; and coding information representing the selected motion vector predictor together with the motion vector difference.

According to another aspect of the present invention, there is provided a moving picture decoding device that decodes a bitstream in which a moving picture is coded using motion compensation in units of blocks acquired by dividing each picture of the moving picture. The moving picture decoding device includes: a decoding unit (202) configured to decode information representing a motion vector predictor to be selected together with a motion vector difference; a motion vector predictor candidate generating unit (221, 222) configured to derive a plurality of motion vector predictor candidates by making a prediction based on a motion vector of one of decoded blocks that are neighboring to a decoding target block in space or time and construct a motion vector predictor candidate list; a motion vector predictor redundant candidate removing unit (223) configured to remove the motion vector predictor candidates having identity among the motion vector predictor candidates predicted based on a decoded block that is neighboring in space from the motion vector predictor candidate list with at least one being left; a motion vector predictor selecting unit (225) configured to select a motion vector predictor from the motion vector predictor candidate list based on information representing the decoded motion vector predictor to be selected; and a motion vector calculating unit (226) configured to calculate a motion vector used for motion compensation by adding the selected motion vector predictor and the motion vector difference together.

According to another aspect of the present invention, there is also provided a moving picture decoding device. This device is a moving picture decoding device that decodes a bitstream in which a moving picture is coded using motion compensation in units of blocks acquired by dividing each picture of the moving picture. The moving picture decoding device includes: a decoding unit (202) configured to decode information representing a motion vector predictor to be selected together with a motion vector difference; a motion vector predictor candidate generating unit (221, 222) configured to derive a plurality of motion vector predictor candidates by making a prediction based on a motion vector of one of decoded blocks that are neighboring to a decoding target block in space or time and construct a motion vector predictor candidate list; a motion vector predictor redundant candidate removing unit (223) configured to remove the motion vector predictor candidates having a same motion vector value among the motion vector predictor candidates predicted based on a decoded block that is neighboring in space from the motion vector predictor candidate list with one being excluded; a motion vector predictor selecting unit (225) configured to select a motion vector predictor from the motion vector predictor candidate list based on information representing the decoded motion vector predictor to be selected; and a motion vector calculating unit (226) configured to calculate a motion vector used for motion compensation by adding the selected motion vector predictor and the motion vector difference together.

According to another aspect of the present invention, there is provided a moving picture decoding method. This method is a moving picture decoding method for decoding a bitstream in which a moving picture is coded using motion compensation in units of blocks acquired by dividing each picture of the moving picture. The moving picture decoding method includes: decoding information representing a motion vector predictor to be selected together with a motion vector difference; deriving a plurality of motion vector predictor candidates by making a prediction based on a motion vector of one of decoded blocks that are neighboring to a decoding target block in space or time and constructing a motion vector predictor candidate list; removing the motion vector predictor candidates having identity among the motion vector predictor candidates predicted based on a decoded block that is neighboring in space from the motion vector predictor candidate list with at least one being left; selecting a motion vector predictor from the motion vector predictor candidate list based on information representing the decoded motion vector predictor to be selected; and calculating a motion vector used for motion compensation by adding the selected motion vector predictor and the motion vector difference together.

According to another aspect of the invention, there is also provided a moving picture decoding method. This method is a moving picture decoding method for decoding a bitstream in which a moving picture is coded using motion compensation in units of blocks acquired by dividing each picture of the moving picture and includes: decoding information representing a motion vector predictor to be selected together with a motion vector difference; deriving a plurality of motion vector predictor candidates by making a prediction based on a motion vector of one of decoded blocks that are neighboring to a decoding target block in space or time and constructing a motion vector predictor candidate list; removing the motion vector predictor candidates having a same motion vector value among the motion vector predictor candidates predicted based on a decoded block that is neighboring in space from the motion vector predictor candidate list with one being excluded; selecting a motion vector predictor from the motion vector predictor candidate list based on information representing the decoded motion vector predictor to be selected; and calculating a motion vector used for motion compensation by adding the selected motion vector predictor and the motion vector difference together.

Furthermore, an arbitrary combination of the constituent elements described above and a conversion of the representation of the present invention among a method, a device, a system, a recording medium, a computer program, and the like is valid as an aspect of the present invention.

According to the present invention, a plurality of motion vector predictors are calculated, and an optimal motion vector predictor is selected from among the plurality of motion vector predictors, and accordingly, the generated coding amount of the motion vector difference is reduced, whereby the coding efficiency is improved.

BRIEF DESCRIPTION OF THE DRAWINGS

FIG. 3 is a diagram that illustrates tree blocks and coding blocks.

FIG. 23 is a diagram that illustrates a motion vector predictor selection pattern of a case where a motion vector predictor according to the second embodiment is determined to be a spatial motion vector predictor candidate.

DETAILED DESCRIPTION OF THE INVENTION

Figure 1:
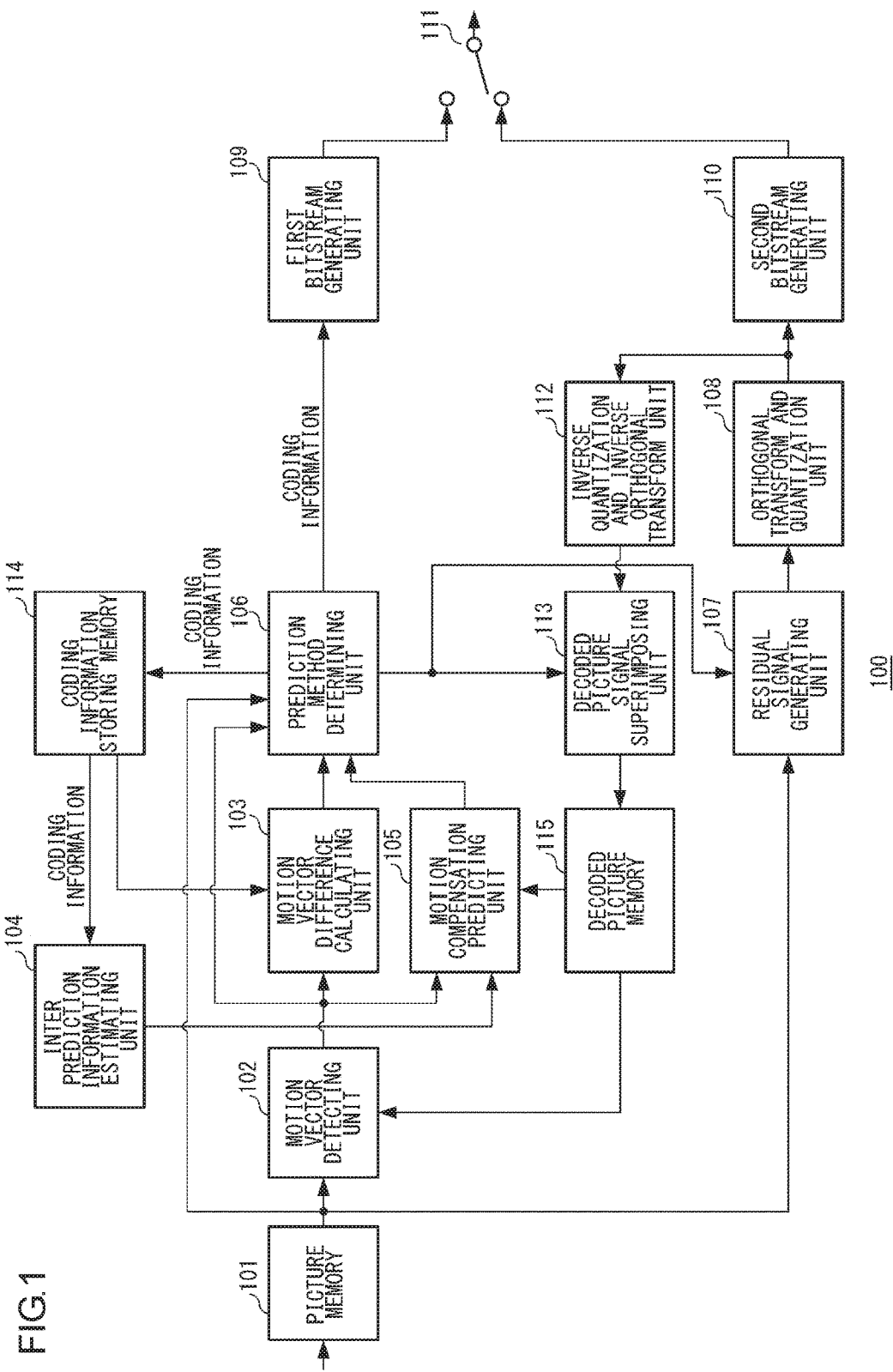
FIG. 1 is a block diagram that illustrates the configuration of a moving picture coding device executing a motion vector predicting method according to an embodiment.

This embodiment relates to coding of a moving picture, and, in order to improve the coding efficiency, particularly, in moving picture coding in which a picture is partitioned into rectangular blocks having an arbitrary size and an arbitrary shape, and motion compensation is performed in units of blocks between pictures, a plurality of motion vector predictors are calculated based on motion vectors of coded neighboring blocks, and a differential vector between the motion vector of a coding target block and a selected motion vector predictor is calculated and is coded so as to reduce the coding amount. Alternatively, by using the coding information of coded neighboring blocks, the coding information of the coding target block is estimated, whereby the coding amount is reduced. In the case of decoding a moving picture, a plurality of motion vector predictors are calculated based on motion vectors of decoded neighboring blocks, and the motion vector of the decoding target block is calculated based on the differential vector decoded from the bitstream and a selected motion vector predictor and is decoded. In addition, by using the coding information of decoded neighboring blocks, the coding information of the decoding target block is estimated.

First, technologies and technical terms used in this embodiment will be defined.
(Tree Block and Coding Block)

In the embodiment, as illustrated in FIG. 3, the inside of a picture is equally partitioned in units of squares having an arbitrary same size. This unit is defined as a tree block and is configured as a basic unit of address management for specifying a coding/decoding target block (a coding target block in a coding process or a decoding target block in a decoding process; hereinafter, it will be used in this meaning, unless otherwise noted) within a picture. Except for the case of monochrome, the tree block is configured by one luminance signal and two color difference signals. The size of the tree block may be freely set to a size of a power of 2 in accordance with the picture size or a texture included inside the picture. In order to optimize the coding process in accordance with a texture included in a picture of the tree block, the tree block may be configured as blocks having a small size by hierarchically partitioning the luminance signal and the color difference signal into four parts (into respective two parts vertically and horizontally) as is necessary. Each of these blocks is defined as a coding block and serves as a basic unit of the process at the time of performing the coding process and the decoding process. Except for the case of monochrome, the coding block is also configured by one luminance signal and two color difference signals. The maximal size of the coding block is the same as the size of the tree block. A coding block of which the size is the minimal size of the coding block is called a minimal coding block and may be freely set in the size of a power of 2.

In the case illustrated in FIG. 3, coding block A is configured as one coding block without partitioning the tree block. Coding block B is a coding block that is formed by partitioning the tree block into four parts. Coding block C is a coding block that is formed by further partitioning a block, which is acquired by partitioning the tree block into four parts, into four parts. Coding block D is a coding block that is formed by further hierarchically partitioning a block, which is acquired by partitioning the tree block into four parts, into four parts twice and is a coding block of the minimal size.
(Prediction Mode)

In units of coding blocks, switching is performed between an intra prediction MODE_INTRA in which a prediction is made based on neighboring picture signals that have been coded/decoded within the picture of a coding target block and an inter prediction MODE_INTER in which a prediction is made based on coded/decoded picture signals of a picture different from the picture of the coding target block. A mode for discriminating between the intra prediction MODE_INTRA and the inter prediction MODE_INTER is defined as a prediction mode PredMode. The prediction mode PredMode has the value of the intra prediction MODE_INTRA or the inter prediction MODE_INTER and can select therebetween for coding.
(Partition Mode, Prediction Block, and Prediction Unit)

In a case where the intra prediction MODE_INTRA and the inter prediction MODE_INTER are made with the inside of a picture being partitioned into blocks, in order to make the unit, in which switching between the intra prediction and the inter prediction is performed, smaller, predictions are made with the coding block being partitioned into parts as is necessary. A mode for identifying a method of partitioning the luminance signal and the color difference signal of this coding block is defined as a partition mode (PartMode). In addition, the partitioned blocks are defined as prediction blocks. As illustrated in FIGS. 4A to 4D, four kinds of partition modes (PartMode) are defined in accordance with the method of partitioning the luminance signal of the coding block. A partition mode (PartMode) in which the luminance signal of the coding block is not partitioned so as to be regarded as one prediction block (FIG. 4A) is defined as a 2N.times.2N partition (PART.sub.-2N.times.2N), a partition mode (PartMode) in which the luminance signal of the coding block is partitioned into two parts in the horizontal direction so as to form two prediction blocks (FIG. 4B) is defined as a 2N.times.N partition (PART 2N.times.N), a partition mode (PartMode) in which the luminance signal of the coding block is partitioned in the vertical direction, and the coding block is formed as two prediction blocks (FIG. 4C) is defined as an N.times.2N partition (PART_N.times.2N), and a partition mode (PartMode) in which the luminance signal of the coding block is partitioned through equal partitioning in the horizontal and vertical directions so as to form four prediction blocks (FIG. 4D) is defined as an N.times.N partition (PART_N.times.N). In addition, the color difference signal is partitioned at the same vertical and horizontal partition ratios of the luminance signal for each partition mode (PartMode).

Inside the coding block, in order to specify respective prediction blocks, numbers starting from zero are assigned to prediction blocks present inside the coding block in the order of coding. These numbers are defined as partition indexes PartIdx. Each number represented inside each prediction block of the coding blocks illustrated in FIGS. 4A to 4D represents the partition index PartIdx of the prediction block. In the 2N.times.N partition PART.sub.-2N.times.N illustrated in FIG. 4B, the partition index PartIdx of the upper prediction block is set to "0", and the partition index PartIdx of the lower prediction block is set to "1". In the N.times.2N partition PART_N.times.2N illustrated in FIG. 4C, the partition index PartIdx of the left prediction block is set to "0", and the partition index PartIdx of the right prediction block is set to "1". In the N.times.N partition PART_N.times.N illustrated in FIG. 4D, the partition index PartIdx of the upper left prediction block is set to "0", the partition index PartIdx of the upper right prediction block is set to "1", the partition index PartIdx of the lower left prediction block is set to "2", and the partition index PartIdx of the lower right prediction block is set to "3".

In a case where the prediction mode PredMode is the inter prediction MODE_INTER, in a coding block other than the coding block D that is the minimal coding block, the 2N.times.2N partition PART.sub.-2N.times.2N, the 2N.times.N partition PART.sub.-2N.times.N, and the N.times.2N partition PART_N.times.2N are defined as the partition modes PartMode, and, only in the coding block D that is the minimal coding block, in addition to 2N.times.2N partition PART.sub.-2N.times.2N, the 2N.times.N partition PART.sub.-2N.times.N, and the N.times.2N partition PART_N.times.2N, the N.times.N partition PART_N.times.N is defined as the partition modes PartMode. The reason for not defining the N.times.N partition PART_N.times.N in a block other than the minimal coding block is that the coding block can be divided into four parts so as to represent small coding blocks in a block other than the minimal coding block.

(Position of Tree Block, Coding Block, Prediction Block, and Conversion Block)

As the position of each of blocks including a tree block, a coding block, a prediction block, and a conversion block according to this embodiment, the position of a pixel of an upper leftmost luminance signal included in the area of each block is represented as two-dimensional coordinates of (x, y) with the position of the pixel of the upper leftmost luminance signal of the screen of the luminance signals being set as the origin (0, 0). As the directions of the coordinate axes, the rightward direction in the horizontal direction, and the downward direction in the vertical direction are defined as positive directions, and the unit is one pixel unit of the luminance signal. Not only in a case where the color difference format is 4:4:4 in which the picture size (the number of pixels) is the same between the luminance signal and the color difference signal, but also in a case where the color difference format is 4:2:0 or 4:2:2 in which the picture size (the number of pixels) is different between the luminance signal and the color difference signal, the position of each block of the color difference signal is represented as the coordinates of a pixel of the luminance signal included in the area of the block, and the unit is one pixel of the luminance signal. By configuring as such, not only the position of each block of the color difference signal can be specified but also the positional relation between the block of the luminance signal and the block of the color difference signal is clear by comparing the values of the coordinates.

(Group of Prediction Blocks)

A group configured by a plurality of prediction blocks is defined as a prediction block group. FIGS. 5, 6, 7, and 8 are diagrams that illustrate prediction block groups neighboring to a prediction block that is the coding/decoding target within a picture of the prediction block that is the coding/decoding target. FIG. 9 is a diagram that illustrates a prediction block group, which has already been coded/decoded, present at the same position as that of the prediction block that is the coding/decoding target or a position neighboring thereto in a coded/decoded picture of a time different from the time of the prediction block that is the coding/decoding target. The prediction block group will be described with reference to FIGS. 5, 6, 7, 8, and 9.

Figure 5:
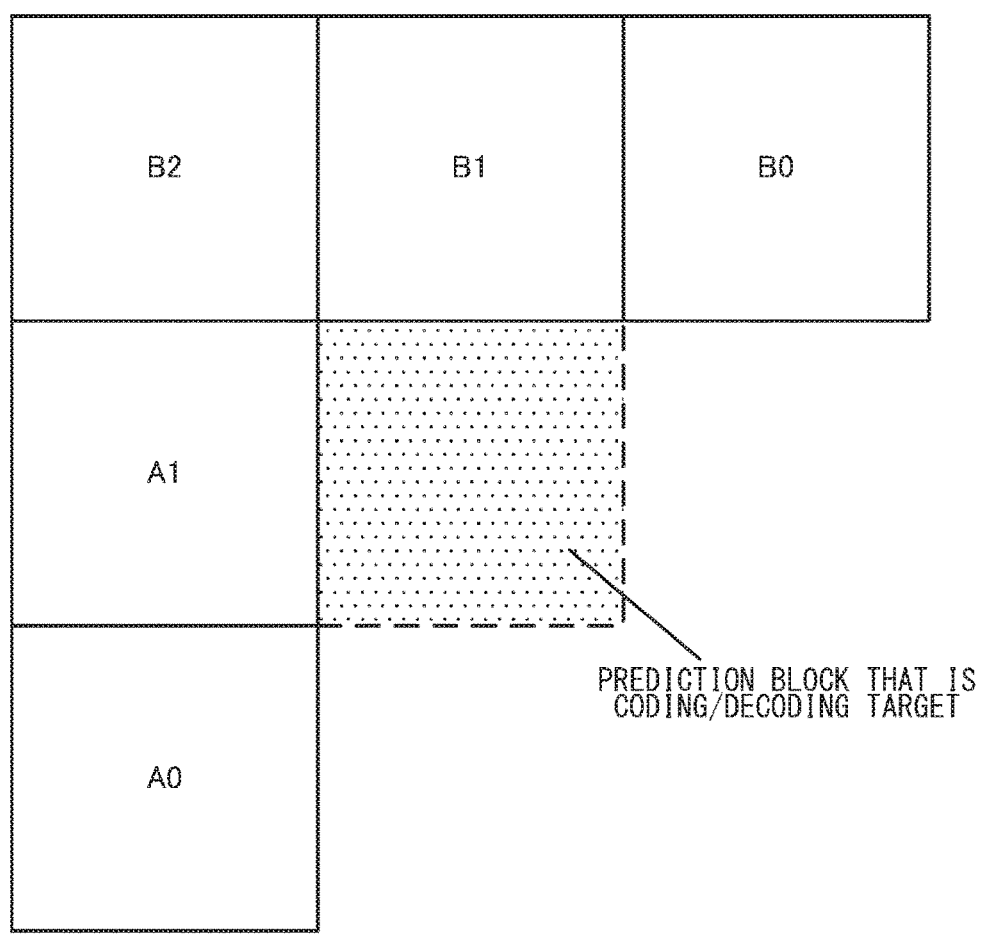
FIG. 5 is a diagram that illustrates a group of prediction blocks.

As illustrated in FIG. 5, a first prediction block group configured by a prediction block A1 that is neighboring to the left side of a prediction block, which is the coding/decoding target, within a picture of the prediction block that is the coding/decoding target and a prediction block A0 that is neighboring to the lower left vertex of the prediction block that is the coding/decoding target is defined as a prediction block group neighboring to the left side.

Figure 6:
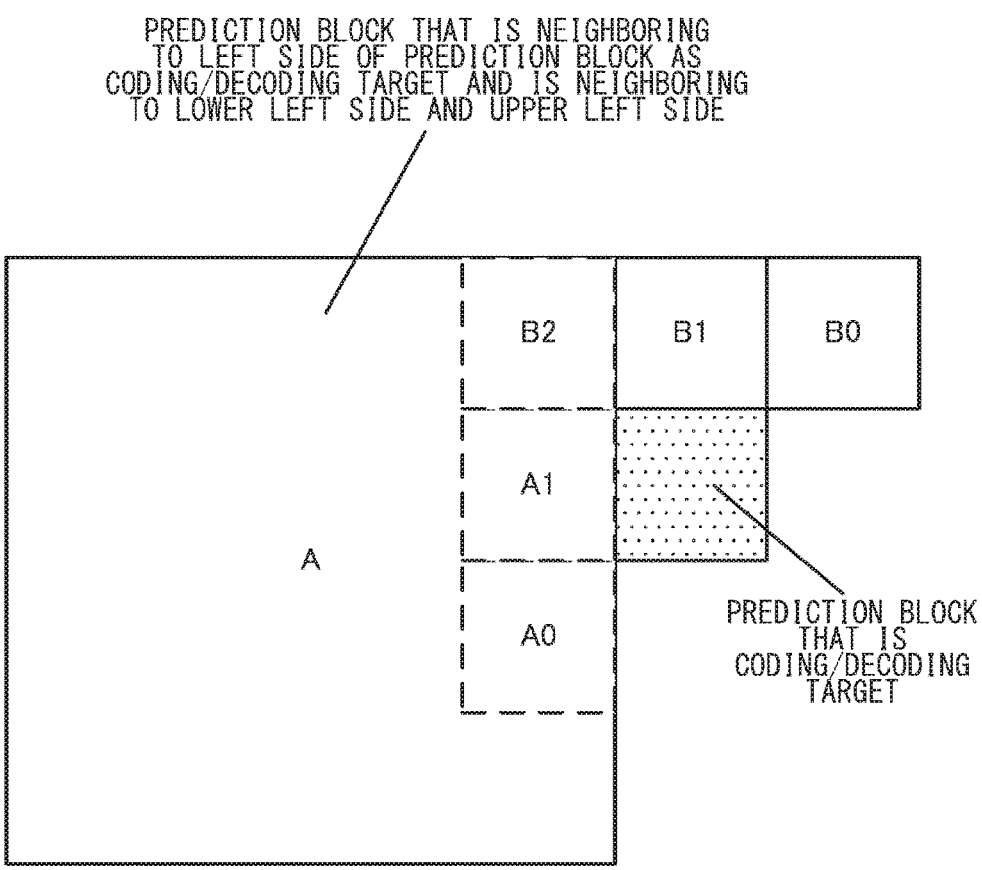
FIG. 6 is a diagram that illustrates a group of prediction blocks.

In addition, as illustrated in FIG. 6, even in a case where the size of the prediction block neighboring to the left side of the prediction block that is the coding/decoding target is larger than that of the prediction block that is the coding/decoding target, according to the above-described condition, in a case where a prediction block A neighboring to the left side is neighboring to the left side of the prediction block that is the coding/decoding target, the prediction block A is set as the prediction block A1, and, in a case where the prediction block A is neighboring to the lower left vertex of the prediction block that is the coding/decoding target, the prediction block A is set as the prediction block A0. In the example illustrated in FIG. 6, the prediction blocks A0 and A1 are the same.

Figure 7:
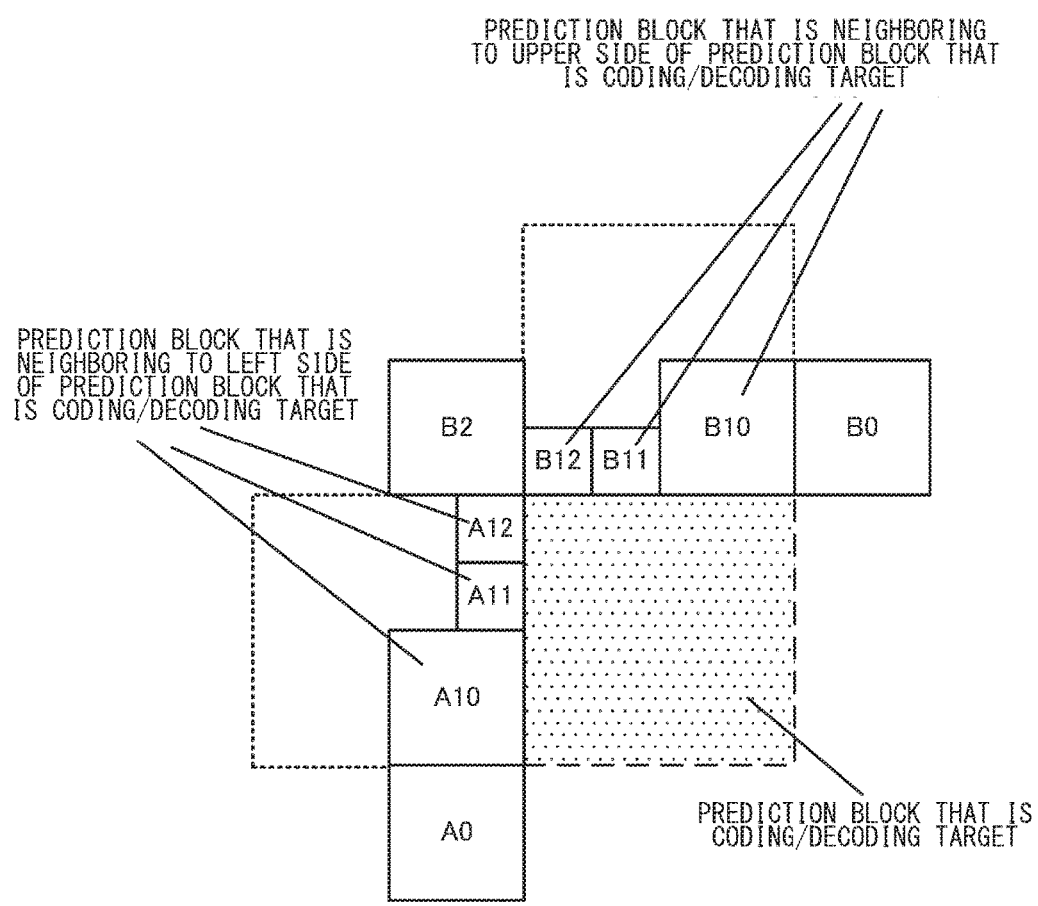
FIG. 7 is a diagram that illustrates a group of prediction blocks.

Furthermore, as illustrated in FIG. 7, in a case where a plurality of prediction blocks neighboring to the left side of the prediction block that is the coding/decoding target are present, and the size of each of the plurality of prediction blocks is smaller than that of the prediction block that is the coding/decoding target, in this embodiment, only a lowermost prediction block A10 out of the prediction blocks neighboring to the left side is set as the prediction block A1 neighboring to the left side.

Substantially similarly to the definition of the prediction block group neighboring to the left side, a second prediction block group configured by a prediction block B1 neighboring to the upper side of the prediction block that is the coding/decoding target within the picture of the prediction block that is the coding/decoding target, a prediction block B0 neighboring to the upper right vertex of the prediction block that is the coding/decoding target, and a prediction block B2 neighboring to the upper left vertex of the prediction block that is the coding/decoding target is defined as a prediction block group neighboring to the upper side.

Figure 8:
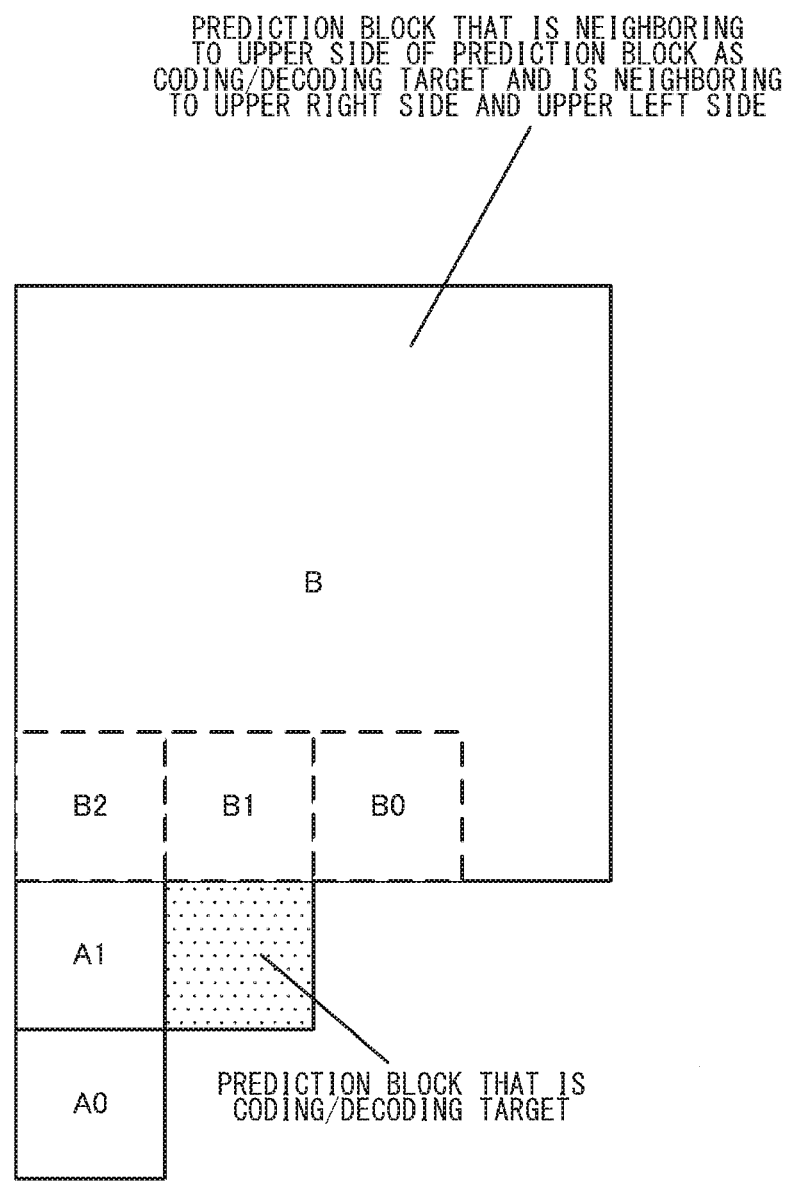
FIG. 8 is a diagram that illustrates a group of prediction blocks.
Figure 9:
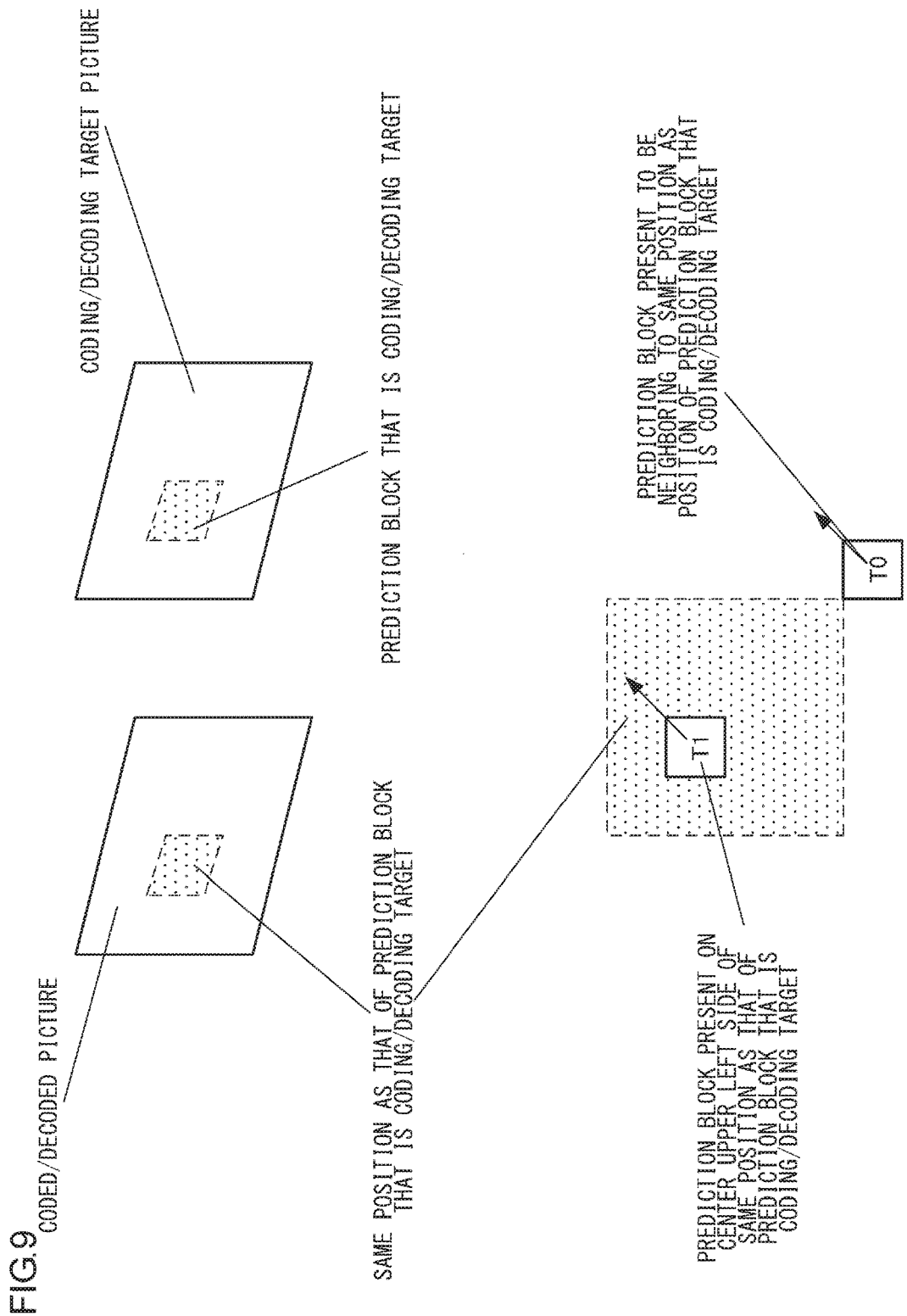
FIG. 9 is a diagram that illustrates a group of prediction blocks.

In addition, as illustrated in FIG. 8, even in a case where the size of the prediction block neighboring to the upper side of the prediction block that is the coding/decoding target is larger than that of the prediction block that is the coding/decoding target, according to the above-described condition, in a case where a prediction block B neighboring to the upper side is neighboring to the upper side of the prediction block that is the coding/decoding target, the prediction block B is set as the prediction block B1, in a case where the prediction block B is neighboring to the upper right vertex of the prediction block that is the coding/decoding target, the prediction block B is set as the prediction block B0, and, in a case where the prediction block B is neighboring to the upper left vertex of the prediction block that is the coding/decoding target, the prediction block B is set as the prediction block B2. In the example illustrated in FIG. 8, the prediction blocks B0, B1, and B2 are the same.

Furthermore, as illustrated in FIG. 7, in a case where a plurality of prediction blocks neighboring to the upper side of the prediction block that is the coding/decoding target are present, and the size of each of the plurality of prediction blocks is smaller than that of the prediction block that is the coding/decoding target, in this embodiment, only a rightmost prediction block B10 out of the prediction blocks neighboring to the upper side is set as the prediction block B1 neighboring to the upper side.

A difference from the prediction block group neighboring to the left side is that the prediction block B2 neighboring to the upper left vertex of the prediction block that is the coding/decoding target is included in the prediction block group neighboring to the upper side. While the upper left prediction block B2 may be included in any prediction block group, here, the upper left prediction block B2 is included in the prediction block group neighboring to the upper side. Accordingly, the number of prediction blocks of the prediction block group neighboring to the upper side is more than that of prediction blocks of the prediction block group neighboring to the left side.

As illustrated in FIG. 9, in a coded/decoded picture of a time that is different from the time of the prediction block that is the coding/decoding target, a third prediction block group configured by prediction block groups T0 and T1, which have already been coded/decoded, present at the same position as the position of the prediction block that is the coding/decoding target or at a position neighboring thereto is defined as a prediction block group of a different time.

(Inter Prediction Mode and Reference List)

In an embodiment of the present invention, in an inter prediction making a prediction based on a picture signal of a coded/decoded picture, a plurality of decoded pictures may be used as reference pictures. In order to specify a reference picture selected from among the plurality of reference pictures, an index is attached to each prediction block. In a B slice, an inter prediction can be made by selecting arbitrary two reference pictures for each prediction block, and there are an L0 prediction Pred_L0, an L1 prediction Pred_L1, and a bi-prediction Pred_BI as the modes of the inter prediction. The reference pictures are managed by L0 (reference list 0) and L1 (reference list 1) of a list structure, and, by designating a reference index of L0 or/and L1, a reference picture can be specified. The L0 prediction Pred_L0 is an inter prediction referring to a reference picture managed by the reference list L0, the L1 prediction Pred_L1 is an inter prediction referring to a reference picture managed by the reference list L1, and the bi-prediction Pred_BI is an inter prediction referring to one reference picture managed by each of the reference lists L0 and L1 by performing both the L0 and L1 predictions. In an inter prediction of a P slice, only the L0 prediction can be used. In addition, in an inter prediction of a B slice, the L0 prediction, the L1 prediction, and the bi-prediction Pred_BI that averages or weights the L0 and L1 predictions can be used. In the processes described below, it is assumed that the process is performed for each of the reference lists L0 and L1 for a constant or a variable to which a suffix LX (here, X is 0 or 1) according to the output is attached.

(POC)

A POC is a variable that is associated with a picture to be coded, and a value increased each time by one in the sequence of output/display of a picture is set thereto. Based on the values of the POCs, the identity of pictures and the order of pictures in the sequence of output/display can be determined, and a distance between pictures can be derived. For example, in a case where the POCs of two pictures have the same value, the pictures can be determined to be the same. On the other hand, in a case where the POCs of two pictures have mutually different values, a picture having a smaller value of the POC can be determined to be a picture that is output/displayed first in time, and a difference between the POCs of two pictures represents a distance between the pictures in the direction of the time axis.

Embodiment 1

Embodiment 1 of the present invention will be described with reference to the drawings. FIG. 1 is a block diagram that illustrates the configuration of a moving picture coding device according to the embodiment of the present invention. The moving picture coding device according to the embodiment includes: a picture memory 101; a motion vector detecting unit 102; a motion vector difference calculating unit 103; an inter prediction information estimating unit 104; a motion compensation predicting unit 105; a prediction method determining unit 106; a residual signal generating unit 107; an orthogonal transform and quantization unit 108; a first bitstream generating unit 109; a second bitstream generating unit 110; a multiplexing unit 111; an inverse quantization and inverse orthogonal transform unit 112; a decoded picture signal superimposing unit 113; a coding information storing memory 114; and a decoded picture memory 115.

The picture memory 101 temporarily stores a picture signal of a coding target picture that is supplied in order of display time. The picture memory 101 supplies the stored picture signal of the coding target picture to the motion vector detecting unit 102, the prediction method determining unit 106, and the residual signal generating unit 107 in units of predetermined pixel blocks. At that time, the picture signals of pictures stored in order of display time are rearranged in order of coding and are output from the picture memory 101 in units of pixel blocks.

The motion vector detecting unit 102 detects the size of each prediction block and the motion vector of each prediction mode in units of prediction blocks through block matching or the like between a picture signal supplied from the picture memory 101 and a reference picture supplied from the decoded picture memory 115 and supplies the detected motion vector to the motion compensation predicting unit 105, the motion vector difference calculating unit 103, and the prediction method determining unit 106.

The motion vector difference calculating unit 103, by using coding information of a picture signal, which has already been coded, stored in the coding information storing memory 114, constructs a motion vector predictor list to be described later by calculating a plurality of motion vector predictor candidates, selects an optimal motion vector predictor from among the plurality of motion vector predictor candidates added to the generated motion vector predictor list, calculates a motion vector difference based on the motion vector detected by the motion vector detecting unit 102 and the motion vector predictor, and supplies the calculated motion vector difference to the prediction method determining unit 106. In addition, a motion vector predictor index used for specifying a selected motion vector predictor from among the motion vector predictor candidates added to the generated motion vector predictor list is supplied to the prediction method determining unit 106. The configuration and the operation of the motion vector difference calculating unit 103 will be described in detail later.

The inter prediction information estimating unit 104 estimates inter prediction information of a merge mode. Here, the merge mode is a mode in which inter prediction information of a neighboring inter-predicted prediction block that has been coded or an inter-predicted prediction block of another picture is used instead of coding inter prediction information such as the prediction mode of the prediction block, the reference index (information used for specifying a reference picture used for motion compensation from among a plurality of reference pictures added to the reference list), the motion vector, and the like. By using the coding information of a prediction block, which has already been coded, stored in the coding information storing memory 114, a plurality of merge candidates (candidates for inter prediction information) is calculated so as to construct a merge candidate list, an optimal merge candidate is selected from the plurality of merge candidates added to the constructed merge candidate list, the inter prediction information such as the prediction mode, the reference index, the motion vector, and the like of the selected merge candidate is supplied to the motion compensation predicting unit 105, and a merge index specifying the selected merge candidate is supplied to the prediction method determining unit 106.

The motion compensation predicting unit 105 generates a predicted picture signal by making motion compensation based on the reference picture by using the motion vector detected by the motion vector detecting unit 102 and the inter prediction information estimating unit 104 and supplies the generated predicted picture signal to the prediction method determining unit 106. In addition, in the L0 prediction and the L1 prediction, a one-way prediction is made. In the case of the bi-prediction Pred_BI, a bi-directional prediction is made, inter-predicted signals of the L0 and L1 predictions are adaptably multiplied by weighting coefficients, and resultant signals are superimposed with an offset value being added thereto, whereby a final predicted picture signal is generated.

The prediction method determining unit 106, by evaluating the coding amounts of motion vector differences according to a plurality of prediction methods, the amount of distortion between a predicted picture signal and a picture signal, and the like, determines a prediction mode PredMode determining the inter prediction PRED_INTER or the intra prediction PRED_INTRA and the partition mode PartMode in units of coding blocks, determines a prediction method such as a merge mode or a non-merge mode in units of prediction blocks in the inter prediction PRED_INTER, determines the merge index in the case of the merge mode or an inter prediction flag, a motion vector predictor index, the reference indexes of L0 and L1, a motion vector difference, and the like in a case where the mode is not the merge mode, and supplies coding information according to the determinations to the first bitstream generating unit 109.

In addition, the prediction method determining unit 106 stores information representing the determined prediction method and coding information including a motion vector and the like according to the determined prediction method in the coding information storing memory 114. Here, the stored coding information includes a prediction mode PredMode, a partition mode PartMode, flags predFlagL0 and predFlagL1 respectively representing whether to use the L0 prediction and whether to use the L1 prediction, reference indexes refIdxL0 and refIdxL1 of the reference lists L0 and L1, motion vectors mvL0 and mvL1 of the reference lists L0 and L1, and the like. Here, in a case where the prediction mode PredMode is the intra prediction MODE_INTRA, both the flag predFlagL0 representing whether to use the L0 prediction and the flag predFlagL1 representing whether to use the L1 prediction are "0". On the other hand, in a case where the prediction mode PredMode is the inter prediction MODE_INTER, and the inter prediction mode is the L0 prediction Pred_L0, the flag predFlagL0 representing whether to use the L0 prediction is "1", and the flag predFlagL1 representing whether to use the L1 prediction is "0". In addition, in a case where the inter prediction mode is the L1 prediction Pred_L1, the flag predFlagL0 representing whether to use the L0 prediction is "0", and the flag predFlagL1 representing whether to use the L1 prediction is "1". In a case where the inter prediction mode is the bi-prediction Pred_BI, both the flag predFlagL0 representing whether to use the L0 prediction and the flag predFlagL1 representing whether to use the L1 prediction are "1". The prediction method determining unit 106 supplies a predicted picture signal according to the determined prediction mode to the residual signal generating unit 107 and the decoded picture signal superimposing unit 113.

The residual signal generating unit 107 generates a residual signal by performing subtraction between a picture signal to be coded and a predicted picture signal and supplies the generated residual signal to the orthogonal transform and quantization unit 108.

The orthogonal transform and quantization unit 108 generates an orthogonally-transformed and quantized residual signal by performing orthogonal transform and quantization of the residual signal in accordance with a quantization parameter and supplies the generated orthogonally-transformed and quantized residual signal to the second bitstream generating unit 110 and the inverse quantization and inverse orthogonal transform unit 112. In addition, the orthogonal transform and quantization unit 108 stores the quantization parameter in the coding information storing memory 114.

The first bitstream generating unit 109, in addition to the information in units of sequences, pictures, slices, and coding blocks, codes the coding information according to the prediction method determined by the prediction method determining unit 106 for each coding block and each prediction block. More specifically, a first bitstream is generated by performing entropy coding of the coding information such as information relating to a prediction mode PredMode for each coding block, a partition mode PartMode, in the case of the inter prediction PRED_INTER, a flag used for determining the merge mode or not, in the case of the merge mode, a merge index, in the case of a non-merge mode, an inter prediction mode, a motion vector predictor index, a motion vector difference, and the like in accordance with a regulated syntax rule to be described later, and the generated first coding bitstream is supplied to the multiplexing unit 111.

The second bitstream generating unit 110 generates a second bitstream by performing entropy coding of the orthogonally-transformed and quantized residual signal in accordance with the regulated syntax rule and supplies the generated second bitstream to the multiplexing unit 111. The multiplexing unit 111 multiplexes the first bitstream and the second bitstream in accordance with a regulated syntax rule and outputs the multiplexed bit stream.

The inverse quantization and inverse orthogonal transform unit 112 calculates a residual signal by performing inverse quantization and an inverse orthogonal transform of the orthogonally transformed and quantized residual signal supplied from the orthogonal transform and quantization unit 108 and supplies the residual signal to the decoded picture signal superimposing unit 113.

The decoded picture signal superimposing unit 113 generates a decoded picture by superimposing a predicted picture signal according to the determination made by the prediction method determining unit 106 and the residual signal that is inversely quantized and inversely orthogonally-transformed by the inverse quantization and inverse orthogonal transform unit 112 together and stores the generated decoded picture in the decoded picture memory 115. In addition, there is also a case where a filtering process decreasing a distortion such as a block distortion according to coding is performed for the decoded picture, and the processed decoded picture is stored in the decoded picture memory 115.

Figure 2:
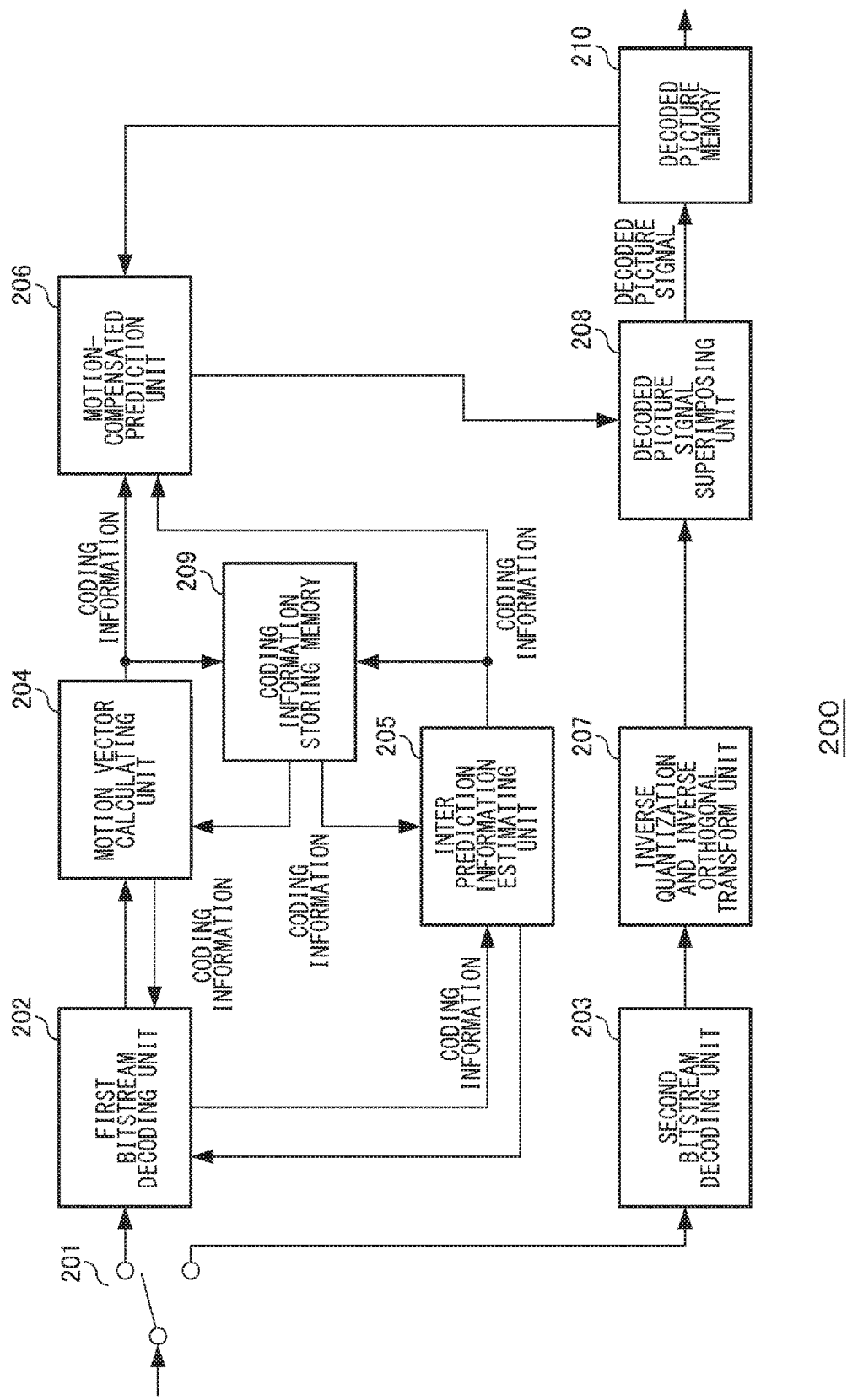
FIG. 2 is a block diagram that illustrates the configuration of a moving picture decoding device executing a motion vector predicting method according to an embodiment.
Figure 4D:
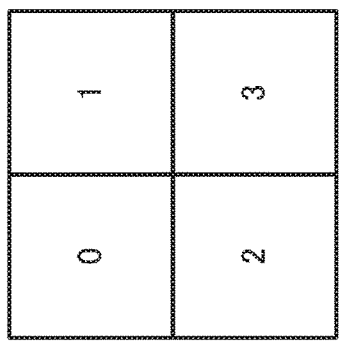
FIGS. 4A to 4D are diagrams that illustrate partition modes of prediction blocks.
Figure 4C:
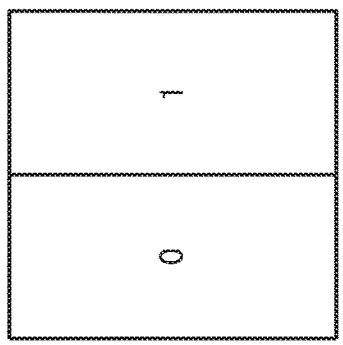
Figure 4B:
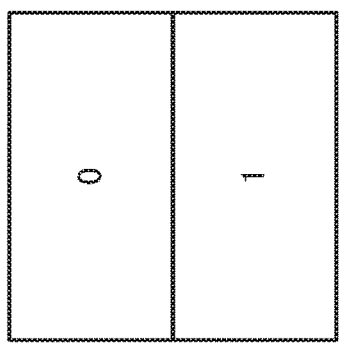
Figure 4A:
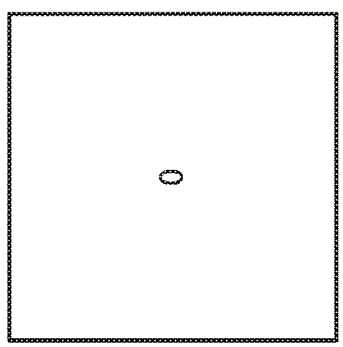

FIG. 2 is a block diagram that illustrates the configuration of a moving picture decoding device according to an embodiment of the present invention that corresponds to the moving picture coding device illustrated in FIG. 1. The moving picture decoding device according to the embodiment includes: a separation unit 201; a first bitstream decoding unit 202; a second bitstream decoding unit 203; a motion vector calculating unit 204; an inter prediction information estimating unit 205; motion compensation unit 206; an inverse quantization and inverse orthogonal transform unit 207; a decoded picture signal superimposing unit 208; a coding information storing memory 209, and a decoded picture memory 210.

Since the decoding process of the moving picture decoding device illustrated in FIG. 2 corresponds to the coding process provided inside the moving picture coding device illustrated in FIG. 1, the configurations of the motion compensation unit 206, the inverse quantization and inverse orthogonal transform unit 207, the decoded picture signal superimposing unit 208, the coding information storing memory 209, and the decoded picture memory 210 illustrated in FIG. 2 have functions that respectively correspond to the configurations of the motion compensation predicting unit 105, the inverse quantization and inverse orthogonal transform unit 112, the decoded picture signal superimposing unit 113, the coding information storing memory 114, and the decoded picture memory 115 of the moving picture coding device illustrated in FIG. 1.

The bitstream supplied to the separation unit 201 is separated in accordance with a regulated syntax rule, and separated bitstreams are supplied to the first bitstream decoding unit 202 and the second bitstream decoding unit 203.

The first bitstream decoding unit 202 decodes the supplied bitstreams, thereby acquiring information in units of sequences, pictures, slices, and coding blocks and the coding information in units of prediction blocks. More specifically, coding information such as information relating to a prediction mode PredMode used for determining the inter prediction PRED_INTER or the intra prediction PRED_INTRA in units of coding blocks, a partition mode PartMode, in the case of the inter prediction PRED_INTER, a flag used for determining the merge mode or not, in the case of the merge mode, a merge index, in the case of a non-merge mode, an inter prediction mode, a motion vector predictor index, a motion vector difference, and the like is decoded in accordance with a regulated syntax rule to be described later, and the coding information is supplied to the motion vector calculating unit 204 or the inter prediction information estimating unit 205.

The second bitstream decoding unit 203 calculates an orthogonally transformed and quantized residual signal by decoding the supplied bitstream and supplies the orthogonally transformed and quantized residual signal to the inverse quantization and inverse orthogonal transform unit 207.

In a case where the prediction block that is the decoding target is not the merge mode, the motion vector calculating unit 204, by using the coding information of a picture signal, which has already been decoded, stored in the coding information storing memory 209, calculates a plurality of motion vector predictor candidates so as to generate a motion vector predictor list to be described later, selects a motion vector predictor according to a motion vector predictor index that is decoded and supplied by the first bitstream decoding unit 202 from among the plurality of motion vector predictor candidates added to the constructed motion vector predictor list, calculates a motion vector based on the differential vector decoded by the first bitstream decoding unit 202 and the selected motion vector predictor, supplies the motion vector to the motion compensation unit 206 together with the other coding information, and stores the motion vector in the coding information storing memory 209. The coding information of the prediction block that is supplied and stored here includes the prediction mode PredMode, the partition mode PartMode, the flags predFlagL0 and predFlagL1 respectively representing whether to use the L0 prediction and whether to use the L1 prediction, the reference indexes refIdxL0 and refIdxL1 of the reference lists L0 and L1, the motion vectors mvL0 and mvL1 of the reference lists L0 and L1, and the like. Here, in a case where the prediction mode PredMode is the intra prediction MODE_INTRA, both the flag predFlagL0 representing whether to use the L0 prediction and the flag predFlagL1 representing whether to use the L1 prediction are "0". On the other hand, in a case where the prediction mode PredMode is the inter prediction MODE_INTER, and the inter prediction mode is the L0 prediction Pred_L0, the flag predFlagL0 representing whether to use the L0 prediction is "1", and the flag predFlagL1 representing whether to use the L1 prediction is "0". In addition, in a case where the inter prediction mode is the L1 prediction Pred_L1, the flag predFlagL0 representing whether to use the L0 prediction is "0", and the flag predFlagL1 representing whether to use the L1 prediction is "1". In a case where the inter prediction mode is the bi-prediction Pred_BI, both the flag predFlagL0 representing whether to use the L0 prediction and the flag predFlagL1 representing whether to use the L1 prediction are "1". The configuration and the operation of the motion vector calculating unit 204 will be described in detail later.

When the prediction block that is the decoding target is in the merge mode, the inter prediction information estimating unit 205 estimates the inter prediction information of the merge mode. By using the coding information of the prediction block, which has already been decoded, stored in the coding information storing memory 114, a plurality of merge candidates are calculated so as to construct a merge candidate list, selects a merge candidate corresponding to the merge index that is decoded and supplied by the first bitstream decoding unit 202 from among the plurality of merge candidates added to the constructed merge candidate list, the inter prediction information such as the prediction mode PredMode of the selected merge candidate, the partition mode PartMode, the flags respectively representing whether to use the L0 prediction and whether to use the L1 prediction, and the reference indexes of the reference lists L0 and L1, and the motion vectors of the reference lists L0 and L1, and the like is supplied to the motion compensation unit 206 and is stored in the coding information storing memory 209.

The motion compensation unit 206 generates a predicted picture signal by making motion compensation based on the reference picture by using the motion vector calculated by the motion vector calculating unit 204 and supplies the generated predicted picture signal to the decoded picture signal superimposing unit 208. In addition, in the case of the bi-prediction Pred_BI, two motion-compensated predicted picture signals of the L0 and L1 predictions are adaptively multiplied by weighting coefficients and are superimposed together, whereby a final predicted picture signal is generated.

The inverse quantization and inverse orthogonal transform unit 207 performs an inverse orthogonal transform and inverse quantization of the orthogonally transformed and quantized residual signal decoded by the first bitstream decoding unit 202, thereby acquiring an inversely orthogonally transformed and inversely quantized residual signal.

The decoded picture signal superimposing unit 208 decodes a decoding picture signal by superimposing the predicted picture signal that is acquired by the motion compensation unit 206 through motion compensation and the residual signal that is inversely orthogonally transformed and inversely quantized by the inverse quantization and inverse orthogonal transform unit 207 together and stores the decoding picture signal in the decoded picture memory 210. When the decoding picture signal is stored in the decoded picture memory 210, there is also a case where a filtering process decreasing a distortion such as a block distortion according to coding is performed for the decoded picture, and the processed decoded picture is stored in the decoded picture memory 210.

(Syntax)

Next, the syntax that is a rule common to the coding process and the decoding process of a bitstream of a moving picture that is coded by a moving picture coding device including the motion vector predicting method according to this embodiment and is decoded by a decoding device will be described.

Figure 10:
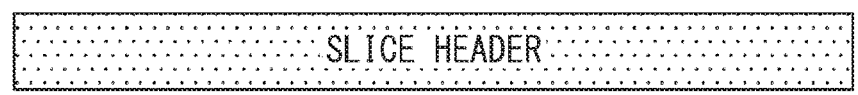
FIG. 10 is a diagram that illustrates the syntax of a bitstream at a slice level relating to a motion vector predicting method.

FIG. 10 illustrates the structure of a first syntax described in a slice header in units of slices of a bitstream generated in accordance with this embodiment. Here, only syntax elements relating to this embodiment are illustrated. In a case where the slice type is B, a flag collocated_from.sub.-10_flag that represents one of the reference lists L0 and L1 in which a picture colPic of a different time used when a motion vector predictor candidate of the time direction or a merge candidate is calculated is defined is arranged. The flag collocated_from.sub.-10_flag will be described in detail later.

In addition, the above-described syntax elements may be arranged in a picture parameter set that describes the syntax elements set in units of pictures.

Figure 11:
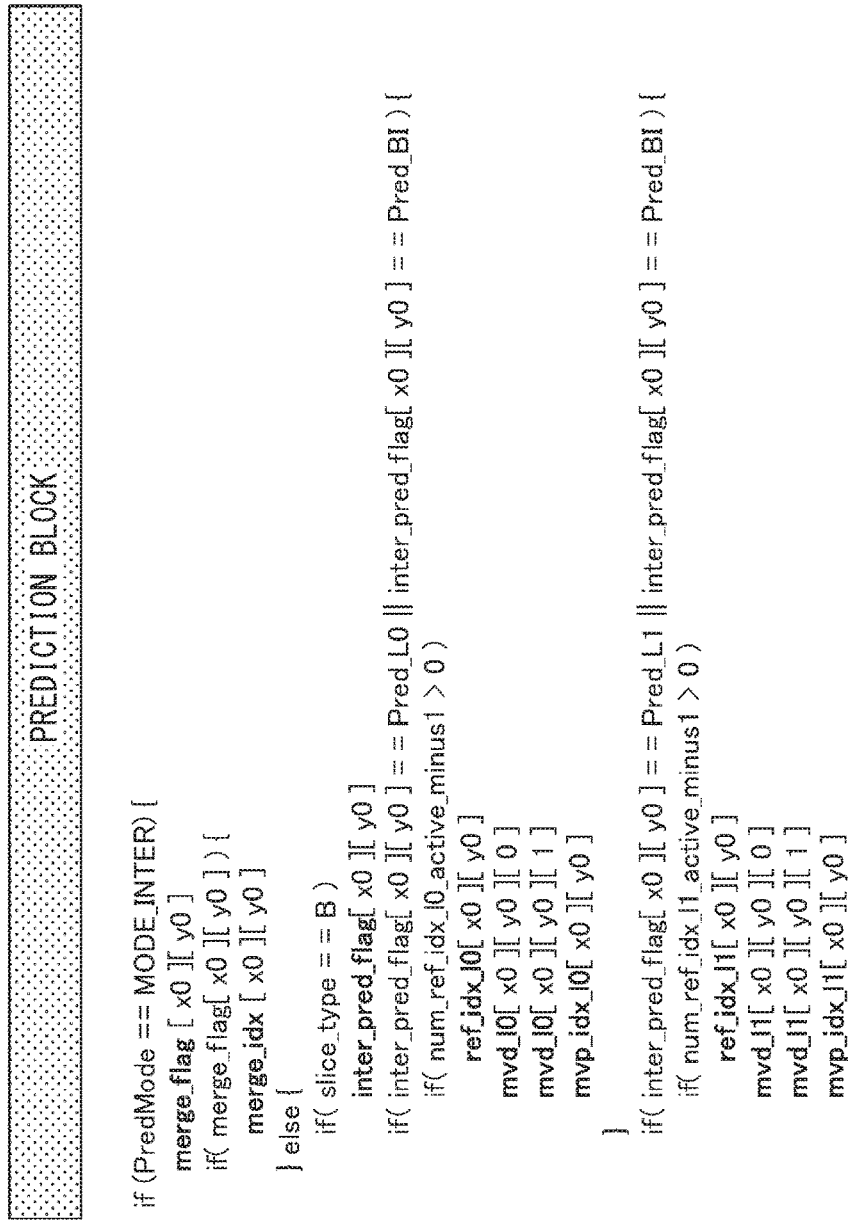
FIG. 11 is a diagram that illustrates the syntax of a bitstream at a prediction block level relating to a motion vector predicting method.

FIG. 11 illustrates the pattern of the syntax described in units of prediction blocks. In a case where the value of the prediction mode PredMode of a prediction block represents the inter prediction MODE_INTER, a flag merge_flag[x0][y0] that represents a merge mode or not is arranged. Here, x0 and y0 are indexes representing the position of an upper left pixel of the prediction block within the picture of the luminance signal, and the flag merge_flag[x0] [y0] is a flag that represents whether or not the mode is a merge mode of the prediction block positioned at (x0, y0) within the picture.

Next, in a case where the flag merge_flag[x0] [y0] is "1", it represents the merge mode, and a syntax element merge_idx[x0] [y0] of an index of a merge list that is a list of merge candidates to be referred to is arranged. Here, x0 and y0 are indexes that represent the position of an upper left pixel of the prediction block within the picture, and the syntax element merge_idx[x0] [y0] is a merge index of the prediction block positioned at (x0, y0) within the picture.

On the other hand, in a case where the flag merge_flag[x0] [y0] is "0", it represents that the mode is not the merge mode, and, in a case where the slice type is B, a syntax element inter_pred_flag[x0] [y0] specifying the inter prediction mode is arranged, and the L0 prediction Pred_L0, the L1 prediction Pred_L1, or the bi-prediction Pred_BI is identified using this syntax element. In accordance with the inter prediction mode, for each of the reference lists L0 and L1, a syntax element ref_idx.sub.-10[x0] [y0] or ref_idx.sub.-11[x0] [y0] of the reference index used for specifying the reference picture and a syntax element mvd.sub.-10[x0] [y0] [j] or mvd.sub.-11[x0] [y0] [j] of a motion vector difference that is a difference between the motion vector of the prediction block acquired in the motion vector detecting process and the motion vector predictor are arranged. Here, x0 and y0 are indexes that represent the position of an upper left pixel of the prediction block within the picture, ref_idx.sub.-10[x0] [y0] and mvd.sub.-10[x0] [y0] [j] are the reference index L0 and a motion vector difference of the prediction block positioned at (x0, y0) within the picture, and ref_idx.sub.-11[x0] [y0] and mvd.sub.-11[x0] [y0] [j] are the reference index L1 and a motion vector difference of the prediction block positioned at (x0, y0) within the picture. In addition, j represents a component of the motion vector difference. Thus, an x component is represented in a case where j is "0", and a y component is represented in a case where j is "1". Next, syntax elements mvp_idx.sub.-10[x0] [y0] and mvp_idx.sub.-11[x0] [y0] of the indexes of the motion vector predictor list that is a list of motion vector predictors to be referred to are arranged. Here, x0 and y0 are indexes that represent the position of an upper left pixel of the prediction block within the picture, and mvp_idx.sub.-10[x0] [y0] and mvp_idx.sub.-11[x0] [y0] are motion vector predictor indexes of the reference indexes L0 and L1 of the prediction block positioned at (x0, y0) within the picture.

The motion vector predicting method according to an embodiment is used in the motion vector difference calculating unit 103 of the moving picture coding device illustrated in FIG. 1 and the motion vector calculating unit 204 of the moving picture decoding device illustrated in FIG. 2.

The motion vector predicting method according to the embodiment will be described with reference to the figures. The motion vector predicting method is used in any of the coding process and the decoding process in units of prediction blocks that configure a coding block. In a case where the prediction mode of the prediction block is the inter prediction MODE_INTER, and the mode is not the merge mode, in the case of coding, the motion vector predicting method is used when a motion vector predictor is derived by using a coded motion vector that is used when a motion vector difference coded from a motion vector that is the coding target. In addition, in the case of decoding, the motion vector predicting method is used when a motion vector predictor is derived by using a decoded motion vector used when a motion vector of the decoding target is calculated.

(Prediction of Motion Vector in Coding)

In the moving picture coding device that codes a bitstream of a moving picture based on the above-described syntax, the operation of the motion vector predicting method according to the embodiment will be described. In a case where motion compensation is made in units of slices, in other words, in a case where the slice type is a P slice (one-directional prediction slice) or a B slice (bi-directional prediction slice), and the prediction mode of the prediction block within the slice is the inter prediction MODE_INTER, the motion vector predicting method is applied to a prediction block used for coding or decoding a motion vector difference that is not in the merge mode.

Figure 12:
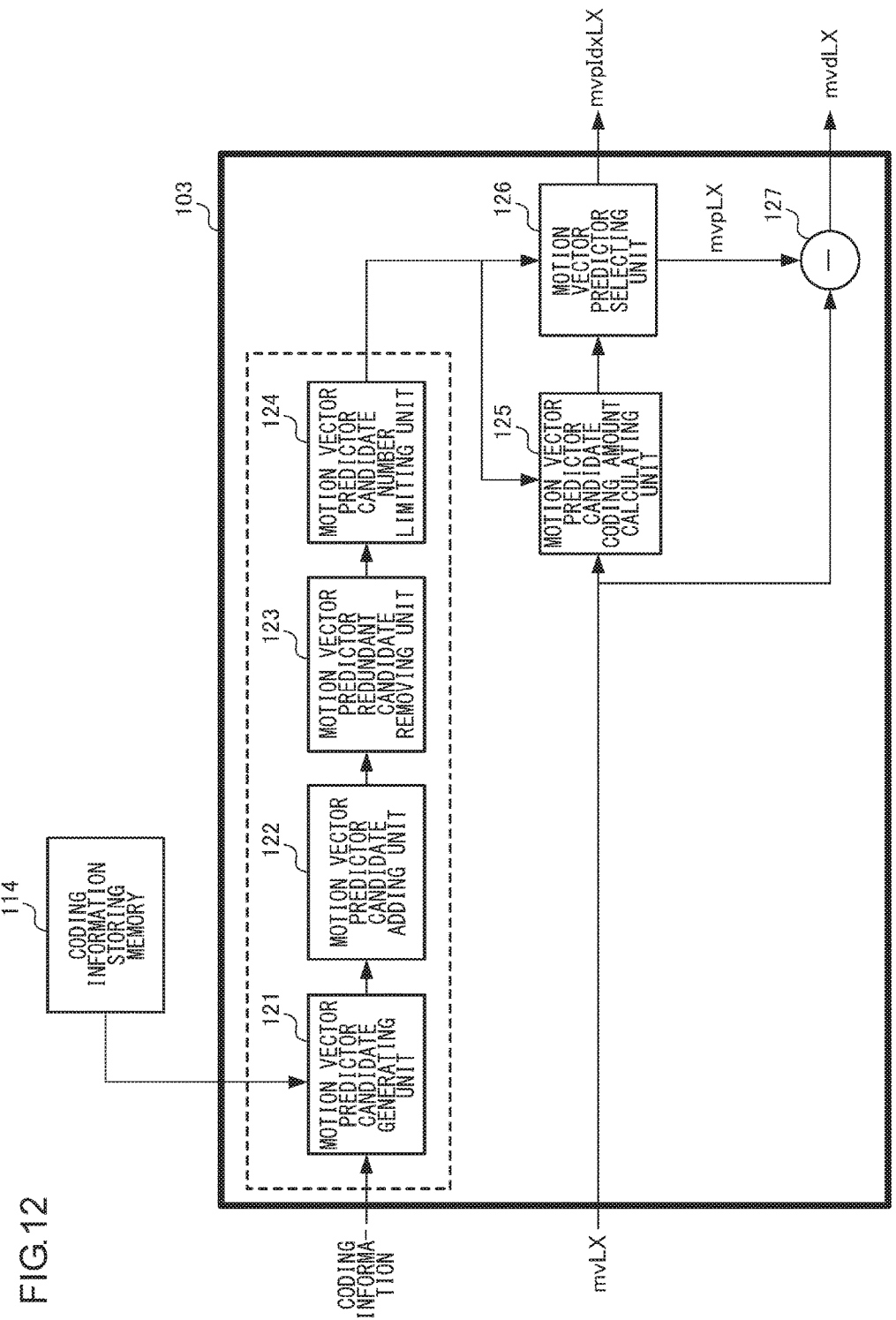
FIG. 12 is a block diagram that illustrates a detailed configuration of a motion vector difference calculating unit illustrated in FIG. 1.

FIG. 12 is a diagram that illustrates a detailed configuration of the motion vector difference calculating unit 103 of the moving picture coding device illustrated in FIG. 1. A portion of FIG. 12 that is surrounded by a thick frame line illustrates the motion vector difference calculating unit 103.

In addition, a portion that is surrounded by a thick dotted line on the inside thereof illustrates operating units according to the motion vector predicting method to be described later and is similarly installed to a moving picture decoding device corresponding to the moving picture coding device according to the embodiment, so that the same determination result having no contradiction between the coding process and the decoding process is acquired. Hereinafter, the motion vector predicting method in the coding process will be described with reference to this drawing.

The motion vector difference calculating unit 103 includes: a motion vector predictor candidate generating unit 121; a motion vector predictor candidate adding unit 122; a motion vector predictor redundant candidate removing unit 123; a motion vector predictor candidate number limiting unit 124; a motion vector predictor candidate coding amount calculating unit 125; a motion vector predictor selecting unit 126; and a motion vector subtraction unit 127.

In a motion vector difference calculating process performed by the motion vector difference calculating unit 103, motion vector differences of motion vectors used in an inter prediction method selected for the coding target block are calculated for the reference lists L0 and L1. More specifically, in a case where the prediction mode PredMode of the coding target block is the inter prediction MODE_INTER, and the inter prediction mode of the coding target block is the L0 prediction Pred_L0, a motion vector predictor list mvpListL0 of the reference list L0 is calculated, a motion vector predictor mvpL0 is selected, and a motion vector difference mvdL0 of the motion vector of the reference list L0 is calculated. On the other hand, in a case where the inter prediction mode Pred_L1 of the coding target block is the L1 prediction, a motion vector predictor list mvpListL1 of the reference list L1 is calculated, a motion vector predictor mvpL1 is selected, and a motion vector difference mvdL1 of the motion vector of the reference list L1 is calculated. In addition, in a case where the inter prediction mode of the coding target block is the bi-prediction Pred_BI, both the L0 prediction and the L1 prediction are performed, whereby a motion vector predictor list mvpListL0 of the reference list L0 is calculated, a motion vector predictor mvpL0 of the reference list L0 is selected, and a motion vector difference mvdL0 of the motion vector mvL0 of the reference list L0 is calculated, and a motion vector predictor list mvpListL1 of the reference list L1 is calculated, a motion vector predictor mvpL1 of the reference list L1 is calculated, and a motion vector difference mvdL1 of the motion vector mvL1 of the reference list L1 is calculated.

While the motion vector difference calculating process is performed for each of the reference lists L0 and L1, the motion vector difference calculating process is common to both the reference lists L0 and L1. Accordingly, in the following description, L0 and L1 will be denoted by common LX. In the motion vector difference calculating process of the reference list L0, X is "0", and in the motion vector difference calculating process of the reference list L1, X is "1". In addition, during the motion vector difference calculating process of the reference list LX, in a case where information of not the reference list LX but information of the other list is referred to, the other list will be denoted by LY.

The motion vector predictor candidate generating unit 121, for each of the reference lists L0 and L1, from three prediction block groups including: a prediction block group (a prediction block group neighboring to the left side of the prediction block within the picture of the prediction block that is the coding target; A0 and A1 illustrated in FIG. 5) neighboring to the left side; a prediction block group (a prediction block group neighboring to the upper side of the prediction block within the picture of the prediction block that is the coding target; B0, B1, and B2 illustrated in FIG. 5) neighboring to the upper side; and a prediction block group of a different time (a prediction block group, which has already been coded, present at the same position as that of a prediction block that is the coding target or at a position neighboring thereto in a picture of a time different from the time of the prediction block; T0 and T1 illustrated in FIG. 9), derives one motion vector mvLXCol, mvLXA, and mvLXB for each prediction block group, sets the derived motion vectors as motion vector predictor candidates, and supplies the motion vector predictor candidates to the motion vector predictor candidate adding unit 122. Hereinafter, the motion vector mvLXCol will be referred to as a time motion vector predictor candidate, and the motion vectors mvLXA and mvLXB will be referred to as spatial motion vector predictor candidates. When the motion vector predictor candidates are calculated, the coding information such as the reference index and the POC of the prediction block that is the coding target, the prediction mode of a coded prediction block that is stored in the coding information storing memory 114, the reference index for each reference list, the POC of the reference picture, the motion vector, and the like is used.

The motion vector predictor candidates mvLXCol, mvLXA, and mvLXB may be derived by performing scaling in accordance with the relationship between the POC of the coding target picture and the POC of the reference picture.

The motion vector predictor candidate generating unit 121, for each prediction block group, in a predetermined order, makes a determination of a condition to be described later for the prediction block within each prediction block group, selects a motion vector of the prediction block that satisfies the condition first, and sets the selected motion vectors as the motion vector predictor candidates mvLXCol, mvLXA, and mvLXB.

In order to calculate a motion vector predictor from a prediction block group neighboring to the left side, in the order (the order of A0 and A1 from A0 illustrated in FIG. 5)

of the lower side to the upper side of the prediction block group neighboring to the left side, in order to calculate a motion vector predictor from a prediction block group neighboring to the upper side, in the order (the order of B0, B1, and B2 from B0 illustrated in FIG. 5) of the right side to the left side of the prediction block group neighboring to the upper side, and in order to calculate a motion vector predictor from a prediction block group of a different time, in the order of T0 and T1 from T0 illustrated in FIG. 9, a determination of the condition to be described later is made for each prediction block, a motion vector of the prediction block satisfying the condition first is selected, and the motion vector predictor candidates are set as mvLXCol, mvLXA, and mvLXB.

In other words, in the left neighboring prediction block group, a lowest prediction block has the highest priority level, and the priority level is assigned from the lower side to the upper side. In addition, in the upper neighboring prediction block group, a rightmost prediction block has the highest priority level, and the priority level is assigned from the right side to the left side. In the prediction block group of a different time, the prediction block T0 has the highest priority level, and the priority level is assigned in order of T0 and T1.

(Loop of Condition Determination of Spatial Prediction Block)

For the left neighboring prediction block group, condition determinations are applied with the priority levels of condition determinations 1, 2, 3, and 4 described below. Meanwhile, for the upper neighboring prediction block group, condition determinations are applied with the priority levels of condition determinations 1 and 2 described below.

<Condition Determination>

Condition Determination 1: In a reference list LX that is the same as that of the motion vector of the reference list LX, which is the motion vector difference calculation target, of the prediction block that is the coding/decoding target, a prediction using the same reference index, in other words, the same reference picture is made also in a neighboring prediction block. Condition Determination 2: While the reference list LY is different from that of the motion vector of the reference list LX of the motion vector difference calculation target of the prediction block that is the coding/decoding target, a prediction using the same reference picture is performed in a neighboring prediction block. Condition Determination 3: By using the reference list LX that is the same as that of the motion vector of the reference list LX of the motion vector difference calculation target of the prediction block that is the coding/decoding target, a prediction using a different reference picture is performed for a neighboring prediction block. Condition Determination 4: By using the reference list LY different from the motion vector of the reference list LX of the motion vector difference calculation target of the prediction block that is the coding/decoding target, a prediction using a different reference picture is performed for a neighboring prediction block.

In a case where any one of such conditions is satisfied, a motion vector satisfying the condition is employed as a prediction vector candidate in the prediction block, and the subsequent condition determinations are not made. In addition, in a case where the condition of Condition Determination 1 or Condition Determination 2 is satisfied, the motion vector of the corresponding neighboring prediction block is the same as the reference picture of the coding target prediction block and is directly set as the motion vector predictor candidate. On the other hand, in a case where the condition of Condition Determination 3 or 4 is satisfied, the motion vector of the corresponding neighboring prediction block is different from the reference picture of the prediction block that is the coding target, and accordingly, the motion vector predictor candidate is calculated by performing scaling based on the motion vector.

The above-described four condition determinations are made by scanning prediction blocks within the prediction block group in the following sequence, whereby a prediction vector is determined.

<Prediction Vector Scanning Sequence>

The determination of the motion vector predictor using the same reference picture for which scaling calculation is not necessary is configured to the priority, and two condition determinations out of the four condition determinations are made for each prediction block, and, in a case where the conditions are not satisfied, the next condition determination of the prediction block is made. First, Condition Determinations 1 and 2 are made for each prediction block disposed within the neighboring prediction block group, and next, Condition Determinations 3 and 4 are made for each prediction block disposed within the neighboring prediction block group.

More specifically, the condition determinations are made in the following priority levels (here, N is A or B).

1. Condition Determination 1 of Prediction Block N0 (the same reference list LX and the same reference picture) 2. Condition Determination 2 of Prediction Block N0 (a different reference list LY and the same reference picture) 3. Condition Determination 1 of Prediction Block N1 (the same reference list LX and the same reference picture) 4. Condition Determination 2 of Prediction Block N1 (a different reference list LY and the same reference picture) 5. Condition Determination 1 of Prediction Block N2 (the same reference list LX and the same reference picture) 6. Condition Determination 2 of Prediction Block N2 (a different reference list LY and the same reference picture) 7. Condition Determination 3 of Prediction Block N0 (the same reference list LX and a different reference picture) 8. Condition Determination 4 of Prediction Block N0 (a different reference list LY and a different reference picture) 9. Condition Determination 3 of Prediction Block N1 (the same reference list LX and a different reference picture) 10. Condition Determination 4 of Prediction Block N2 (a different reference list LY and a different reference picture) 11. Condition Determination 3 of Prediction Block N1 (the same reference list LX and a different reference picture) 12. Condition Determination 4 of Prediction Block N2 (a different reference list LY and a different reference picture)

By performing the scanning as described above, a motion vector predictor, which has high prediction accuracy, using the same reference picture for which the scaling calculation is not necessary can be easily selected, and accordingly, the coding amount of the motion vector difference decreases, and there is an advantage of improving the coding efficiency.

Here, in the left neighboring prediction block group, the group is configured by two prediction blocks, and accordingly, the sequences of 5, 6, 11, and 12 of the above-described scanning are not performed.

In addition, in the upper neighboring prediction block group, the group is configured by three prediction blocks, and accordingly, the sequences of 1 to 12 of the above-described scanning can be performed. However, in the present invention, only the sequences 1 to 6 of the above-described scanning are performed, but the sequences 7 to 12 are not performed (Condition Determinations 3 and 4 are not made). In other words, in the upper neighboring prediction block group, the scanning under the condition for which the scaling calculation is necessary is omitted.

In this way, the scaling calculation for which the division of the upper neighboring prediction block group is necessary can be omitted, and accordingly, the scaling calculation can be limited only to the prediction vector candidates of the left neighboring prediction block group. In a case where the left neighboring prediction block group and the upper neighboring prediction block group are processed in a parallel manner, as a spatial prediction vector candidate, only one scaling calculation circuit may be included, whereby the circuit scale can be reduced. In addition, in the case where the left neighboring prediction block group and the upper neighboring prediction block group are processed in a parallel manner, a difference in the processing amount according to a difference in the number of configured prediction blocks within the neighboring prediction block group can be decreased. In other words, by omitting the process of the scaling calculating of the upper neighboring prediction block group of which the number of prediction blocks is large, the maximal calculation amount at which a bottle neck phenomenon occurs can be reduced. As a result, a difference between the calculation amount of the left neighboring prediction block group and the calculation amount of the upper neighboring prediction block group decreases, whereby the parallel processing can be efficiently performed.

The flow of the above-described process will be described in detail with reference to flowcharts illustrated in FIGS. 17 to 21.

The derivation of motion information from a neighboring block will be described. In this embodiment, a line buffer and a block buffer in which the motion information is stored are arranged. In a case where the motion information is derived from a prediction block neighboring to the left side, the motion information is derived from the block buffer, and, for a prediction block neighboring to the upper side, in a case where the prediction block neighboring to the upper side is within the tree block, similarly to the case of the prediction block neighboring to the left side, the motion information is derived from the block buffer. On the other hand, in a case where the prediction block neighboring to the upper side is disposed outside the tree block, the motion information is derived from the line buffer.

Here, in order to decrease the amount of usage of the internal memory by reducing the size of the line buffer of the motion information, the size of the line buffer in which the motion information is stored is compressed to ½ in the horizontal direction. More specifically, in order to predict a motion vector of a neighboring block that has not been coded, while the block buffer stores the motion information in a minimal unit (for example, a 4.times.4 block) of the motion compensation so as to be prepared for an access from a neighboring block, the line buffer thins out motion information in a unit (for example, a 4.times.8 block) that is twice the minimal unit of the motion compensation in the horizontal direction and stores the thinned out motion information in the line buffer. Accordingly, in a case where a block neighboring in the vertical direction is disposed outside the tree block, there is a possibility of deriving motion information that is different from the actual motion information of the block. In other words, by compressing the size of the line buffer of the motion information to ½ in the horizontal direction, consequently, a motion vector predictor derived from the prediction block group neighboring to the upper side has reliability of the motion vector predictor lower than the motion vector predictor derived from the prediction block group neighboring to the left side. One of the reasons for omitting the scanning under the condition at which the scaling calculation is necessary in the prediction block group neighboring to the upper side is that, even when the scaling calculation of the motion vector predictor from the prediction block group neighboring to the upper side is omitted by reducing the size of the line buffer, there is a low influence on the coding efficiency.

Here, while the compression ratio of the line buffer has been described as ½, apparently, as the compression ratio increases, the reliability of the motion vector predictor derived from the prediction block group neighboring to the upper side is lowered, and accordingly, the effect of omitting scanning under a condition at which the scaling calculation is necessary in the prediction block group neighboring to the upper side is improved.

The calculation of the prediction vector candidate mvLXCol from the prediction block group of a different time will be described later in detail with reference to flowcharts illustrated in FIGS. 24 to 30.

Description will be presented with reference back to FIG. 12. Next, the motion vector predictor candidate adding unit 122 stores the calculated motion vector predictor candidates mvLXCol, mvLXA, and mvLXB in the motion vector predictor list mvpListLX.

Next, the motion vector predictor redundant candidate removing unit 123 compares the motion vector values of the motion vector predictor candidates that are stored in the motion vector predictor list mvpListLX of the reference list LX with each other, determines motion vector predictor candidates having the same motion vector values out of the motion vector predictor candidates, leaves a first one of the motion vector predictor candidates determined to have the same motion vector values, and removes the other motion vector predictor candidates from the motion vector predictor list mvpListLX so as not to allow the motion vector predictor candidates to be redundant, thereby updating the motion vector predictor list mvpListLX.

The motion vector predictor candidate number limiting unit 124 counts the number of the motion vector predictor candidates added in the motion vector predictor list mvpListLX of the reference list LX and sets the number numMVPCandLX of the motion vector predictor candidates of the reference list LX to the value of the number of counted candidates.

In addition, the motion vector predictor candidate number limiting unit 124 fixes the number numMVPCandLX of the motion vector predictor candidates of the reference list LX added in the motion vector predictor list mvpListLX of the reference list LX to a set final number finalNumMVPCand of candidates.

In this embodiment, the final number finalNumMVPCand of candidates is set to "2". The reason for fixing the number of prediction vector candidates is that, when the number of motion vector predictor candidates added in the motion vector predictor list varies in accordance with the construction state of the motion vector predictor list, unless the motion vector predictor list is constructed on the decoding side, entropy decoding of the motion vector predictor index cannot be performed. Accordingly, the dependency between the construction of the motion vector predictor list and the entropy decoding occurs, and there is a possibility of the occurrence of a waiting time for the entropy decoding. In addition, in a case where the entropy decoding depends on the construction state of the motion vector predictor list including the motion vector predictor candidate mvLXCol derived from the prediction block of a picture of a different time, when an error occurs at the time of decoding the bitstream of a different picture, the bitstream of the present picture is influenced by the error, and accordingly, there is a problem in that the entropy decoding cannot be normally continued. By setting the final number finalNumMVPCand of candidates to a fixed number, the entropy decoding of the motion vector predictor index can be performed independently from the construction of the motion vector predictor list, and, even when an error occurs at the time of decoding the bitstream of a different picture, the entropy decoding of the bitstream of the present picture can be continued without having the influence thereof.

In a case where the number numMVPCandLX of the motion vector predictor candidates of the reference list LX is smaller than the set final number finalNumMVPCand of candidates, the motion vector predictor candidate number limiting unit 124 adds motion vectors having a value of (0, 0) to the motion vector predictor list mvpListLX until the number numMVPCandLX of motion vector predictor candidates is the same as the final number finalNumMVPCand of candidates, thereby limiting the number of the motion vector predictor candidates to the set value. In this case, while the motion vectors having the value of (0, 0) may be redundantly added, even when the motion vector predictor index has a specific value within a range from "0" to (set number of candidates-1), the motion vector predictor can be determined on the decoding side. On the other hand, in a case where the number numMVPCandLX of motion vector predictor candidates of the reference list LX is larger than the set final number finalNumMVPCand of the candidates, all the elements added in indexes larger than "finalNumMVPCand-1" are removed from the motion vector predictor list mvpListLX so as to allow the number numMVPCandLX of the motion vector predictor candidates of the reference list LX to be the same as the final number finalNumMVPCand of candidates, whereby the number of the motion vector predictor candidates is limited to the set value. The updated motion vector predictor list mvpListLX is supplied to the motion vector predictor candidate coding amount calculating unit 125 and the motion vector predictor selecting unit 126.

Meanwhile, the motion vector detecting unit 102, which is illustrated in FIG. 1, detects a motion vector mvLX of the reference list LX (here, X=0 or 1) for each prediction block. Such a motion vector mvLX is supplied to the motion vector predictor candidate coding amount calculating unit 125 together with the motion vector predictor candidates of the updated motion vector predictor list mvpListLX.

The motion vector predictor candidate coding amount calculating unit 125 calculates a motion vector difference with respect to the motion vector mvLX for each motion vector predictor candidate mvpListLX [i] stored in the motion vector predictor list mvpListLX of the reference list LX (here, X=0 or 1), respectively calculates the coding amounts when the motion vector differences are coded, and supplies them to the motion vector predictor selecting unit 126.

The motion vector predictor selecting unit 126 selects a motion vector predictor candidate mvpListLX [i], for which the coding amount is the minimum of the coding amounts for the motion vector predictor candidates, from among elements added in the motion vector predictor list mvpListLX of the reference index LX as the motion vector predictor mvpLX of the reference list LX. In a case where there are a plurality of motion vector predictor candidates, for which the generated coding amount is the minimum, in the motion vector predictor list mvpListLX, a motion vector predictor candidate mvpListLX [i] for which the index i included in the motion vector predictor list mvpListLX has a smallest value is selected as an optimal motion vector predictor mvpLX of the reference list LX. Then, the selected motion vector predictor mvpLX is supplied to the motion vector subtraction unit 127. In addition, the index i included in the motion vector predictor list corresponding to the selected motion vector predictor mvpLX is output as the motion vector predictor index mvpIdxLX of the reference list LX.

Finally, the motion vector subtraction unit 127 calculates a motion vector difference mvdLX of the reference list LX by subtracting the selected motion vector predictor mvpLX of the reference list LX from the motion vector mvLX of the reference list LX and outputs the motion vector difference mvdLX.

$$mvdLX = mvLX - mvpLX$$

Referring back to FIG. 1, the motion compensation predicting unit 105 acquires a predicted picture signal by performing motion compensation in accordance with the motion vector mvLX of the reference list LX (here, X=0 or 1) supplied from the motion vector detecting unit 102 by referring to a picture signal of a decoded picture that is stored in the decoded picture memory 115 and supplies the acquired predicted picture signal to the prediction method determining unit 106.

The prediction method determining unit 106 determines a prediction method. A coding amount and a coding distortion are calculated for each prediction mode, and a prediction block size and a prediction mode for which the generated coding amount and the coding distortion are the smallest are determined. The coding amount of the motion information is calculated by coding the motion vector difference mvdLX of the reference list LX supplied from the motion vector subtraction unit 127 of the motion vector difference calculating unit 103 and the motion vector predictor index mvpIdxLX of the reference list LX representing the motion vector predictor supplied from the motion vector predictor selecting unit 126. In addition, the coding amount of a prediction residual signal that is acquired by coding a prediction residual signal between the predicted picture signal supplied from the motion compensation predicting unit 105 and the coding target picture signal supplied from the picture memory 101 is calculated. Then, a total generated coding amount acquired by adding the coding amount of the motion information and the coding amount of the prediction residual signal is calculated and is set as a first evaluation value.

In addition, after such a prediction residual signal is coded, the coded prediction residual signal is decoded for the evaluation of the distortion amount, and a coding distortion is calculated as a rate that represents an error from the original picture signal that occurs in accordance with the coding. By comparing the total generated coding amounts and the coding distortions of motion compensations with each other, the prediction block size and the prediction mode for which the generated coding amount and the coding distortion are the smallest are determined. The prediction method of the motion vector described above is used for the motion vector mvLX according to the prediction mode of the determined prediction block size, and an index mvpIdxLX representing the motion vector predictor is coded as a syntax element mvp_idx.sub.-1X[i] that is represented as a second syntax pattern in units of prediction blocks. In addition, while the generated coding amount calculated here is preferably acquired by simulating the coding process, the generated coding amount may be approximated in a simple manner or be roughly estimated.

(Prediction of Motion Vector in Decoding)

In a moving picture decoding device that decodes the bitstream of a coded moving picture based on the above-described syntax, the operation according to the motion vector predicting method of the present invention will now be described.

Figure 13:
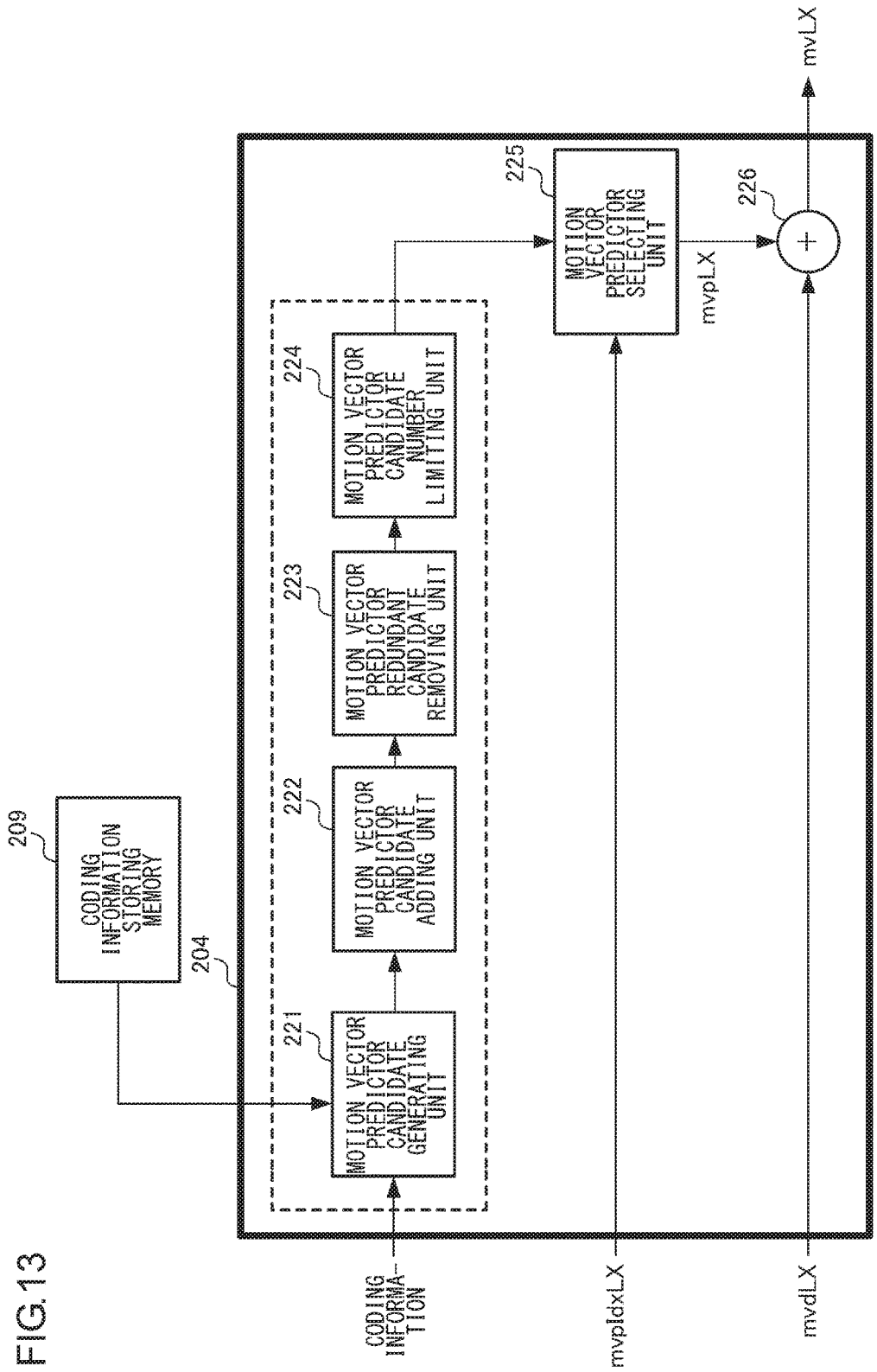
FIG. 13 is a block diagram that illustrates a detailed configuration of a motion vector calculating unit illustrated in FIG. 2.

In a case where the motion vector predicting method according to an embodiment is performed, the process is performed by the motion vector calculating unit 204 of the moving picture decoding device illustrated in FIG. 2. FIG. 13 is a diagram that illustrates a detailed configuration of the motion vector calculating unit 204 of the moving picture decoding device illustrated in FIG. 2 that corresponds to the moving picture coding device according to the embodiment. A portion of FIG. 13 that is surrounded by a thick frame line illustrates the motion vector calculating unit 204. In addition, a portion that is surrounded by a thick dotted line on the inside thereof illustrates operating units according to the motion vector predicting method to be described later and is installed similarly to the moving picture coding device, so that the same determination result having no contradiction between the coding process and the decoding process is acquired. Hereinafter, the motion vector predicting method in the decoding process will be described with reference to this drawing.

The motion vector calculating unit 204 includes: a motion vector predictor candidate generating unit 221; a motion vector predictor candidate adding unit 222; a motion vector predictor redundant candidate removing unit 223; a motion vector predictor candidate number limiting unit 224; a motion vector predictor selecting unit 225; and a motion vector addition unit 226.

In a motion vector calculating process performed by the motion vector calculating unit 204, a motion vector used in the inter prediction is calculated for each of the reference lists L0 and L1. More specifically, in a case where the prediction mode PredMode of the coding target block is the inter prediction MODE_INTER, and the inter prediction mode of the coding target block is the L0 prediction Pred_L0, a motion vector predictor list mvpListL0 of the reference list L0 is calculated, a motion vector predictor mvpL0 is selected, and a motion vector mvL0 of the reference list L0 is calculated. On the other hand, in a case where the inter prediction mode of the coding target block is the L1 prediction Pred_L1, a motion vector predictor list mvpListL1 of the reference list L1 is calculated, a motion vector predictor mvpL1 is selected, and a motion vector mvL1 of the reference list L1 is calculated. In addition, in a case where the inter prediction mode of the coding target block is the bi-prediction Pred_BI, both the L0 prediction and the L1 prediction are performed, whereby a motion vector predictor list mvpListL0 of the reference list L0 is calculated, a motion vector predictor mvpL0 of the reference list L0 is selected, and a motion vector mvL0 of the reference list L0 is calculated, and a motion vector predictor list mvpListL1 of the reference list L1 is calculated, a motion vector predictor mvpL1 of the reference list L1 is calculated, and a motion vector mvL1 of the reference list L1 is calculated.

Similarly to the coding side, also on the decoding side, while the motion vector calculating process is performed for each of the reference lists L0 and L1, the motion vector calculating process is common to both the reference lists L0 and L1. Accordingly, in the following description, L0 and L1 will be denoted by common LX. In the motion vector calculating process of the reference list L0, X is "0", and in the motion vector calculating process of the reference list L1, X is "1". In addition, during the motion vector calculating process of the reference list LX, in a case where information of not the reference list LX but information of the other list is referred to, the other list will be denoted by LY.

The motion vector predictor candidate generating unit 221, the motion vector predictor candidate adding unit 222, the motion vector predictor redundant candidate removing unit 223, and the motion vector predictor candidate number limiting unit 224 arranged inside the motion vector calculating unit 204 are regulated to respectively perform the same operations of the motion vector predictor candidate generating unit 121, the motion vector predictor candidate adding unit 122, the motion vector predictor redundant candidate removing unit 123, and the motion vector predictor candidate number limiting unit 124 arranged inside the motion vector difference calculating unit 103 on the coding side, whereby the same motion vector predictor candidates having no contradiction between the coding side and the decoding side can be acquired on the coding side and the decoding device.

The motion vector predictor candidate generating unit 221 performs the same process as that of the motion vector predictor candidate generating unit 121 on the coding side illustrated in FIG. 12. The motion vectors of a decoded prediction block neighboring to the decoding target block within the picture of the decoding target block, a decoded prediction block present at the same position as that of the decoding target block or at a position neighboring thereto within a different picture, and the like, which are decoded and recorded in the coding information storing memory 209, are read from the coding information storing memory 209. From the motion vectors of a decoded different block read from the coding information storing memory 209, motion vector predictor candidates mvLXCol, mvLXA, and mvLXB are generated for each prediction block group and are supplied to the motion vector predictor candidate adding unit 222.

The motion vector predictor candidates mvLXCol, mvLXA, and mvLXB may be calculated by performing scaling in accordance with the reference index. Since the motion vector predictor candidate generating unit 221 performs the same process as that of the motion vector predictor candidate generating unit 121 on the coding side illustrated in FIG. 12, detailed description thereof will not be presented here.

Next, the motion vector predictor candidate adding unit 222 performs the same process as that of the motion vector predictor candidate adding unit 122 on the coding side illustrated in FIG. 12. The calculated motion vector predictor candidates mvLXCol, mvLXA, and mvLXB are stored in the motion vector predictor list mvpListLX of the reference list LX.

Next, the motion vector predictor redundant candidate removing unit 223 performs the same process as that of the motion vector predictor redundant candidate removing unit 123 on the coding side illustrated in FIG. 12. The motion vector predictor candidates having the same motion vector values out of the motion vector predictor candidates stored in the motion vector predictor list mvpListLX of the reference list LX are determined, a first one of the motion vector predictor candidates determined to have the same motion vector values is left, and the other motion vector predictor candidates are removed from the motion vector predictor list mvpListLX so as not to allow the motion vector predictor candidates to be redundant, whereby the motion vector predictor list mvpListLX is updated.

Next, the motion vector predictor candidate number limiting unit 224 performs the same process as that of the motion vector predictor candidate number limiting unit 124 on the coding side illustrated in FIG. 12. The motion vector predictor candidate number limiting unit 224 counts the number of elements added in the motion vector predictor list mvpListLX and sets the number numMVPCandLX of the motion vector predictor candidates of the reference list LX to the value of the number of counted candidates.

In addition, for the same reason described on the coding side, the motion vector predictor candidate number limiting unit 224 fixes the number numMVPCandLX of the motion vector predictor candidates of the reference list LX added in the motion vector predictor list mvpListLX to a final number finalNumMVPCand of candidates.

In this embodiment, the final number finalNumMVPCand of candidates is set to "2". In a case where the number numMVPCandLX of the motion vector predictor candidates of the reference list LX is smaller than the set final number finalNumMVPCand of candidates, motion vectors having a value of (0, 0) are added to the motion vector predictor list mvpListLX until the number numMVPCandLX of motion vector predictor candidates is the same as the final number finalNumMVPCand of candidates, thereby limiting the number of the motion vector predictor candidates to the set value. In this case, while the motion vectors having the value of (0, 0) may be redundantly added, even when the motion vector predictor index has a specific value within a range from "0" to "set value-1", the motion vector predictor can be determined on the decoding side. On the other hand, in a case where the number numMVPCandLX of motion vector predictor candidates of the reference list LX is larger than the set final number finalNumMVPCand of the candidates, all the elements added in indexes larger than "finalNumMVPCand-1" are removed from the motion vector predictor list mvpListLX so as to allow the number numMVPCandLX of the motion vector predictor candidates of the reference list LX to be the same as the final number finalNumMVPCand of candidates, whereby the number of the motion vector predictor candidates is limited to the set value. The updated motion vector predictor list mvpListLX is supplied to the motion vector predictor selecting unit 225.

Meanwhile, the motion vector difference mvdLX of the reference list LX (here, X=0 or 1) for each prediction block decoded by the first bitstream decoding unit 202 is supplied to the motion vector addition unit 226. In addition, the motion vector predictor index mvpIdxLX of the motion vector predictor of the reference list LX that is decoded by the first bitstream decoding unit 202 is supplied to the motion vector predictor selecting unit 225.

The motion vector predictor selecting unit 225 is supplied with the motion vector predictor index mvpIdxLX of the reference list LX decoded by the first bitstream decoding unit 202 and extracts a motion vector predictor candidate mvpListLX[mvpIdxLX] corresponding to the supplied index mvpIdxLX from the motion vector predictor list mvpListLX as the motion vector predictor mvpLX of the reference list LX. The supplied motion vector predictor candidate is supplied to the motion vector addition unit 226 as the motion vector predictor mvpLX.

Finally, the motion vector addition unit 226 calculates the motion vector mv of the reference list LX by adding the motion vector difference mvdLX of the reference list LX that is decoded and supplied by the first bitstream decoding unit 202 and the motion vector predictor mvpLX of the reference list LX and outputs the motion vector mvLX.

$$mvLX = mvpLX + mvdLX$$

As described above, the motion vector mvLX of the reference list LX is calculated for each prediction block. A predicted picture signal is generated by performing motion compensation using the motion vector and is added to the decoded prediction residual signal, whereby a decoded picture signal is generated.

Figure 14:
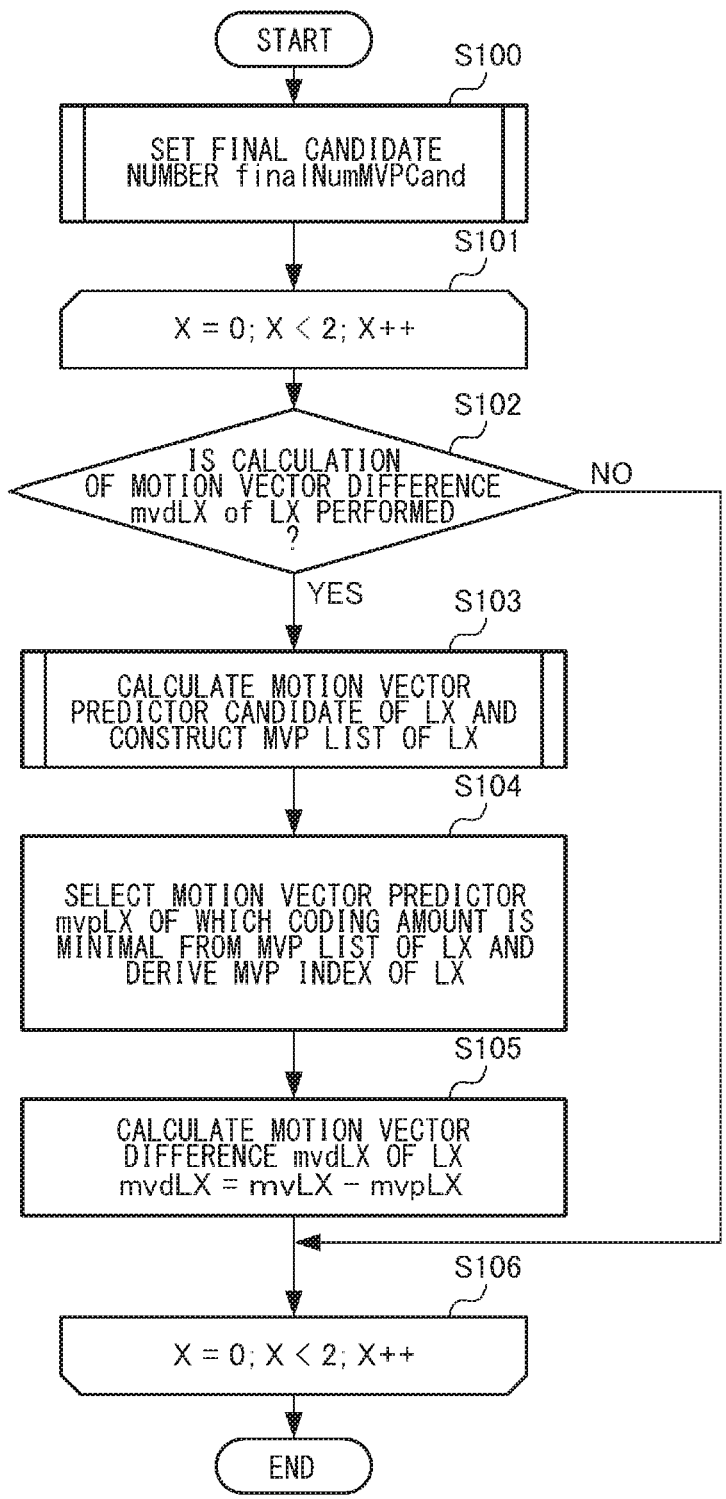
FIG. 14 is a flowchart that illustrates the sequence of the motion vector difference calculating process of the motion vector difference calculating unit illustrated in FIG. 1.
Figure 15:
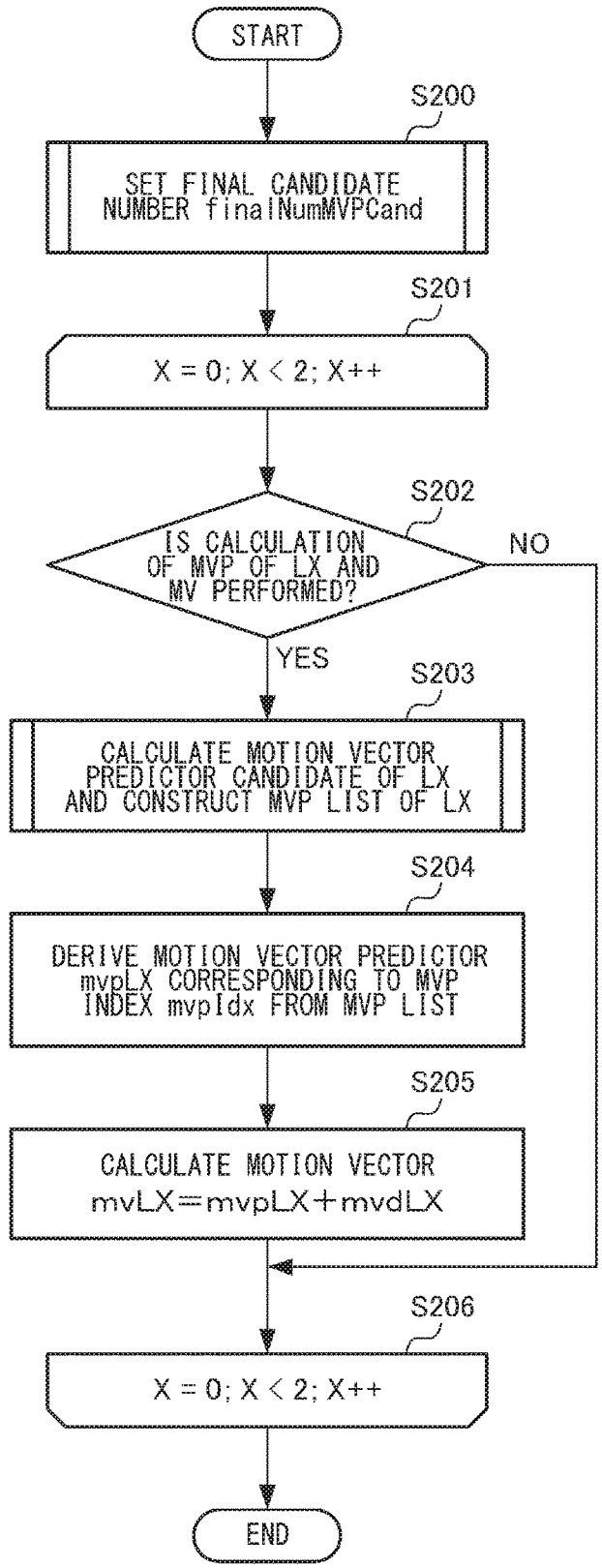
FIG. 15 is a flowchart that illustrates the sequence of the motion vector calculating process of the motion vector calculating unit illustrated in FIG. 2.

The process sequences of the motion vector difference calculating unit 103 of the moving picture coding device and the motion vector calculating unit 204 of the moving picture decoding device will be respectively described with reference to flowcharts illustrated in FIGS. 14 and 15. FIG. 14 is a flowchart that illustrates the sequence of the motion vector difference calculating process performed by the moving picture coding device, and FIG. 15 is a flowchart that illustrates the sequence of the motion vector calculating process of the moving picture decoding device.

The sequence of the motion vector difference calculating process on the coding side will be described with reference to FIG. 14. On the coding side, first, the final number finalNumMVCand of the motion vector predictor candidates is set by the motion vector difference calculating unit 103 (S100). In this embodiment, the final number finalNumMVPCand of candidates is set to "2".

Subsequently, the motion vector difference of the motion vector used in the inter prediction that is selected as the coding target block is calculated for each of the reference lists L0 and L1 by the motion vector difference calculating unit 103 (S101 to S106).

In a case where the motion vector difference mvdLX of the reference list LX is calculated (Yes in S102), the motion vector predictor candidates of the reference list LX are calculated so as to construct the motion vector predictor list mvpListLX of the reference list LX (S103). A plurality of the motion vector predictor candidates are calculated by the motion vector predictor candidate generating unit 121 of the motion vector difference calculating unit 103, the calculated motion vector predictor candidates are added to the motion vector predictor list mvpListLX by the motion vector predictor candidate adding unit 122, unnecessary motion vector predictor candidates are removed by the motion vector predictor redundant candidate removing unit 123, and the number of motion vector predictor candidates is fixed to the number numMVPCandLX of motion vector predictor candidates of the reference list LX that are added in the motion vector predictor list mvpListLX by the motion vector predictor candidate number limiting unit 124, whereby the motion vector predictor list mvpListLX is constructed. A detailed process sequence of step S103 will be described later with reference to a flowchart illustrated in FIG. 16.

Subsequently, the motion vector predictor mvpLX of the reference list LX is selected from the motion vector predictor list mvpListLX of the reference list LX by the motion vector predictor candidate coding amount calculating unit 125 and the motion vector predictor selecting unit 126 (S104). First, each motion vector difference that is a difference between the motion vector mvLX and each motion vector predictor candidate mvpListLX [i] stored in the motion vector predictor list mvpListLX is calculated by the motion vector predictor candidate coding amount calculating unit 125, the coding amount when the motion vector difference is coded is calculated for each element of the motion vector predictor list mvpListLX, and the motion vector predictor candidate mvpListLX[i], for which the coding amount for each motion vector predictor candidate is the minimum is selected from among the elements added in the motion vector predictor list mvpListLX as the motion vector predictor mvpLX by the motion vector predictor selecting unit 126. In a case where there are a plurality of motion vector predictor candidates, for which the generated coding amount is the minimum, in the motion vector predictor list mvpListLX, a motion vector predictor candidate mvpListLX[i] for which the index i included in the motion vector predictor list mvpListLX has a smallest value is selected as an optimal motion vector predictor mvpLX.

Subsequently, by subtracting the selected motion vector predictor mvpLX of the reference list LX from the motion vector mvLX of the reference list LX using the motion vector subtraction unit 127, the motion vector difference mvdLX of the reference list LX is calculated (S105).

$$mvdLX = mvLX - mvpLX$$

Next, the sequence of the motion vector calculating process on the decoding side will be described with reference to FIG. 15. Also on the decoding side, the motion vector used in the inter prediction is calculated for each of the reference lists L0 and L1 by the motion vector calculating unit 204 (S201 to S206).

In a case where the motion vector mvdLX of the reference list LX is calculated (Yes in S202), the motion vector predictor candidates of the reference list LX are calculated so as to construct the motion vector predictor list mvpListLX of the reference list LX (S203). A plurality of the motion vector predictor candidates within the motion vector calculating unit 204 are calculated by the motion vector predictor candidate generating unit 221, the calculated motion vector predictor candidates are added to the motion vector predictor list mvpListLX by the motion vector predictor candidate adding unit 222, unnecessary motion vector predictor candidates are removed by the motion vector predictor redundant candidate removing unit 223, and the number of motion vector predictor candidates is fixed to the number numMVPCandLX of motion vector predictor candidates of the reference list LX that are added in the motion vector predictor list mvpListLX by the motion vector predictor candidate number limiting unit 224, whereby the motion vector predictor list mvpListLX is constructed. A detailed process sequence of step S203 will be described later with reference to the flowchart illustrated in FIG. 16.

Subsequently, the motion vector predictor candidate mvpListLX[mvpIdxLX] corresponding to the index mvpIdxLX of the motion vector predictor decoded by the first bitstream decoding unit 202 is extracted from the motion vector predictor list mvpListLX as the selected motion vector predictor mvpLX by the motion vector predictor selecting unit 225 (S204).

Subsequently, by adding the motion vector difference mvdLX of the reference list LX, which is decoded and supplied by the first bitstream decoding unit 202, and the motion vector predictor mvpLX of the reference list LX using the motion vector addition unit 226, the motion vector mvLX of the reference list LX is calculated (S205).

$$mvLX = mvpLX + mvdLX$$

Next, the sequence of the process of deriving motion vector predictor candidates and constructing a motion vector predictor list that is common to S103 illustrated in FIG. 14 and S203 illustrated in FIG. 15 will be described in detail with reference to the flowchart illustrated in FIG. 16.

(Method of Prediction of Motion Vector)

Figure 16:
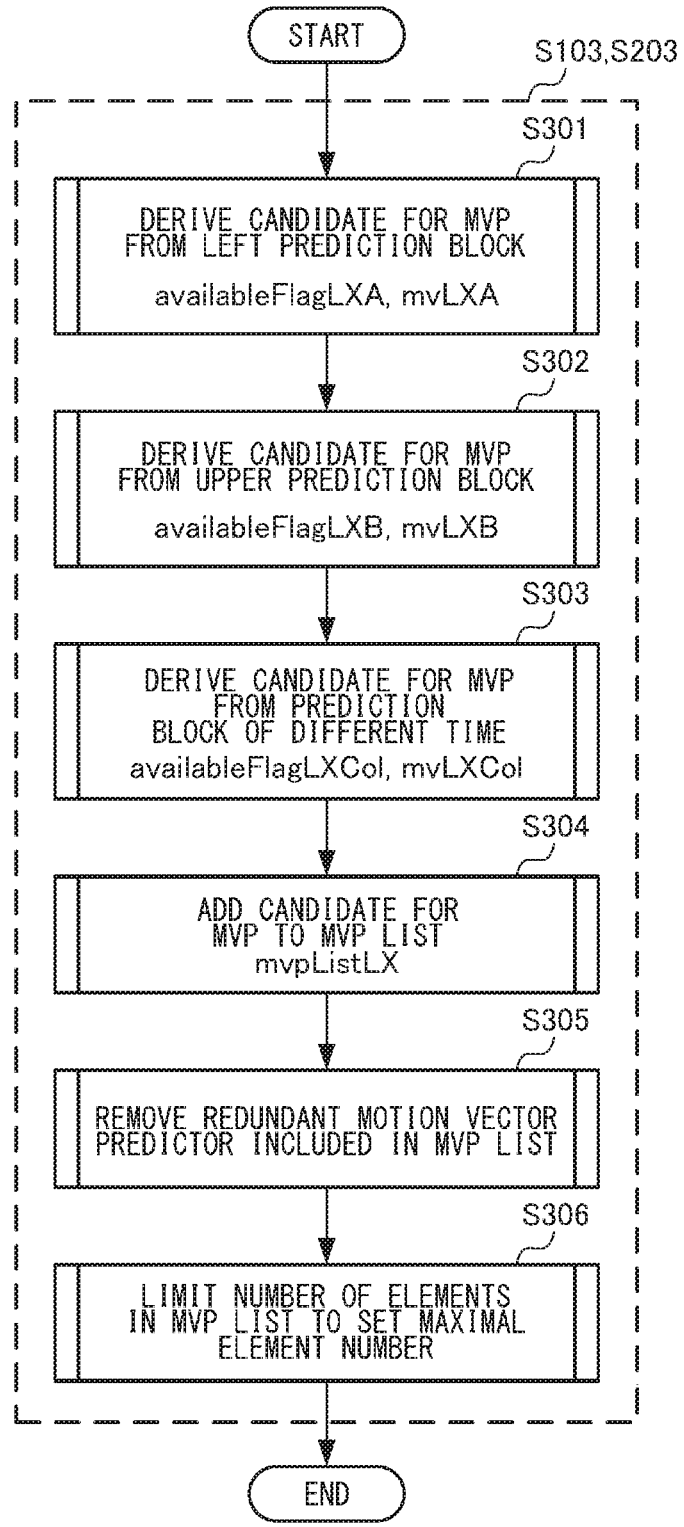
FIG. 16 is a flowchart that illustrates the sequence of the process of deriving motion vector predictor candidates and constructing a motion vector predictor list.

FIG. 16 is a flowchart that illiterates the process sequence of the motion vector predictor candidate generating units 121 and 221, the motion vector predictor candidate adding units 122 and 222, the motion vector predictor redundant candidate removing units 123 and 223, and the motion vector predictor candidate number limiting units 124 and 224 that have functions common to the motion vector difference calculating unit 103 of the moving picture coding device and the motion vector calculating unit 204 of the moving picture decoding device.

First, the motion vector predictor candidate generating unit 121 or 221 derives motion vector predictor candidates from a prediction block of a picture of a different time and derives a flag availableFlagLXCol representing whether or not a motion vector predictor candidate of a prediction block of a picture of a different time can be used, a motion vector mvLXCol, a reference index refIdxCol, and a list ListCol (S301 illustrated in FIG. 16). The sequence of the deriving process of step S301 will be described in detail as below with reference to flowcharts illustrated in FIGS. 24 to 30.

Subsequently, the motion vector predictor candidate generating unit 121 or 221 derives motion vector predictor candidates from a prediction block that is neighboring to the left side and derives a flag availableFlagLXA representing whether or not the motion vector predictor candidate of the prediction block neighboring to the left side can be used, a motion vector mvLXA, a reference index refIdxA, and a list ListA (S302 illustrated in FIG. 16). In addition, X is "0" in the case of the reference list L0, and X is "1" in the case of the reference list L1 (the same in the description presented below). Subsequently, the motion vector predictor candidate generating unit 121 or 221 derives motion vector predictor candidates from a prediction block that is neighboring to the upper side and derives a flag availableFlagLXB representing whether or not the motion vector predictor candidate of the prediction block neighboring to the upper side can be used, a motion vector mvLXB, a reference index refIdxB, and a list ListB (S303 illustrated in FIG. 16). The processes of steps S302 and S303 illustrated in FIG. 16 are common except that the positions and the numbers of neighboring blocks to be referred to are different from each other, and the scanning sequences of the neighboring blocks are different from each other and derives a flag availableFlagLXN representing whether or not the motion vector predictor candidate of the prediction block can be used, a motion vector mvLXN, a reference index refIdxN, and a list ListN (here, N is A or B, which is the same in the description presented below). The process sequence of S302 and S303 will be described below in detail with reference to flowcharts illustrated in FIGS. 17 to 21.

Subsequently, the motion vector predictor candidate adding unit 122 or 222 constructs a motion vector predictor list mvpListLX and adds the prediction vector candidates mvLXCol, mvLXA, and mvLXB of each reference list LX (S304 illustrated in FIG. 16). The sequence of the registration process of step S304 will be described below in detail with reference to the flowchart illustrated in FIG. 31.

Subsequently, the motion vector predictor redundant candidate removing unit 123 or 223, in a case where the spatial prediction vector candidate mvLXA derived from the prediction block group neighboring to the left side and the spatial motion vector predictor candidate mvLXB derived from the prediction block group neighboring to the upper side, which are disposed within the motion vector predictor list mvpListLX have the same value, determines one thereof as a redundant motion vector candidate, leaves the motion vector candidate mvLXA arranged in the former order, in other words, the motion vector candidate mvLXA of a motion vector having the smallest index i, and removes the redundant motion vector candidate mvLXB (S305 illustrated in FIG. 16). In the redundant candidate removing/comparing unit, the motion vector redundancy comparison between the time motion vector predictor candidate mvLX-Col and the spatial motion vector predictor candidate mvLXA or mvLXB is not performed. The reason for this is as follows. The generation of the time motion vector predictor candidate and the generation of the spatial motion vector predictor candidate are processed frequently in a parallel manner due to a difference in the motion information memories thereof to be accessed and a difference in the processing amounts thereof. Thus, in a case where a motion vector comparison between the time motion vector predictor candidate and the spatial motion vector predictor candidate is made, it is necessary to advance the synchronization in a case where the parallel processing is performed, and the standby time of one of the processes increases. Accordingly, it is preferable to separate the process of deriving the time motion vector predictor candidate and the process of deriving the spatial motion vector predictor candidate from each other as possibly as can, thus, in the present invention, the motion vector redundancy comparison between the time motion vector predictor candidate and the spatial motion vector predictor candidate is not performed. Since the process of deriving the time motion vector predictor and the process of deriving the spatial motion vector predictor are different from each other, motion vector predictors of mutually different characteristics are derived. Accordingly, there is a low probability that the time motion vector predictor and the spatial motion vector predictor are the same, and there is no decrease in the coding efficiency even when the motion vector comparison between the time motion vector predictor candidate and the spatial motion vector predictor candidate is not made. The sequence of the removal process of step S305 will be described below in detail with reference to the flowchart illustrated in FIG. 32.

Subsequently, the motion vector predictor candidate number limiting unit 124 or 224 counts the number of elements added in the motion vector predictor list mvpListLX, sets the number numMVPCandLX of the motion vector predictor candidates of the reference list LX to the number of the added elements, and limits the number numMVPCandLX of the motion vector predictor candidates of the reference list LX added in the motion vector predictor list mvpListLX to the set final number finalNumMVPCand of candidates (S306 illustrated in FIG. 16). The sequence of the removal process of step S306 will be described below in detail with reference to the flowchart illustrated in FIG. 33.

The sequence of deriving the motion vector predictor candidate from the prediction blocks neighboring to the left side or the upper side in S301 and S302 illustrated in FIG. 16 will be described in detail.

As illustrated in FIGS. 5, 6, 7, and 8, motion vector predictor candidates are derived from prediction blocks disposed on the periphery that are neighboring to a prediction block (the prediction block that is the processing target illustrated in FIGS. 5, 6, 7, and 8) defined for performing motion compensation of the inside of the coding block within the same picture.

As the motion vector predictor candidates, motion vector predictor candidates are selected from the prediction block group A that is configured by prediction blocks Ak (here, k=0 or 1) neighboring to the left side of the prediction block that is the processing target, in other words, A0 and A1 and the prediction block group B that is configured by the prediction block Bk (here, k=0, 1, or 2) neighboring to the upper side, in other words, B0, B1, and B2.

Figure 17:
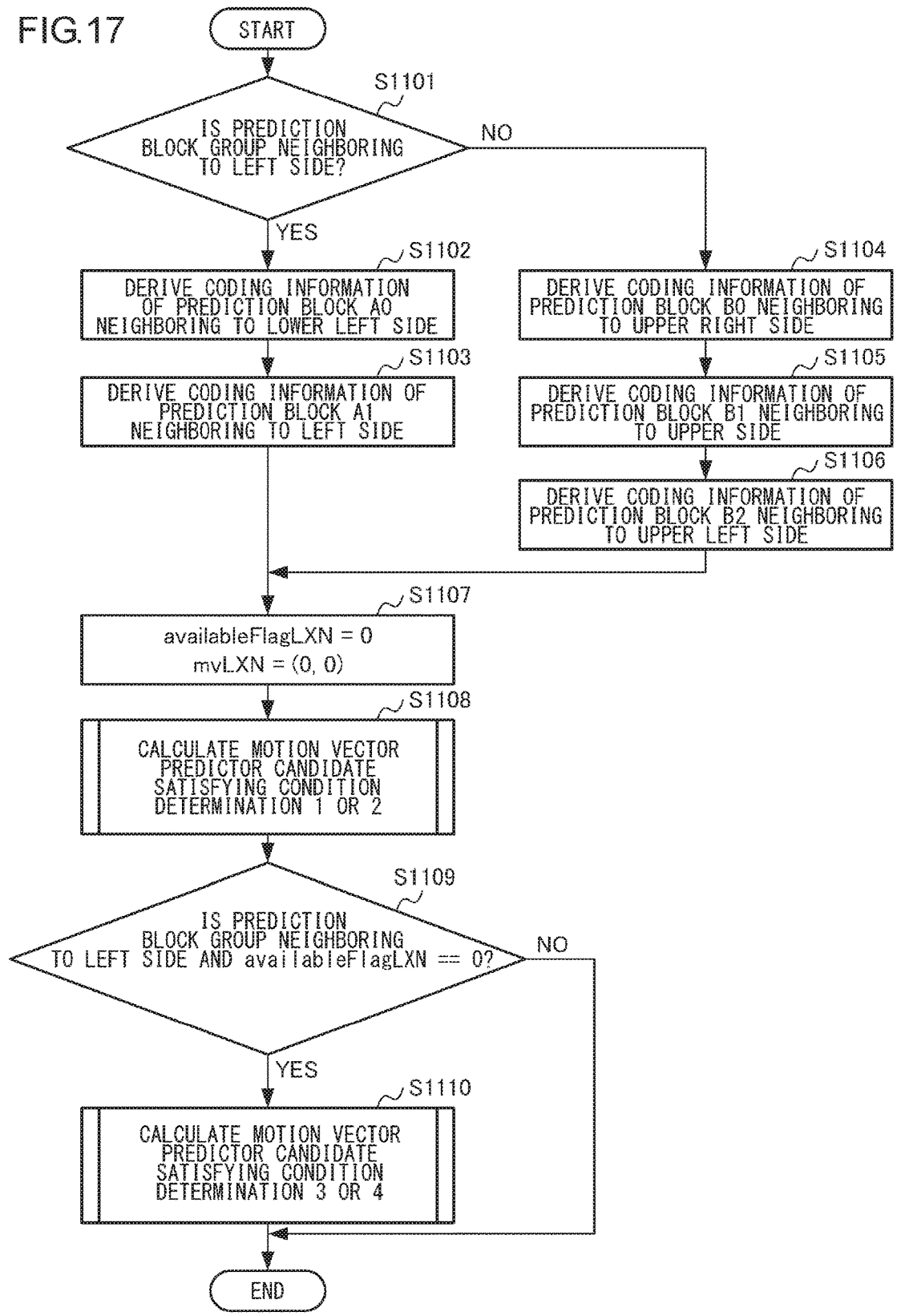
FIG. 17 is a flowchart that illustrates the sequence of the process of deriving motion vector predictor candidates according to a first embodiment.

Next, the method of deriving the motion vector predictor candidates from the prediction block group N neighboring to the left side and the upper side in the sequence of the process of S301 and S302 illustrated in FIG. 16 will be described. FIG. 17 is a flowchart that illustrates the sequence of the process of deriving motion vector predictor candidates in S301 and S302 illustrated in FIG. 16 in accordance with the above-described scanning method. Suffix X is 0 or 1 that represents a reference list, and N is A (left side) or B (upper side) that represents the area of the neighboring prediction block group.

In order to derive motion vector predictor candidates from the left prediction block (S301 illustrated in FIG. 16) and in order to derive motion vector predictor candidates from the prediction blocks A0 and A1 neighboring to the left side of the prediction block that is the coding/decoding target with N as A in FIG. 17 and motion vector predictor candidates from the upper prediction block (S302 illustrated in FIG. 16), motion vector predictor candidates are calculated in the sequence described below from prediction blocks B0, B1, and B2 neighboring to the upper side with N as B in FIG. 17.

First, prediction blocks neighboring to the prediction block that is the coding/decoding target are specified, and, in a case where the prediction block Nk (here, k=0, 1, or 2; 2 is only for an upper prediction block group) can be used, the coding information stored in the coding information storing memory 114 or the coding information storing memory 209 is derived. Here, the coding information of the neighboring prediction block Nk to be derived includes a prediction mode PredMode, a flag predFlagLX [xNk] [yNk] representing whether the reference list LX is used, a reference index refIdxLX [xNk] [yNk] of the reference list LX, a motion vector mvLX [xNk] [yNk] of the reference list LX. In the case of a prediction block group (N=A) neighboring to the left side of the prediction block that is the coding/decoding target (Yes in S1101), the coding information is derived by specifying a prediction block A0 neighboring to the lower left side and a prediction block A1 neighboring to the left side (S1102 and S1103). On the other hand, in the case of a prediction block group (N=B) neighboring to the upper side of the prediction block that is the coding/decoding target (No in S1101), the coding information is derived by specifying a prediction block B0 neighboring to the upper right side, a prediction block B1 neighboring to the upper side, and a prediction block B2 neighboring to the upper left side (S1104, S1105, and S1106). In addition, the neighboring prediction block Nk can be used in a case where the neighboring prediction block is located on the inner side of a slice including the coding/decoding target prediction block but cannot be used in a case where neighboring prediction block is located outside the slice.

Next, the flag availableFlagLXN representing whether or not the motion vector predictor is selected from the prediction block group N is set to "0", and the motion vector mvLXN representing the prediction block group N is set to (0, 0) (S1107).

Next, a motion vector predictor candidate satisfying Condition Determination 1 or Condition Determination 2 described above is derived (S1108). From among the neighboring prediction blocks N0, N1, and N2 (N2 is only for the upper neighboring prediction block group B) of the prediction block group N (here, N is A or B), a prediction block having a motion vector of a reference picture of the same reference list LX that is the same as the reference list LX set as the current target in the coding/decoding target prediction block or a reference list LY (Y=!X; in a case where the reference list that is the current target is L0, the opposite reference list is L1, and, in a case where the reference list that is the current target is L1, the opposite reference list is L0) that is opposite to the reference list LX set as the current target in the coding/decoding target prediction block is searched for, and the motion vector is set as the motion vector predictor candidate.

Figure 18:
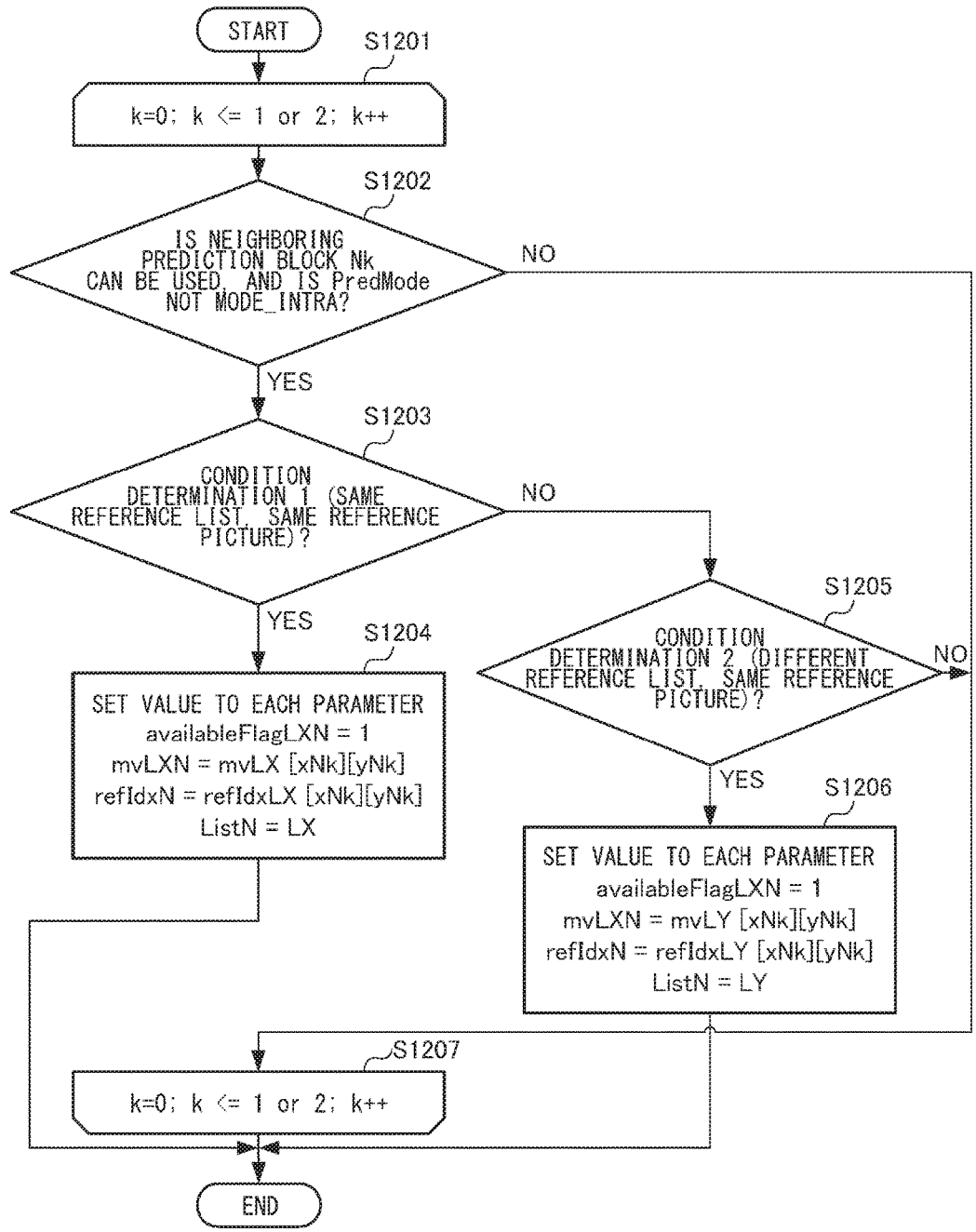
FIG. 18 is a flowchart that illustrates the sequence of the process of deriving motion vector predictor candidates.

FIG. 18 is a flowchart that illustrates the sequence of the deriving process of step S1108 illustrated in FIG. 17. The following process is performed for the neighboring prediction blocks Nk (here, k=0, 1, or 2; 2 is only for the upper neighboring prediction block group) in order of k=0, 1, and 2 (S1201 to S1207). The following process is performed in order of A0 and A1 from the lower side to the upper side in a case where N is A and in order of B0, B1, and B2 from the right side to the left side in a case where N is B.

In a case where the neighboring prediction block Nk can be used, and the prediction mode PredMode of the prediction block Nk is not the intra prediction MODE_INTRA (Yes in S1202), condition determination of the Condition Determination 1 described above is made (S1203). In a case where the flag predFlagLX [xNk] [yNk] representing whether to use the reference list LX of the neighboring prediction block Nk is 1, in other words, in a case where an inter prediction of the neighboring prediction block Nk is made using the motion vector of the reference list LX that is the same as that of the calculation target, and the reference index ref IdxLX [xNk] [yNk] of LX of the neighboring prediction block Nk and the index refIdxLX of the prediction block that is the processing target are the same, in other words, an inter prediction of the neighboring prediction block Nk is made using the same reference picture in the LX prediction (Yes in S1203), the process proceeds to step S1204, and otherwise (No in S1203), the condition determination of step S1205 is made.

In the case of Yes in step S1203, the flag availableFlagLXN is set to "1", the motion vector predictor mvLXN of the prediction block group N is set to the value of the motion vector mvLX [xNk] [yNk] of the reference list LX of the neighboring prediction block Nk, the reference index refIdxN of the prediction block group N is set to the value of the reference index refIdxLX [xNk] [yNk] of the reference list LX of the neighboring prediction block Nk, and the reference list ListN of the prediction block group N is set to LX (S1204), and then, this motion vector predictor candidate calculating process ends.

On the other hand, in the case of No in step S1203, condition determination of Condition Determination 2 described above is made (S1205). In a case where the flag predFlagLY representing whether to use the reference list LY of the neighboring prediction block Nk is 1, in other words, in a case where an inter prediction of the neighboring prediction block Nk is made using the motion vector of the reference list LY that is different from that of the calculation target, and the POC of the reference picture of the reference list LY opposite to the reference list LX that is the current target of the neighboring prediction block Nk and the POC of the reference picture of the reference list LX of the prediction block that is the processing target are the same, in other words, in a case where an inter prediction of the neighboring prediction block Nk is made using the same reference picture in the LY prediction (Yes in S1205), the process proceeds to step S1206, the flag availableFlagLXN is set to "1", the motion vector predictor mvLXN of the prediction block group N is set to the value of the motion vector mvLY [xNk] [yNk] of the reference list LY of the neighboring prediction block Nk, the reference index refIdxN of the prediction block group N is set to the value of the reference index refIdxLY[xNk][yNk] of the reference list LY of the neighboring prediction block Nk, and the reference list ListN of the prediction block group N is set to LY (S1206), and then, this motion vector predictor candidate calculating process ends.

In a case whether such a condition is not satisfied, in other words, in the case of No in S1203 and No in S1205, k is increased by one, the process (S1201 to S1207) of the next neighboring prediction block is performed, and the process is repeated until the flag availableFlagLXN is "1" or the process of the neighboring block A1 or B2 is completed.

Subsequently, referring back to the flowchart illustrated in FIG. 17, when the prediction block group is neighboring to the left side (N=A), and the flag availableFlagLXN is "0" (Yes in S1109), in other words, a motion vector predictor candidate cannot be calculated in step S1108 for the prediction block group neighboring to the left side, a motion vector predictor candidate satisfying Condition Determination 3 or Condition Determination 4 described above is calculated (S1110).

Figure 19:
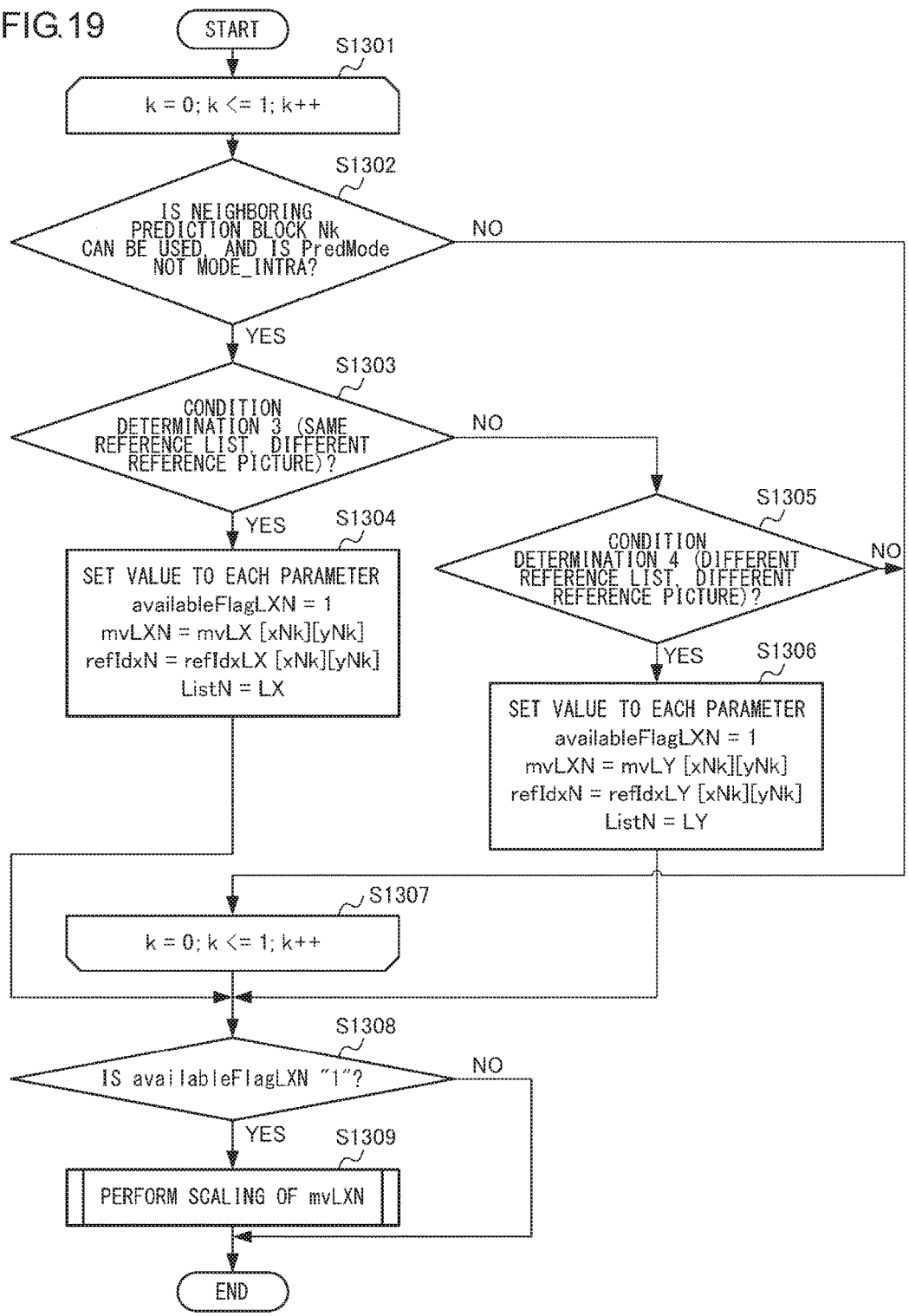
FIG. 19 is a flowchart that illustrates the sequence of the process of deriving motion vector predictor candidates according to the first embodiment.

FIG. 19 is a flowchart that illustrates the sequence of the deriving process of step S1110 illustrated in FIG. 17. The following process is performed in order of k=0 and k=1 for the neighboring prediction block Nk (here, k=0 or 1) (S1301 to S1307).

In a case where the neighboring prediction block Nk can be used, and the prediction mode PredMode of the prediction block Nk is not the intra prediction MODE_INTRA (Yes in S1302), condition determination of the Condition Determination 3 described above is made (S1303). In a case where the flag predFlagLX [xNk] [yNk] representing whether to use the reference list LX of the neighboring prediction block Nk is 1, in other words, in a case where an inter prediction of the neighboring prediction block Nk is made using the motion vector of the reference list LX that is the same as that of the calculation target, the process proceeds to step S1304, and otherwise (No in S1303), the condition determination of step S1305 is made.

In the case of Yes in step S1303, the flag availableFlagLXN is set to "1", the motion vector predictor mvLXN of the prediction block group N is set to the value of the motion vector mvLX [xNk] [yNk] of the reference list LX of the neighboring prediction block Nk, the reference index refIdxN of the prediction block group N is set to the value of the reference index refIdxLX [xNk] [yNk] of the reference list LX of the neighboring prediction block Nk, and the reference list ListN of the prediction block group N is set to LX (S1304), and then, the process proceeds to step S1308.

In the case of No in step S1303, condition determination of Condition Determination 4 described above is made (S1305). In a case where the flag predFlagLY representing whether to use the reference list LY of the neighboring prediction block Nk is 1, in other words, in a case where an inter prediction of the neighboring prediction block Nk is made using the motion vector of the reference list LY that is different from that of the calculation target (Yes in S1305), the flag availableFlagLXN is set to "1", the motion vector predictor mvLXN of the prediction block group N is set to the value of the motion vector mvLY [xNk] [yNk] of the reference list LY of the neighboring prediction block Nk, the motion vector predictor mvLXN of the prediction block group N is set to the value of the motion vector mvLY [xNk] [yNk] of the reference list LY of the neighboring prediction block Nk, the reference index refIdxN of the prediction block group N is set to the value of the reference index refIdxLY [xNk] [yNk] of the reference list LY of the neighboring prediction block Nk, and the reference list ListN of the prediction block group N is set to LY (S1306), and then, the process proceeds to step S1308.

On the other hand, in a case whether such a condition is not satisfied (in the case of No in S1303 and No in S1305), k is increased by one, the process (S1301 to S1307) of the next neighboring prediction block is performed, and the process is repeated until the flag availableFlagLXN is "1" or the process of the neighboring block A1 is completed, and then the process proceeds to step S1308.

Subsequently, when the flag availableFlagLXN is "1" (Yes in S1308), scaling of the motion vector mvLXN is performed (S1309). The sequence of the process of calculating the scaling of the spatial motion vector predictor candidate in step S1309 will be described with reference to FIGS. 20 and 21.

Figure 20:
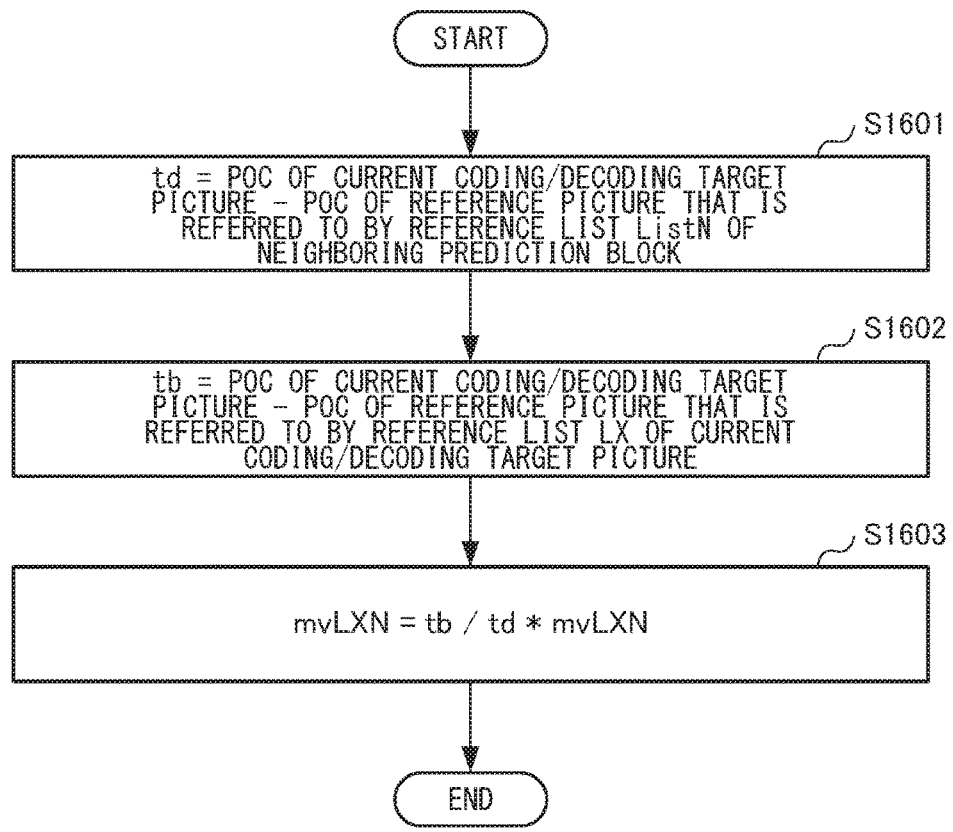
FIG. 20 is a flowchart that illustrates the sequence of the process of calculating the scaling of a motion vector.

FIG. 20 is a flowchart that illustrates the sequence of the process of calculating the scaling of a motion vector in step S1309 illustrated in FIG. 19.

An inter-picture distance td is calculated by subtracting the POC of the reference picture referred to by the list ListN of the neighboring prediction block from the POC of the current coding/decoding target picture (S1601). In a case where the reference picture referred to by the list ListN of the neighboring prediction block is prior to the current coding/decoding target picture in the display order, the inter-picture distance td has a positive value. On the other hand, in a case where the reference picture referred to by the list ListN of the neighboring prediction block is posterior to the current coding/decoding target picture in the display order, the inter-picture distance td has a negative value.

$td$=POC of current coding/decoding target picture− POC of reference picture referred to by reference list List$N$ of neighboring prediction block Next, an inter-picture distance tb is calculated by subtracting the POC of the reference picture referred to by the list LX of the current coding/decoding target picture from the POC of the current coding/decoding target picture (S1602). In a case where the reference picture referred to by the list LX of the current coding/decoding target picture is prior to the current coding/decoding target picture in the display order, the inter-picture distance tb has a positive value. On the other hand, in a case where the reference picture referred to by the list LX of the current coding/decoding target picture is posterior to the current coding/decoding target picture in the display order, the inter-picture distance tb has a negative value.

$tb$=POC of current coding/decoding target picture− POC of reference picture referred to by reference list $LX$ of current coding/decoding target picture Subsequently, by multiplying the motion vector mvLXN by a scaling factor tb/td according to the following equation, the scaling calculation process is performed (S1603), and the scaled motion vector mvLXN is acquired.

$mvLXN=tb/td*mvLXN$

Figure 21:
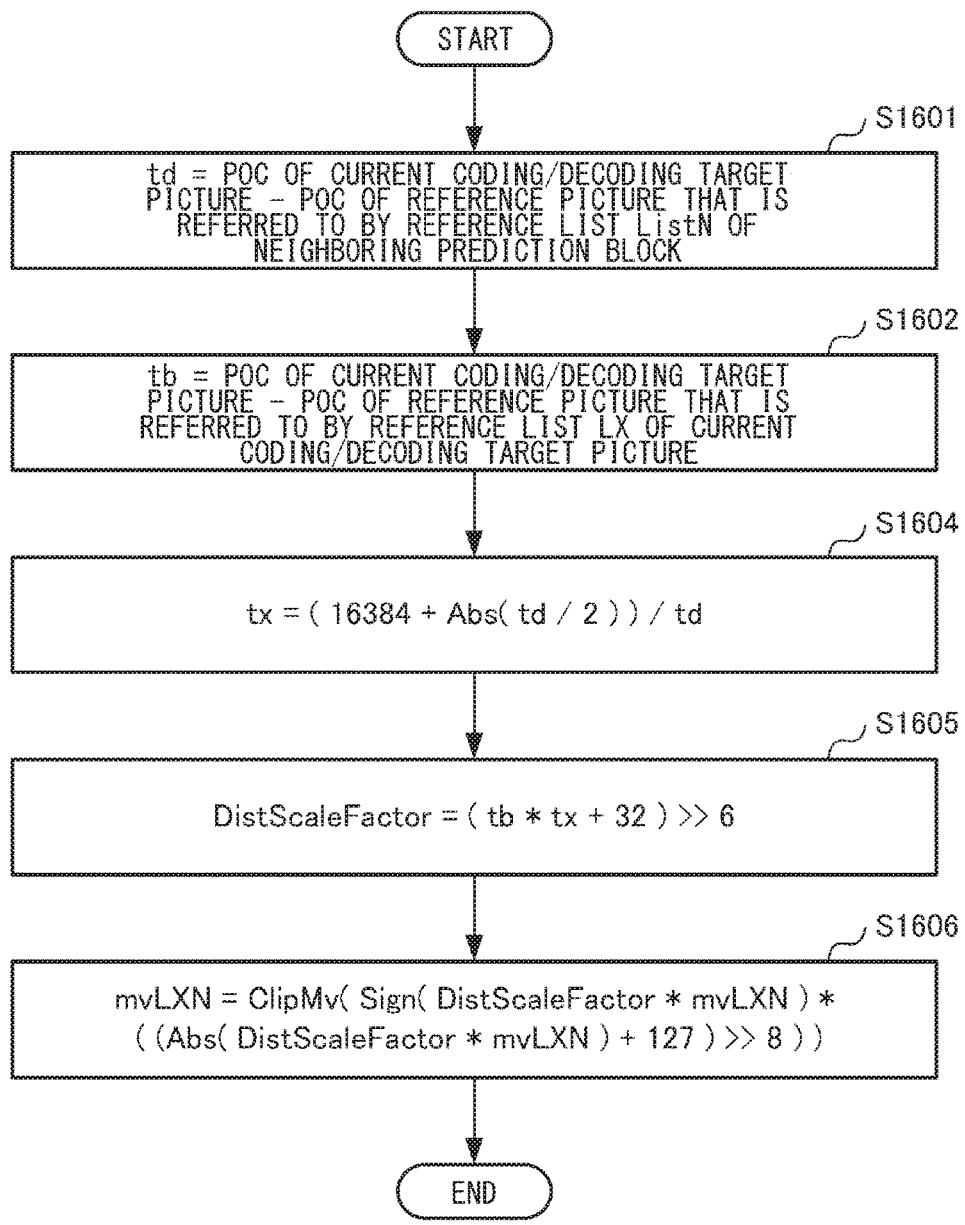
FIG. 21 is a flowchart that illustrates the sequence of the process of calculating the scaling of the motion vector through integer arithmetic.

In addition, an example of a case where the scaling calculation of step S1603 is performed as integer-precision calculation is illustrated in FIG. 21. The process of steps S1604 to S1606 illustrated in FIG. 21 corresponds to the process of step S1603 illustrated in FIG. 20.

First, similarly to the flowchart illustrated in FIG. 20, the inter-picture distance td and the inter-picture distance tb are calculated (S1601 and S1602).

Subsequently, a variable tx is calculated by using the following equation (S1603).

$tx=(16384+Abs(td/2))/td$

Subsequently, a scaling factor DistScaleFactor is calculated using the following equation (S1605).

$DistScaleFactor=(tb*tx+32)>>6$

Subsequently, a scaled motion vector mvLXN is acquired by using the following equation (S1606).

$mvLXN$=ClipMv(Sign(DistScaleFactor*$mvLXN$)* ((Abs(DistScaleFactor*$mvLXN$)+12−7)>>8))

Figure 24:
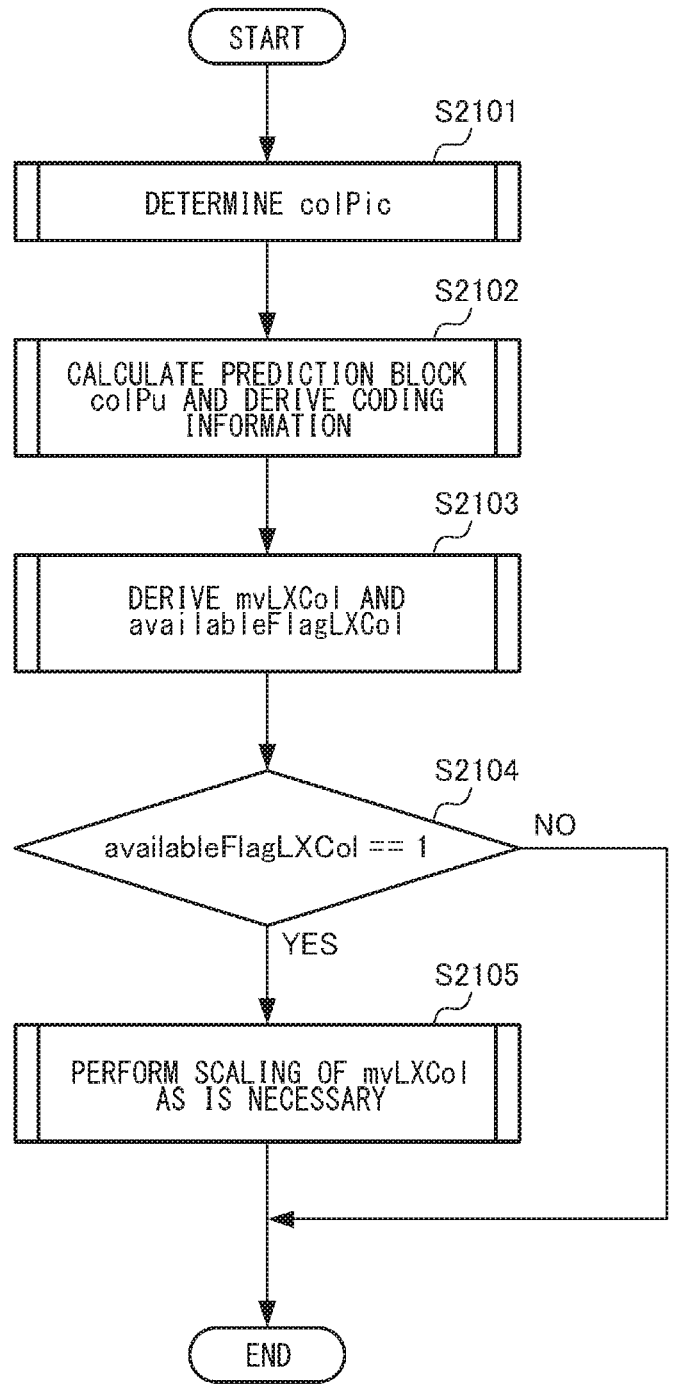
FIG. 24 is a flowchart that illustrates the sequence of the process of deriving motion vector predictor candidates.

Next, a method of deriving a motion vector predictor candidate from a prediction block of a picture of a different time in S303 illustrated in FIG. 16 will be described in detail. FIG. 24 is a flowchart that illustrates the sequence of the process of deriving motion vector predictor candidates in step S303 illustrated in FIG. 16.

First, it is determined whether the picture colPic of a different time is defined in the reference list L0 or the reference list L1 based on slice_type and collocated_from_.sub.-10_flag (S2101 illustrated in FIG. 24).

Figure 25:
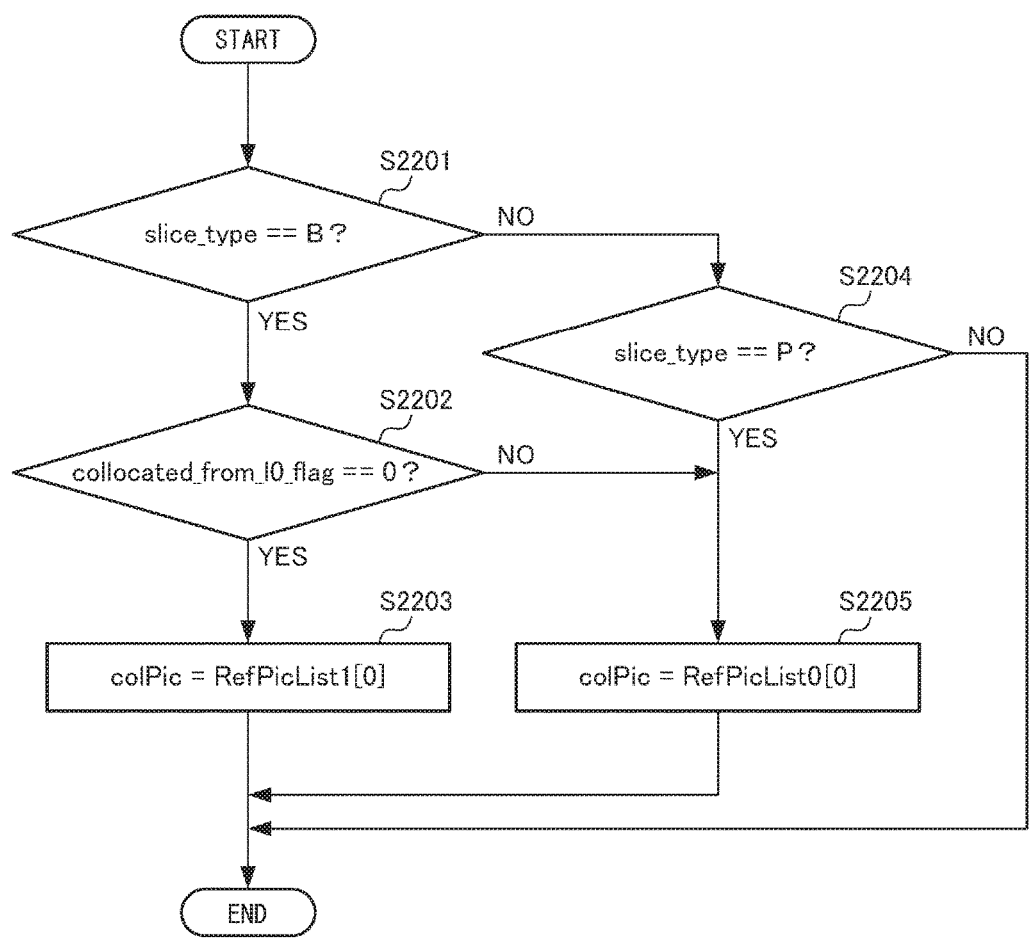
FIG. 25 is a flowchart that illustrates the sequence of the process of deriving a picture of a different time.

FIG. 25 is a flowchart that illustrates the sequence of the process of deriving a picture colPic of a different time in step S2101 illustrated in FIG. 24. In a case where slice_type is B, and the above-described flag collocated_from.sub.-10_flag is "0" (Yes in S2201 illustrated in FIG. 25 and Yes in S2202), RefPicList1[0], in other words, a picture of which the reference index of the reference list L1 is "0" is set as the picture colPic of a different time (S2203 illustrated in FIG. 25). Otherwise, in other words, in a case where the above-described flag collocated_from 10 flag is "1" (No in S2201 illustrated in FIG. 25, No in S2202, and No in S2204), RefPicList0[0], in other words, a picture of which the reference index of the reference list L0 is "0" is set as the picture colPic of a different time (S2205 illustrated in FIG. 25).

Next, referring back to the flowchart illustrated in FIG. 24, a prediction block colPU of a different time is calculated, and the coding information is derived (S2102 illustrated in FIG. 24).

Figure 26:
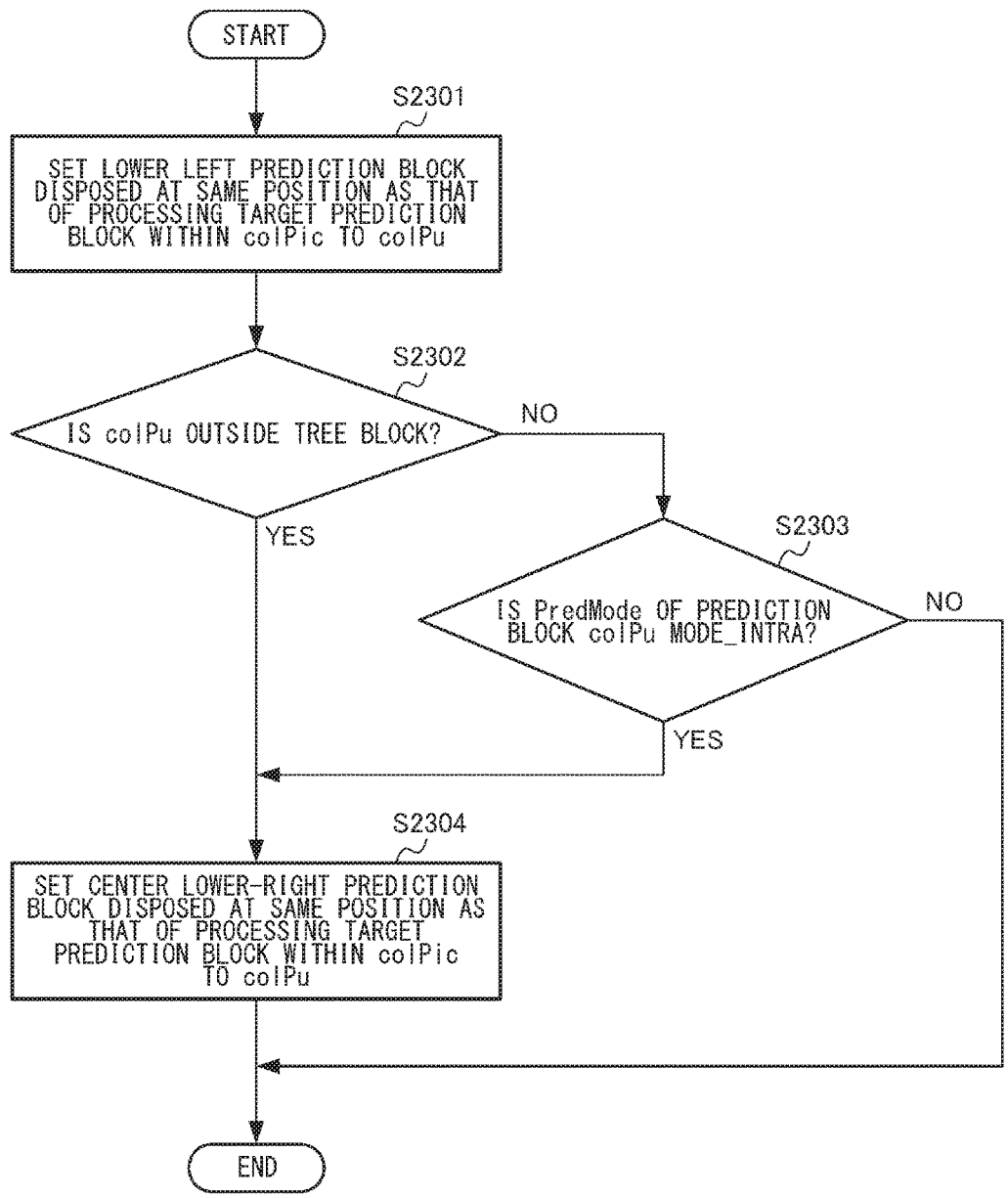
FIG. 26 is a flowchart that illustrates the sequence of the process of deriving a prediction block candidate of a picture of a different time.

FIG. 26 is a flowchart that illustrates the sequence of the process of deriving the prediction block colPU of the picture colPic of a different time in step S2102 of FIG. 24.

First, a prediction block located on the lower right side (outer side) at the same position as that of the prediction block that is the processing target within the picture colPic of a different time is set as the prediction block colPU of a different time (S2301 illustrated in FIG. 26). This prediction block corresponds to the prediction block T0 illustrated in FIG. 9.

Next, in a case where the prediction block is located outside the tree block of the prediction block coding block of a different time, and the prediction mode PredMode of the prediction block colPU is the intra prediction MODE_INTRA (S2302 and S2303 illustrated in FIG. 26), a prediction block located at the center lower right position that is the same as the position of the prediction block that is the processing target within the picture colPic of a different time is reset as the prediction block colPU of a different time (S2304 illustrated in FIG. 26). This prediction block corresponds to the prediction block T1 illustrated in FIG. 9. The reason for changing the prediction block colPu to the prediction block located at the center lower right position that is the same as the position the prediction block, which is the processing target, is that the cost of a hardware memory access is high for the derivation of the colPU information from the outside of the tree block.

Next, referring back to the flowchart illustrated in FIG. 24, the motion vector predictor mvLXCol of the reference list LX calculated from a prediction block of a different picture that is located at the same position as the position of the prediction block, which is the coding/decoding target, and a flag availableFlagLXCol representing whether or not the coding information of the reference list LX of the prediction block group Col is valid are calculated (S2103 illustrated FIG. 24).

Figure 27:
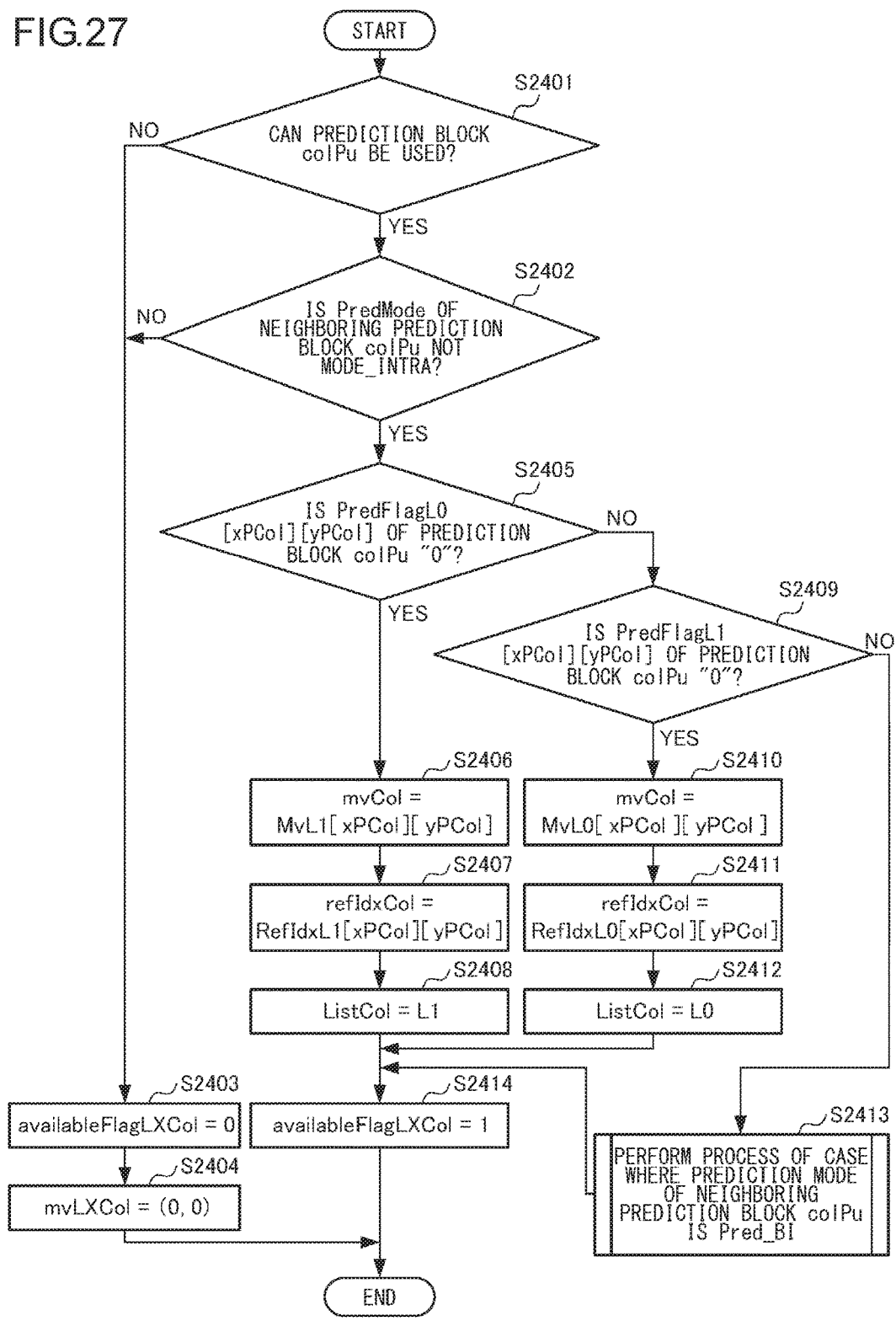
FIG. 27 is a flowchart that illustrates the sequence of the process of deriving motion vector predictor candidates.

FIG. 27 is a flowchart that illustrates the process of deriving the inter prediction information in step S2103 illustrated in FIG. 24.

In a case where the prediction mode PredMode of the prediction block colPU of a different time is the intra prediction MODE_INTRA and cannot be used (No in S2401 illustrated in FIG. 27 and No in S2402), the flag availableFlagLXCol is set to "0", the motion vector mvLXCol is set to (0, 0) (S2403 and S2404 illustrated in FIG. 27), and the process ends.

In a case where the prediction block colPU can be used, and the prediction mode PredMode is not the intra prediction MODE_INTRA (Yes in S2401 illustrated in FIG. 27 and Yes in S2402), the motion vector mvCol and the reflection index refIdxCol are calculated in the following sequence.

In a case where the flag PredFlagL0 [xPCol] [yPCol] representing whether or not the L0 prediction of the prediction block colPU is used is "0" (Yes in S2405 illustrated in FIG. 27), since the prediction mode of the prediction block colPU is Pred_L1, the motion vector mvCol is set to the value of MvL1[xPCol] [yPCol] that is the motion vector of L1 of the prediction block colPU (S2406 illustrated in FIG. 27), the reference index refIdxCol is set to the value of the reference index RefIdxL1[xPCol][yPCol] of the reference list L1 (S2407 illustrated in FIG. 27), and the list ListCol is set to L1 (S2408 illustrated in FIG. 27).

On the other hand, in a case where the L0 prediction flag PredFlagL0[xPCol][yPCol] of the prediction block colPU is not "0" (No in S2405 illustrated in FIG. 27), it is determined whether or not the L1 prediction flag PredFlagL0[xPCol][yPCol] of the prediction block colPU is "0". In a case where the L1 prediction flag PredFlagL0[xPCol][yPCol] of the prediction block colPU is "0" (Yes in S2409 illustrated in FIG. 27), the motion vector mvCol is set to the value of MvL0[xPCol][yPCol] that is the motion vector of the reference list L0 of the prediction block colPU (S2410 illustrated in FIG. 27), the reference index refIdxCol is set to the value of the reference index RefIdxL0 [xPCol] [yPCol] of the reference list L0 (S2411 illustrated in FIG. 27), and the list ListCol is set to L0 (S2412 illustrated in FIG. 27).

In a case where none of the L0 prediction flag PredFlagL0 [xPCol][yPCol] of the prediction block colPU and the L1 prediction flag PredFlagL0[xPCol][yPCol] of the prediction block colPU is not "0" (No in S2405 illustrated in FIG. 27 and No in S2409), the inter prediction mode of the prediction block colPU is the bi-prediction Pred_BI, and accordingly, one is selected from two motion vectors of the reference lists L0 and L1 (S2413 illustrated in FIG. 27).

Figure 28:
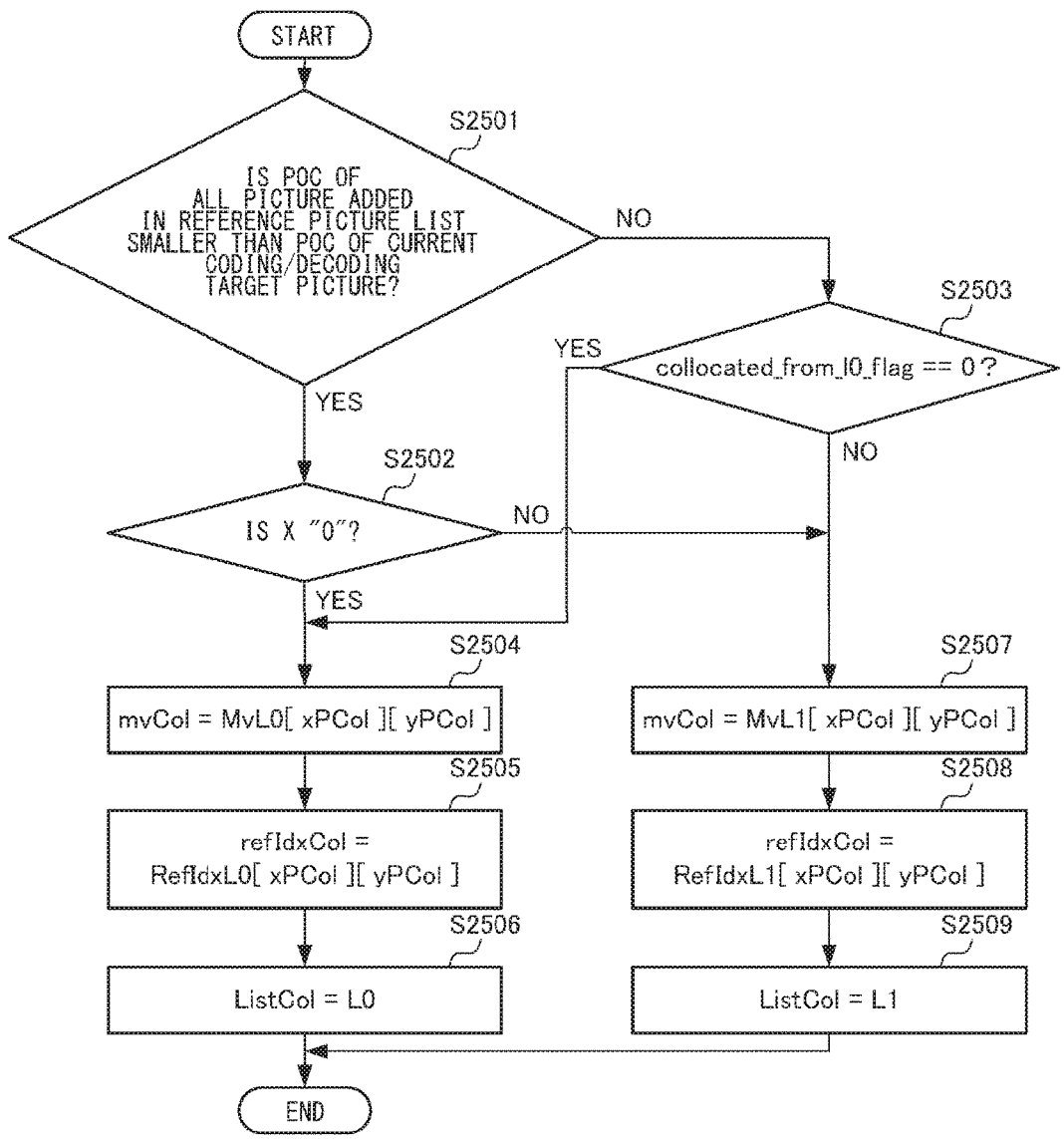
FIG. 28 is a flowchart that illustrates the sequence of the process of deriving motion vector predictor candidates.

FIG. 28 is a flowchart that illustrates the sequence of the process of deriving inter prediction information of a prediction block when the inter prediction mode of the prediction block colPU is the bi-prediction Pred_BI.

First, it is determined whether the POCs of all the pictures added in the reference list are smaller than the POC of the current coding/decoding target picture (S2501). In a case where the POCs of all the pictures added in all the reference lists L0 and L1 of the prediction block colPU are smaller than the POC of the current coding/decoding target picture (Yes in S2501) and in a case where X is "0", in other words, the prediction vector candidate of the motion vector of the reference list L0 of the prediction block that is the coding/decoding target is calculated (Yes in S2502), the inter prediction information of the L0 side of the prediction block colPU is selected. On the other hand, in a case where X is "1", in other words, the prediction vector candidate of the motion vector of the reference list L1 of the prediction block that is the coding/decoding target is calculated (No in S2502), the inter prediction information of the L1 side of the prediction block colPU is selected. On the other hand, in a case where at least one of the POCs of the pictures added in all the reference lists L0 and L1 of the prediction block colPU is larger than the POC of the current coding/decoding target picture (No in S2501), in a case where the flag collocated_from.sub.-10_flag is "0" (Yes in S2503), the inter prediction information of the L0 side of the prediction block colPU is selected. On the other hand, in a case where the flag collocated_from.sub.-10_flag is "1" (No in S2503), the inter prediction information of the L1 side of the prediction block colPU is selected. In other words, in a case where the prediction block colPU is defined using the reference list L1, L0 is selected as the motion vector mvCol, and, in a case where the prediction block colPU is defined using the reference list L0, L1 is selected as the motion vector mvCol. By configuring the selection of the prediction block colPU and the selection list of the motion vector mvCol to be opposite to each other, a prediction vector having high precision capable of making an interpolation prediction using a motion vector for a reference picture in a direction from the picture colPic to the coding target picture can be calculated.

In a case where the inter prediction information of the L0 side of the prediction block colPU is selected (Yes in S2502 and Yes in S2503), the motion vector mvCol is set to the value of the MvL0 [xPCol] [yPCol] (S2504), the reference index refIdxCol is set to the value of RefIdxL0 [xPCol] [yPCol] (S2505), and the list ListCol is set to L0 (S2506).

On the other hand, in a case where the inter prediction information of the L1 side of the prediction block colPU is selected (No in S2502 and No in S2503), the motion vector mvCol is set to the value of the Mv1_1[xPCol] [yPCol] (S2507), the reference index refIdxCol is set to the value of RefIdxL1[xPCol][yPCol] (S2508), and the list ListCol is set to L1 (S2509).

Referring back to FIG. 27, when the inter prediction information can be derived from the prediction block colPU, the flag availableFlagLXCol is set to "1" (S2414 illustrated in FIG. 27).

Next, referring back to the flowchart illustrated in FIG. 24, in a case where the flag availableFlagLXCol is "1" (Yes in S2104 illustrated in FIG. 24), the motion vector mvLXCol is scaled as is necessary (S2105 illustrated in FIG. 24). The sequence of the process of calculating the scaling of the motion vector mvLXCol will be described with reference to FIGS. 29 and 30.

Figure 29:
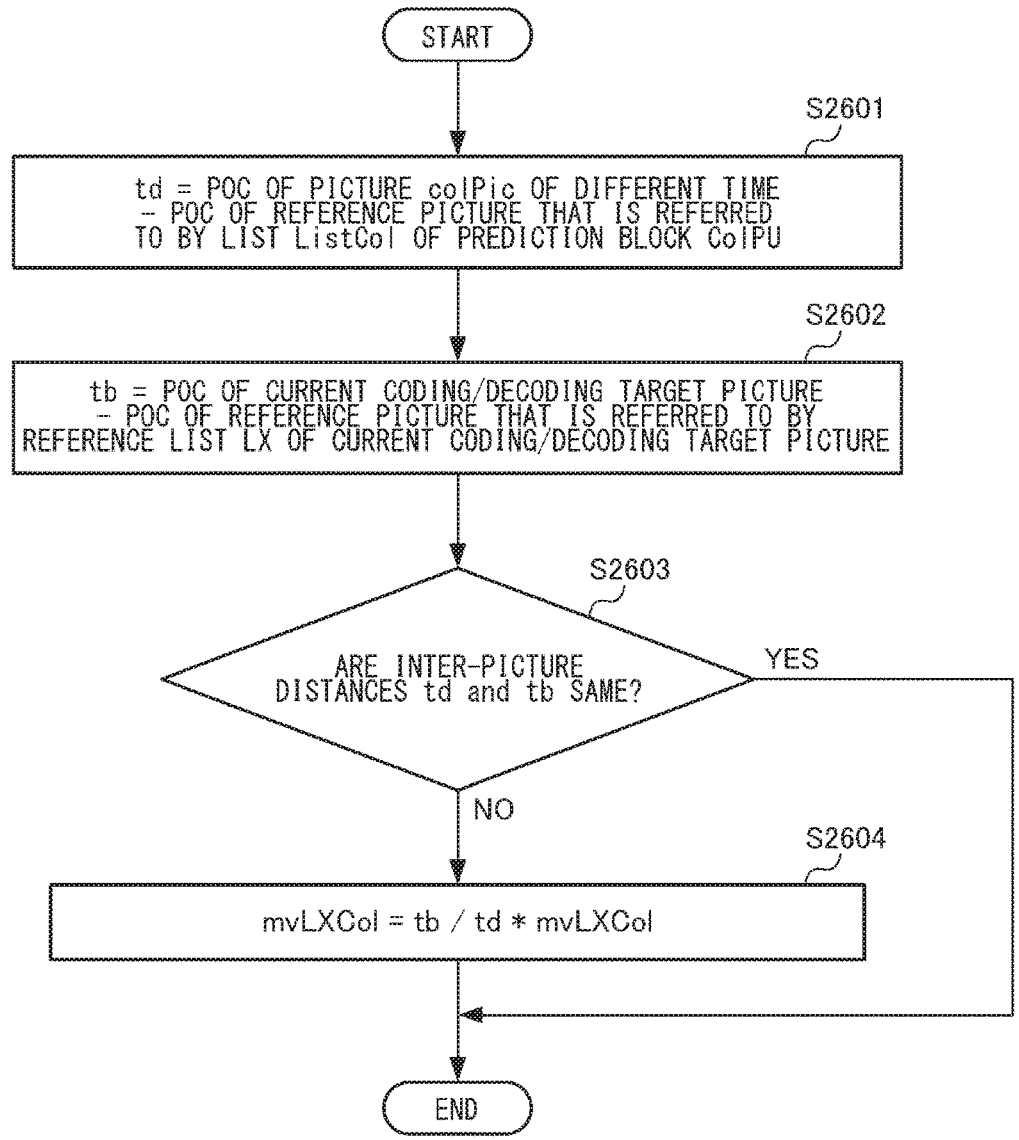
FIG. 29 is a flowchart that illustrates the sequence of the process of calculating the scaling of a motion vector.

FIG. 29 is a flowchart that illustrates the sequence of the process of calculating the scaling of the motion vector in step S2105 illustrated in FIG. 24.

An inter-picture distance td is calculated by subtracting the POC of the reference picture referred to by the list ListCol of the prediction block colPU from the POC of the picture colPic of a different time (S2601). In a case where the POC of the reference picture referred to by the list ListCol of the prediction block colPU is prior to the picture colPic of a different time in the display order, the inter-picture distance td has a positive value. On the other hand, in a case where the POC of the reference picture referred to by the list ListCol of the prediction block colPU is posterior to the picture colPic of a different time in the display order, the inter-picture distance td has a negative value.

*td*=POC of picture colPic of different time−POC of reference picture referred to by list ListCol of prediction block colPU An inter-picture distance tb is calculated by subtracting the POC of the reference picture referred to by the list LX of the current coding/decoding target picture from the POC of the current coding/decoding target picture (S2602). In a case where the reference picture referred to by the list LX of the current coding/decoding target picture is prior to the current coding/decoding target picture in the display order, the inter-picture distance tb has a positive value. On the other hand, in a case where the reference picture referred to by the list LX of the current coding/decoding target picture is posterior to the current coding/decoding target picture in the display order, the inter-picture distance tb has a negative value.

*tb*=POC of current coding/decoding target picture−POC of reference picture referred to by reference list *LX* of current coding/decoding target picture Subsequently, the inter-picture distances td and tb are compared with each other (S2603). In a case where the inter-picture distances td and tb are the same (Yes in S2603), this scaling calculation process ends. On the other hand, in a case where the inter-picture distances td and tb are not the same (No in S2603), by multiplying the motion vector mvLXCol by a scaling factor tb/td using the following equation, the scaling calculation process is performed (S2604), whereby a scaled motion vector mvLXCol is acquired.

mv*LX*Col=*tb*/*td*\*mv*LX*Col

Figure 30:
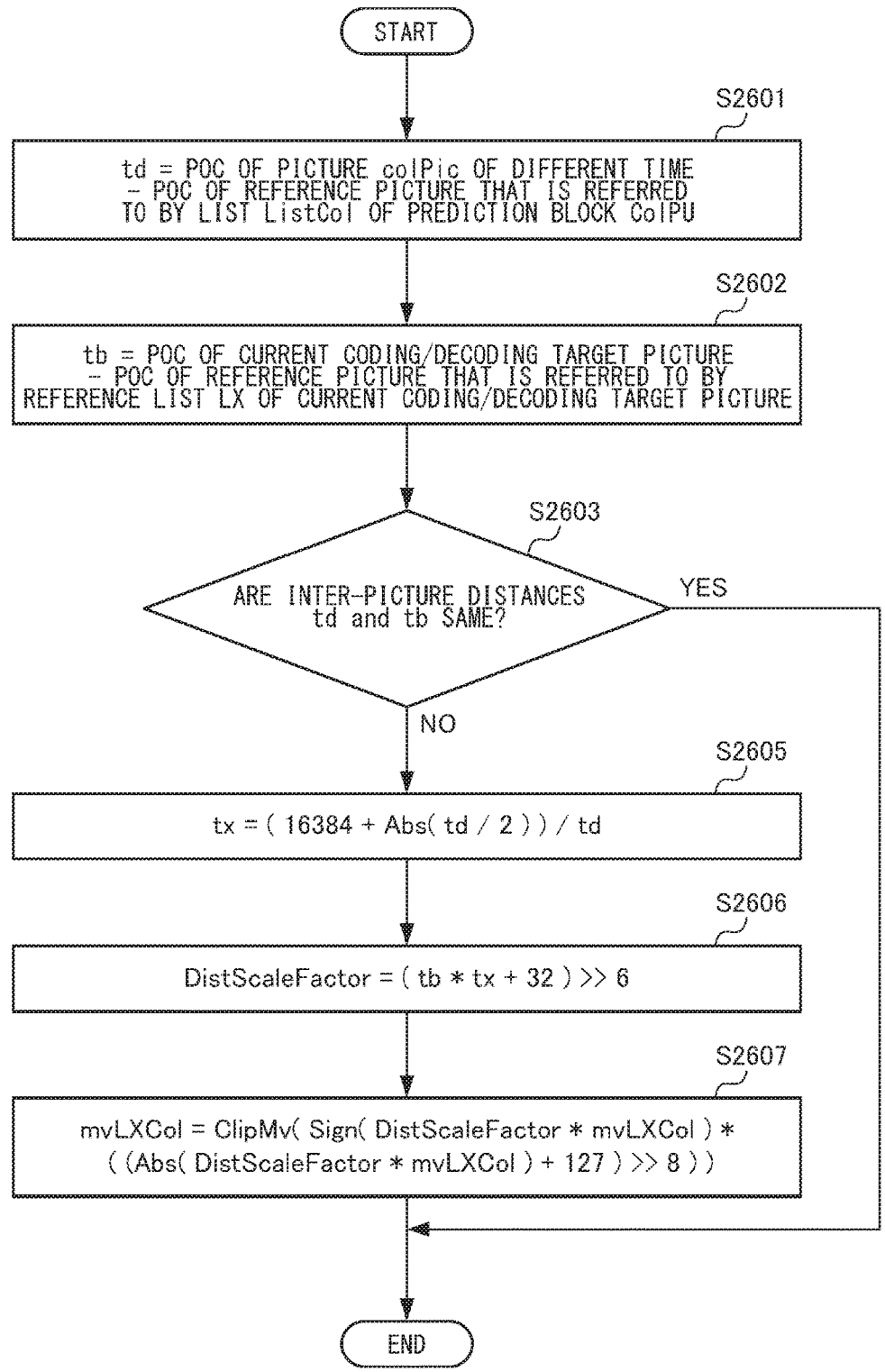
FIG. 30 is a flowchart that illustrates the sequence of the process of calculating the scaling of a motion vector through integer arithmetic.

In addition, an example of a case where the scaling calculation of step S2604 is performed as integer-precision calculation is illustrated in FIG. 30. The process of steps S2605 to S2607 illustrated in FIG. 30 corresponds to the process of step S2604 illustrated in FIG. 29.

First, similarly to the flowchart illustrated in FIG. 29, the inter-picture distance td and the inter-picture distance tb are calculated (S2601 and S2602).

Subsequently, the inter-picture distances td and tb are compared with each other (S2603). In a case where the inter-picture distances td and tb are the same (Yes in S2603), this scaling calculation process ends. On the other hand, in a case where the inter-picture distances td and tb are not the same (No in S2603), a variable tx is calculated by using the following equation (S2605).

*tx*=(16384+Abs(*td*/2))/*td*

Subsequently, a scaling factor DistScaleFactor is calculated using the following equation (S2606).

DistScaleFactor=(*tb*\**tx*+32)>>6

Subsequently, a scaled motion vector mvLXN is acquired by using the following equation (S2607).

mv*LXN*=ClipMv(Sign(DistScaleFactor\*mv*LXN*)\*((Abs(DistScaleFactor\*mv*LXN*)+12−7)>>8))

The sequence of adding a motion vector predictor candidate to the motion vector predictor list in S304 illustrated in FIG. 16 will be described in detail.

The motion vector predictor candidates mvLXCol, mvLXA, and mvLXB of each reference list LX that are calculated in S301, S302, and S303 illustrated in FIG. 16 are added to the motion vector predictor list mvpListLX of the reference list LX (S304). In the embodiment of the present invention, priority levels are assigned, and, by adding the motion vector predictor candidates mvLXCol, mvLXA, and mvLXB to the motion vector predictor list mvpListLX of the reference list LX in order of the priority level from the highest level to the lowest level, an element having a high priority level is arranged to the front side of the motion vector predictor list. When the number of elements within the motion vector predictor list is limited in S306 illustrated in FIG. 16, by excluding elements arranged on the rear side of the motion vector predictor list from the motion vector predictor list, elements having high priority levels are left.

The motion vector predictor list mvpListLX forms a list structure, is managed by an index i that represents the position inside the motion vector predictor list, and has a storage area storing the motion vector predictor candidate corresponding to the index i as an element being installed therein. The number of the index i starts from 0, and the motion vector predictor candidate is stored in the storage area of the motion vector predictor list mvpListLX. In the subsequent process, the motion vector predictor candidate that is an element of the index i added in the motion vector predictor list mvpListLX will be represented as mvpListLX[i].

Figure 31:
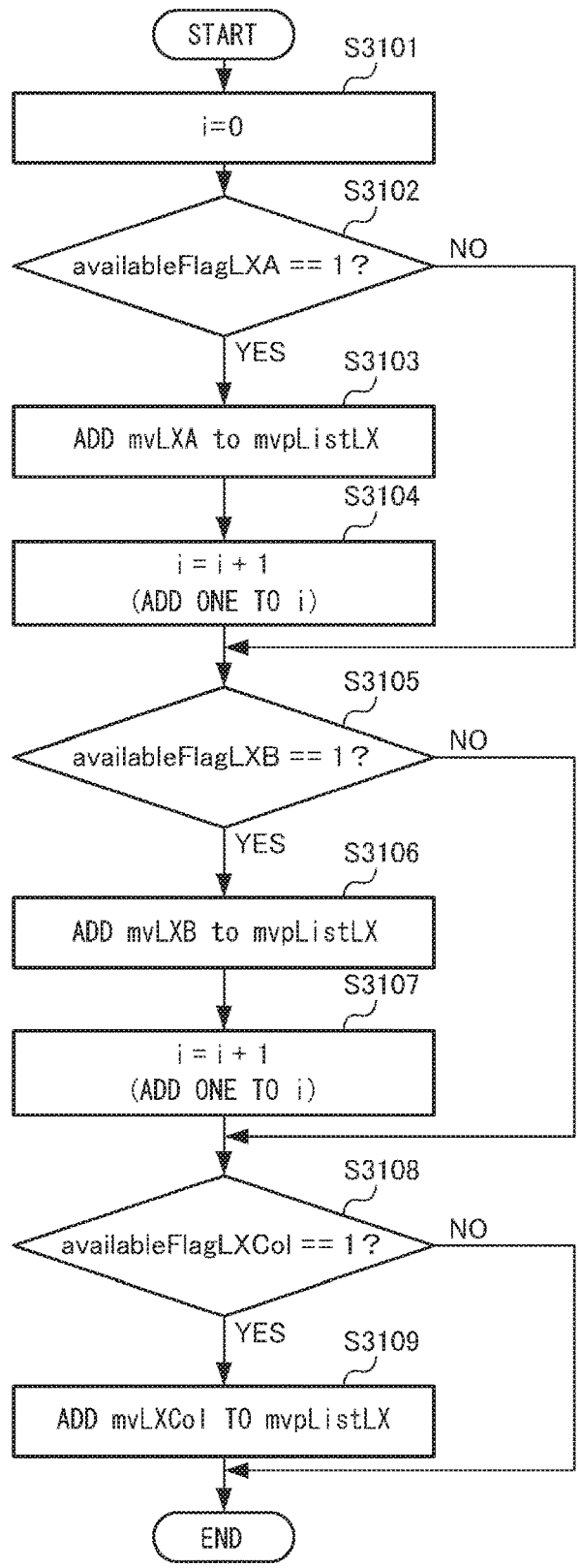
FIG. 31 is a flowchart that illustrates the sequence of the process of adding motion vector predictor candidates to a motion vector predictor candidate list.

Next, the method for the process of adding the motion vector predictor candidates mvLXCol, mvLXA, and mvLXB of the reference list LX to the motion vector predictor list mvpListLX of the reference list LX in S304 illustrated in FIG. 16 will be described in detail. FIG. 31 is a flowchart that illustrates the sequence of the process of adding motion vector predictor candidates in step S304 illustrated in FIG. 16.

First, the index i of the motion vector predictor list mvpListLX is set to "0" (S3101). In a case where the flag availableFlagLXCol is "1" (Yes in S3102), the motion vector predictor candidate mvLXCol of the reference list LX is added to a position corresponding to the index i of the motion vector predictor list mvpListLX (S3103), and the update is performed by adding "1" to the index i (S3104).

Subsequently, in a case where the flag availableFlagLXA is "1" (Yes in S3105), the motion vector predictor candidate mvLXA of the reference list LX is added to a position corresponding to the index i of the motion vector predictor list mvpListLXmvpListLX (S3106), and the update is performed by adding "1" to the index i (S3107).

Subsequently, in a case where the flag availableFlagLXB is "1" (Yes in S3108), the motion vector predictor candidate mvLXB of the reference list LX is added to a position corresponding to the index i of the motion vector predictor list mvpListLX (S3109), and the adding process to the motion vector predictor list ends.

In the adding sequence of the motion vector predictor list, after one time motion vector predictor candidate is added, two spatial motion vector predictor candidates are added. In other words, the priority level of the time motion vector predictor candidate is set to be higher than that of the spatial motion vector predictor candidate.

Figure 32:
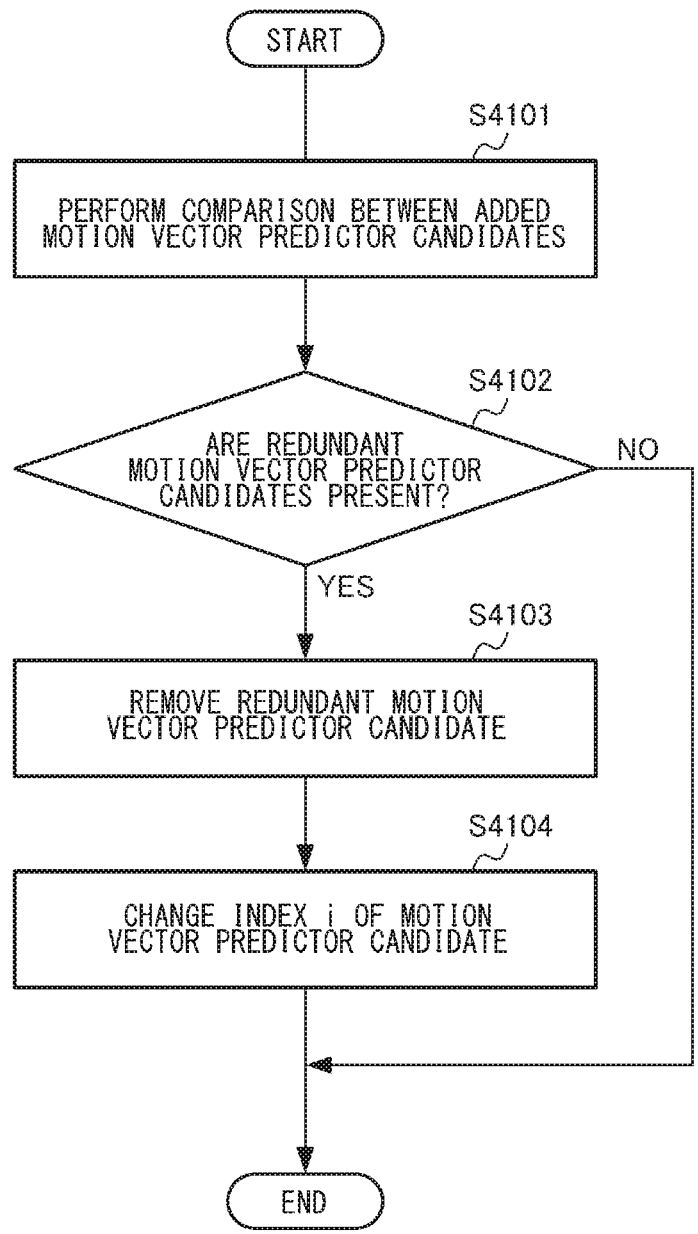
FIG. 32 is a flowchart that illustrates the sequence of the process of removing redundant motion vector predictor candidates from a motion vector predictor candidate list.

Next, the method of removing a redundant motion vector predictor candidate, which is included in the motion vector predictor list, in S305 illustrated in FIG. 16 will be described in detail. FIG. 32 is a flowchart that illustrates the sequence of the process of removing redundant motion vector predictor candidates in S305 illustrated in FIG. 16.

The motion vector predictor redundant candidate removing unit 123 or 223 compares spatially-predicted motion vector candidates added in the motion vector predictor list mvpListLX with each other (S4101). In a case where a plurality of motion vector candidates have the same value (Yes in S4102), the motion vector candidates are determined to be redundant motion vector candidates, and, in the descending order, in other words, the redundant motion vector candidates are removed except for a motion vector candidate having the smallest index i (S4103). Here, a comparison of the identity of motion vector candidates is not performed between the time motion vector predictor candidate and the spatial motion vector predictor candidate. The generation of the time motion vector predictor candidate and the generation of the spatial motion vector predictor candidate may be implemented thorough a parallel process due to a difference in the motion information memories thereof to be accessed and a difference in the processing amounts thereof. In a case where a motion vector comparison between the time motion vector predictor candidate and the spatial motion vector predictor candidate is made, a standby time occurs when the parallel process is performed. Accordingly, it is preferable that there is no dependency between the time motion vector predictor candidate and the spatial motion vector predictor candidate, and thus, in the present invention, the motion vector redundancy comparison between the time motion vector predictor candidate and the spatial motion vector predictor candidate is not performed. Here, in order to further decrease the processing amount, a determination of whether prediction vectors are identical may not be performed between the spatial motion vector predictor candidates. In addition, after the redundant motion vector candidates are removed, inside the motion vector predictor list mvpListLX, a storage area of the removed motion vector predictor candidate is vacant, and accordingly, index i=0 is used as the reference, and the inside of the motion vector predictor list is filled with the motion vector predictor candidates in order of the value of the index i in the ascending order (S4104). For example, in a case where a motion vector predictor candidate mvListLX[1] having an index i of "1" is removed, and the motion vector predictor candidates mvListLX [0] and mvListLX [2] having indexes of 0 and 2 are left, the motion vector predictor candidate mvListLX [2] having an index i of "2" is newly changed to a motion vector predictor candidate mvListLX [1] having an index i of "1". In addition, a motion vector predictor candidate mvListLX [2] having an index of "2" is set not to be present.

Figure 33:
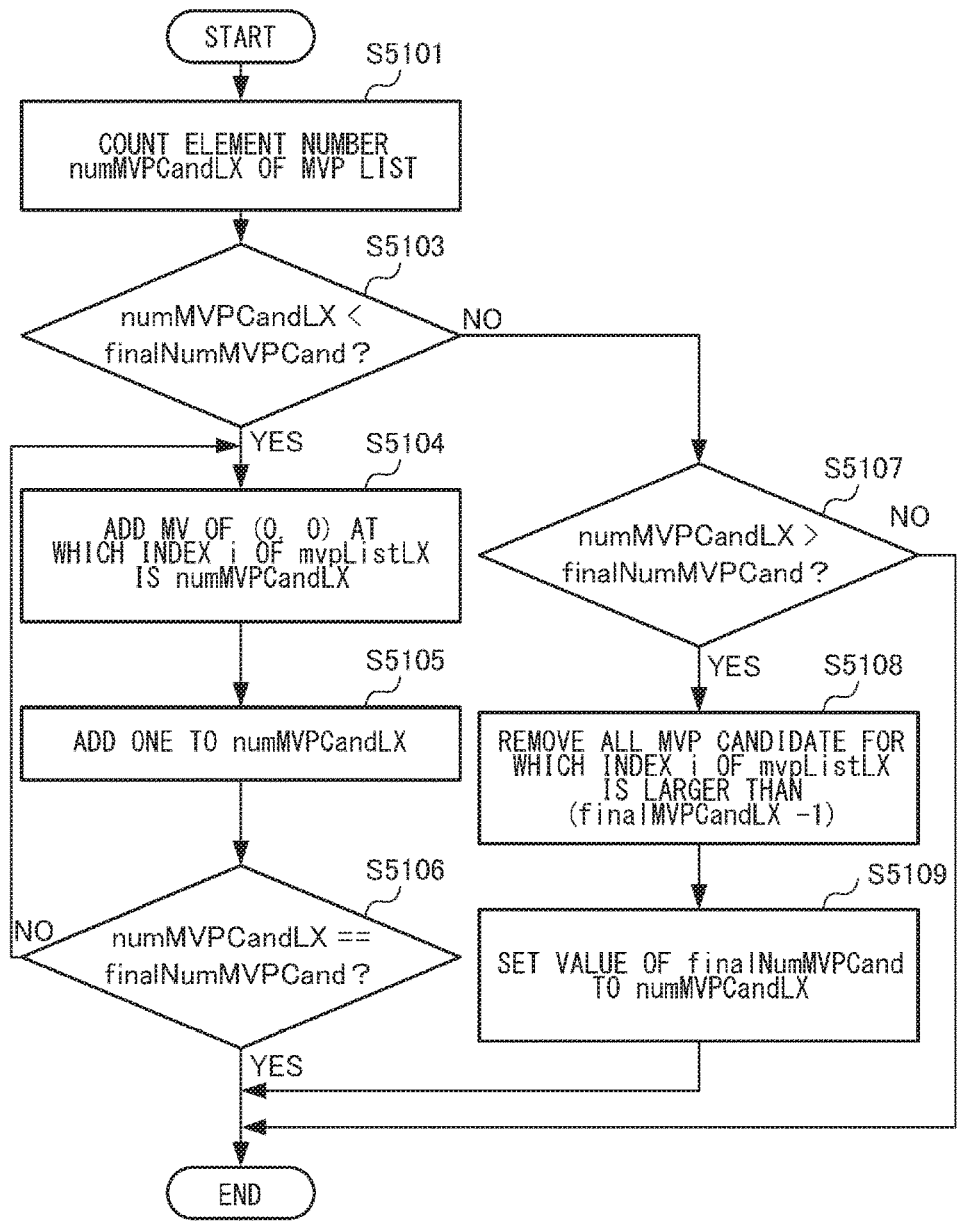
FIG. 33 is a flowchart that illustrates the sequence of the process of limiting the number of motion vector predictor candidates.
Figure 34A:
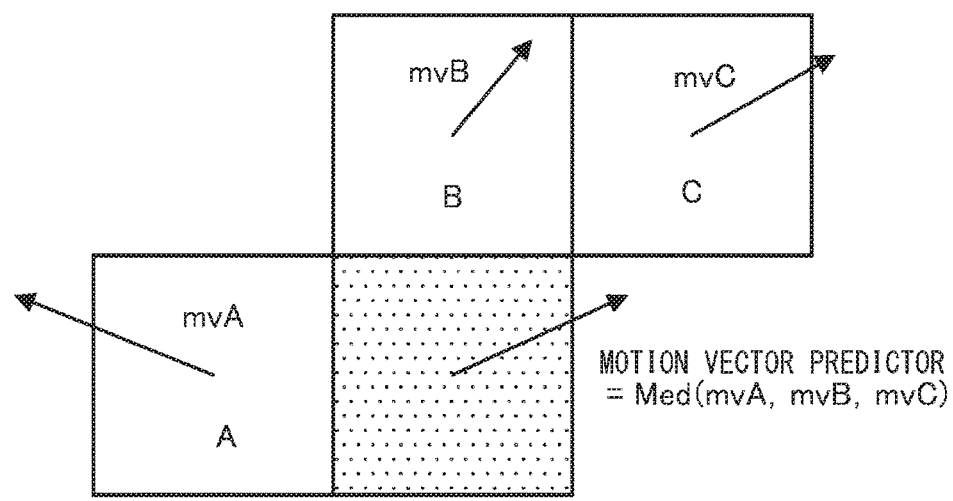
FIGS. 34A and 34B are diagrams that illustrate a conventional method of calculating a motion vector predictor.
Figure 34B:
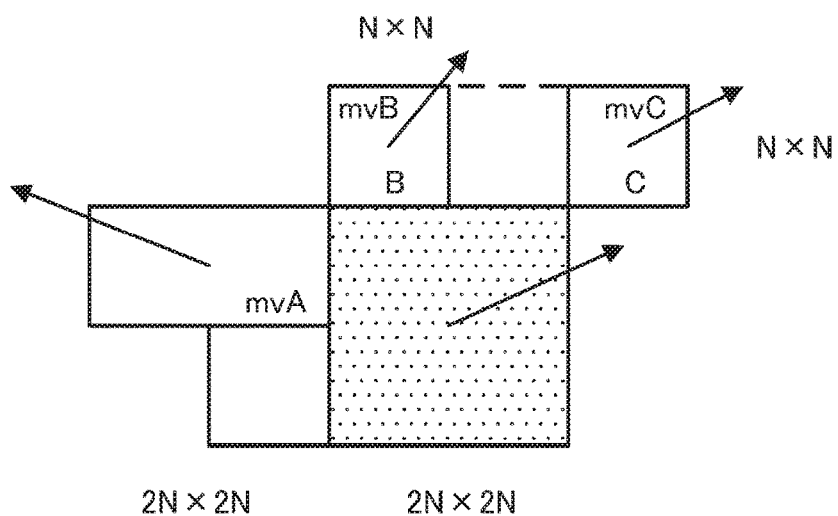

Next, the method of limiting the number of motion vector candidates included in the motion vector predictor list in S306 illustrated in FIG. 16 will be described in detail. FIG. 33 is a flowchart that illustrates the sequence of the process of limiting the number of motion vector predictor candidates in S306 illustrated in FIG. 16.

The motion vector predictor candidate number limiting unit 124 or 224 limits the number numMVPCandLX of the motion vector predictor candidates of the reference list LX added in the motion vector predictor list mvpListLX of the reference list LX to a set final number finalNumMVPCand of candidates.

First, the number of elements added in the motion vector predictor list mvpListLX of the reference list LX is counted, and the number of the elements is set as the number numMVPCandLX of motion vector predictor candidates of the reference list LX (S5101).

Subsequently, in a case where the number numMVPCandLX of motion vector predictor candidates of the reference list LX is smaller than the final number finalNumMVPCand of candidates (Yes in S5103), a motion vector having the value of (0, 0) is added to a position at which the index i of the motion vector predictor list mvpListLX of the reference list LX corresponds to numMVPCandLX (S5104), and one is added to numMVPCandLX (S5105). In a case where the number numMVPCandLX of motion vector predictor candidates and the final number finalNumMVPCand of candidates have the same value (Yes in S5105), this limiting process ends. On the other hand, in a case where the number numMVPCandLX of motion vector predictor candidates and the final number finalNumMVPCand of candidates do not have the same value (No in S5105), the process of steps S5104 and S5105 is repeated until the number numMVPCandLX of motion vector predictor candidates and the final number finalNumMVPCand of candidates have the same value. In other words, an MV having a value of (0, 0) is added until the number numMVPCandLX of motion vector predictor candidates of the reference list LX arrives at the final number finalNumMVPCand of candidates. As above, by adding MVs having the value of (0, 0) redundantly, even in a case where the index of a motion vector predictor has a certain value in the range that is equal to or larger than zero and is smaller than the final number finalNumMVPCand of candidates, the motion vector predictor can be determined.

On the other hand, in a case where the number numMVPCandLX of motion vector predictor candidates of the reference list LX is larger than the final number finalNumMVPCand of candidates (No in S5103 and Yes in S5107), all the motion vector predictor candidates each having the index i of the motion vector predictor list mvpListLX of the reference list LX to be larger than "finalNumMVPCand-1" are removed (S5108), the value of finalNumMVPCand is set as the number numMVPCandLX of motion vector predictor candidates of the reference list LX (S5109), and this limiting process ends.

In a case where the number numMVPCandLX of motion vector predictor candidates of the reference list LX is the same as the final number finalNumMVPCand of candidates (No in S5103 and No in S5107), this limiting process ends without performing the limiting process.

Embodiment 2

In a second embodiment, on the decoding side, a motion vector predictor is specified without constructing a motion vector predictor list. In a case where the motion vector predictor list is constructed, while it is necessary to perform scaling calculation for each of the spatial candidate and the time candidate, in the second embodiment, by specifying a motion vector predictor without generating a motion vector predictor list, the number of times of scaling calculation can be suppressed. A coding device according to the embodiment and a decoding device according to the embodiment other than that are the same as those of Embodiment 1. In addition, the same decoding result of the motion vector predictor as that of the first embodiment can be acquired.

Figure 22:
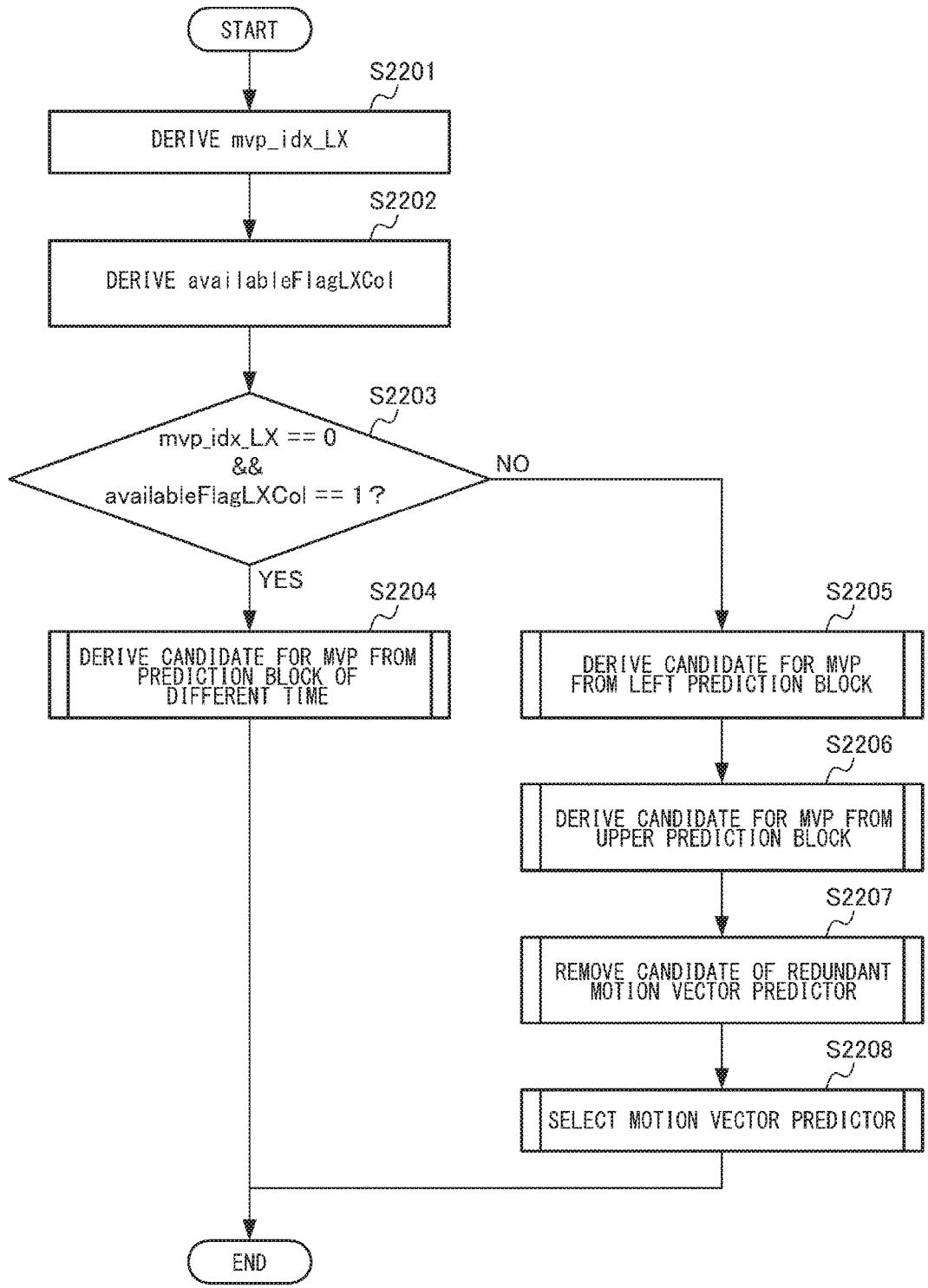
FIG. 22 is a flowchart that illustrates the sequence of the process of deriving a motion vector predictor on the decoding side according to a second embodiment.

FIG. 22 is a flowchart that illustrates deriving of a motion vector predictor on the decoding side according to Embodiment 2.

First, mvp_idx_LX that is an index of the motion vector predictor candidate and availableFlagLXCol that represents whether or not a time candidate can be used are derived (S2201 and S2202). The derivation order of mvp_idx_LX and availableFlagLXCol is arbitrary, and thus the order of S2201 and S2202 may be interchanged. Next, it is determined whether the values of mvp_idx_LX and availableFlagLXCol that have been derived satisfy mvp_idx_LX==0 and availableFlagLXCol==1 (S2203). Since the motion vector predictors are added (generated) in order of mvLXCol, mvLXA, and mvLXB, in a case where mvp_idx_LX==0 and availableFlagLXCol==1 (Yes in S2203), the motion vector predictor candidate can be specified as a time motion vector predictor candidate, and accordingly, a motion vector is derived from a prediction block of a different time, and the derived motion vector is set as the motion vector predictor (S2204). On the other hand, in a case where mvp_idx_LX==0 and availableFlagLXCol==1 are not satisfied (No in S2203), in other words, in a case where mvp_idx_LX!=0 or availableFlagLXCol==0, the motion vector predictor candidate can be specified as a spatial motion vector predictor candidate, and accordingly, a motion vector is derived from the spatial prediction block. In the present invention, the prediction vector candidates are added in order of mvLXCol, mvLXA, andmvLXB, and the priority level of the time motion vector predictor candidate is set to be the highest. Accordingly, in a case where a time motion vector predictor candidate is present, mvp_idx_LX==0 is necessarily satisfied, and, in the case of mvp_idx_LX!=0, a space motion vector predictor candidate can be necessarily specified. In addition, in the case of availableFlagLXCol==0, it represents that the time motion vector predictor candidate is not present, and accordingly, the motion vector predictor can be specified as a spatial motion vector predictor candidate. Therefore, in accordance with the values of mvp_idx_LX and availableFlagLXCol, it can be determined whether the motion vector predictor is the time motion vector predictor candidate or the spatial motion vector predictor candidate.

In a case where the motion vector predictor is determined to be a spatial motion vector predictor candidate (No in S2203), similarly to S303 according to first embodiment illustrated in FIG. 16, a prediction vector candidate is derived from the left prediction block (S2205), and a prediction vector candidate is derived from the upper prediction block (S2206). Subsequently, it is determined whether or not the prediction vector candidate derived from the left prediction block and the prediction vector candidate derived from the upper prediction block are the same motion vector, and, in a case where the motion vectors are the same, one thereof is removed (S2207). Finally, a motion vector predictor is selected based on the value of mvp_idx_LX (S2208). Here, in order to further reduce the process amount, the spatial motion vector predictor candidate may be specified based on only availableFlagLXA without determining the identity of prediction vectors between the spatial motion vector predictor candidates.

FIG. 23 illustrates the pattern of a motion vector predictor selection (S2208 illustrated in FIG. 22) of a case where a motion vector predictor is determined to be a spatial motion vector predictor candidate (No in S2203 illustrated in FIG. 22). In a case where mvp_idx_LX==0 and availableFlagLXCol==0, the first spatial candidate is selected. In a case where mvp_idx_LX==1 and availableFlagLXCol==1, the first spatial candidate is selected. In a case where mvp_idx_LX==1 and availableFlagLXCol==0, the second spatial candidate is selected. In addition, in a case where a spatial motion vector predictor candidate is not present in each condition, the motion vector predictor is set to (0, 0).

As in the second embodiment, by specifying a motion vector predictor without constructing a motion vector predictor list, the same prediction vector as that of a case where decoding is performed in accordance with the first embodiment is acquired, and, additionally, there are the following advantages.

Based on the values of mvp_idx_LX and availableFlagLXCol, it can be determined whether the motion vector predictor is a time motion vector predictor candidate or a spatial motion vector predictor candidate. Accordingly, only one of the prediction vector deriving process of the time motion vector predictor candidate and the prediction vector deriving process of the spatial motion vector predictor candidate may be performed. Therefore, the decoding processing amount is about a half of a case where both the time motion vector predictor candidate and the spatial motion vector predictor candidate are derived. Accordingly, the execution speed is raised from the viewpoint of the software, and the power consumption can be reduced from the viewpoint of the hardware.

In addition, in a case where the motion vector predictor list is constructed, in a case where the scaling calculation of the motion vector predictor is necessary for each of the time motion vector predictor candidate and the spatial motion vector predictor candidate, in the first embodiment, it is necessary to perform the scaling calculation once for deriving the time motion vector predictor candidate and once for deriving the spatial motion vector predictor candidate once. However, in the second embodiment, one of the prediction vector deriving process of the time motion vector predictor candidate and the prediction vector deriving process of the spatial motion vector predictor candidate is selected and is performed, and accordingly, the motion vector predictor can be derived by performing the scaling calculation once on the decoding side. Accordingly, particularly, a scaling circuit required to perform division using hardware can be commonly used for deriving the time motion vector predictor candidate and for deriving spatial motion vector predictor candidate, whereby the circuit scale can be reduced.

In addition, since the decoding result according to the first embodiment of the present invention and the decoding result according to the second embodiment are the same, the architecture may be selected on the decoding side. In other words, in a case where the same configuration is desired on the coding side and the decoding side as in a system such as a camcorder in which the coding device and the decoding device are integrated, as in the first embodiment, the motion vector predictor may be specified by constructing the list of motion vector predictors. On the other hand, in a case where only the reduction of the processing amount on the decoding side is of significance, as in the second embodiment, after a time candidate or a spatial candidate is specified without constructing a list of motion vector predictors, the motion vector predictor may be specified by operating only one of the deriving of the spatial candidate and the deriving of the time candidate.

The points of the embodiment bringing such advantages of the present invention are the following two points.

1. The time motion vector predictor candidate (one candidate) is set to have a priority level higher than that of the spatial motion vector predictor candidates (two candidates).
2. The redundant candidate removing process of a case where the motion vector predictors are the same is not performed between the time motion vector predictor candidates and the spatial motion vector predictor candidates (the redundant candidate removing process is allowed only between the spatial motion vector predictor candidates).

In other words, the priority level of the time motion vector predictor candidate capable of uniquely determining whether or not the motion vector predictor candidate is present based on the time motion vector predictor candidate usability flag availableFlagLXCol used for a single motion vector predictor candidate is set to be high, the priority level of the spatial motion vector predictor that has a plurality of motion vector predictor candidates and has the number of motion vector predictor candidates to be changeable is set to be low, and the motion vector predictor is added to the list of the motion vector predictors, which is a distinctive feature. Among the spatial motion vector predictor candidates, redundant candidates are removed based on the identity determination, and accordingly, the priority level thereof is set to be low on the motion vector predictor candidate list so as to be added at a low rank. On the other hand, since the identity determination is not made between the time motion vector predictor candidate and the spatial motion vector predictor candidate, the time motion vector predictor candidate is configured to have a high priority level on the motion vector predictor candidate list so as to be added at a high rank. Accordingly, the spatial motion vector predictor and the time motion vector predictor can be separated on the list, and the degree of separation between the spatial direction and the time direction is raised in the motion vector prediction, and the efficiency of the process is improved, and the circuit scale is reduced.

The bitstream of a moving picture output by the moving picture coding device according to the embodiment described above has a specific data format so as to be decoded in accordance with the coding method used in the embodiment, and accordingly, the moving picture decoding device corresponding to the moving picture coding device can decode the bitstream of the specific data format.

In a case where a wired or wireless network is used for exchanging a bitstream between the moving picture coding device and the moving picture decoding device, the bitstream may be converted into a data format that is appropriate for the transmission form in a communication path and be transmitted. In such a case, a moving picture transmission device is disposed, which converts a bitstream output by the moving picture coding device into coding data of a data format that is appropriate to the transmission form in the communication path, and a moving picture reception device is disposed, which receives the coding data from the network, restores the bitstream from the coding data, and supplies the restored bitstream to the moving picture decoding device.

The moving picture transmission device includes: a memory that buffers a bitstream output by the moving picture coding device; a packet processing unit that packetizes the bitstream; and a transmission unit that transmits packetized coding data through a network. The moving picture reception device includes: a reception unit that receives packetized coding data through a network; a memory that buffers the received coding data; and a packet processing unit that generates a bitstream by performing a packet process of coding data and supplies the generated bitstream to the moving picture decoding device.

The processes relating to the coding and decoding described above may be realized not only as a transmission/storage/reception device using hardware but also by firmware stored in a read only memory (ROM), a flash memory, or the like or software of a computer or the like. The firmware or the software program may be provided with being recorded in a recording medium that can be read by a computer or the like, may be provided from a server through a wired or wireless network, or may be provided as data broadcasting of satellite digital broadcasting.

As above, the present invention has been described based on the embodiments. However, such embodiments are merely examples, and it is understood to a person skilled in the art that various modifications may be made in each constituent element thereof or a combination of each process sequence, and such modified examples also belong to the scope of the present invention.

[Item 1]

A moving picture coding device that codes a moving picture using motion compensation in units of blocks acquired by dividing each picture of the moving picture, the moving picture coding device comprising:

a motion vector predictor candidate generating unit configured to derive a plurality of motion vector predictor candidates by making a prediction based on a motion vector of one of coded blocks that are neighboring to a coding target block in space or time and construct a motion vector predictor candidate list;

a motion vector predictor redundant candidate removing unit configured to remove the motion vector predictor candidates having identity among the motion vector predictor candidates predicted based on a coded block that is neighboring in space from the motion vector predictor candidate list with at least one being left;

a motion vector predictor selecting unit configured to select a motion vector predictor from the motion vector predictor candidate list;

a differential vector calculating unit configured to calculate a motion vector difference based on a difference between the selected motion vector predictor and the motion vector used for motion compensation; and a coding unit configured to code information representing the selected motion vector predictor together with the motion vector difference.

[Item 2]

A moving picture coding device that codes a moving picture using motion compensation in units of blocks acquired by dividing each picture of the moving picture, the moving picture coding device comprising:

a motion vector predictor candidate generating unit configured to derive a plurality of motion vector predictor candidates by making a prediction based on a motion vector of one of coded blocks that are neighboring to a coding target block in space or time and construct a motion vector predictor candidate list;

a motion vector predictor redundant candidate removing unit configured to remove the motion vector predictor candidates having a same motion vector value among the motion vector predictor candidates predicted based on a coded block that is neighboring in space from the motion vector predictor candidate list with one being excluded;

a motion vector predictor selecting unit configured to select a motion vector predictor from the motion vector predictor candidate list;

a differential vector calculating unit configured to calculate a motion vector difference based on a difference between the selected motion vector predictor and the motion vector used for motion compensation; and a coding unit configured to code information representing the selected motion vector predictor together with the motion vector difference.

[Item 3]

The moving picture coding device according to item 1 or 2, wherein the motion vector predictor candidate generating unit adds a motion vector predictor candidate predicted based on a coded block that is neighboring in time and a motion vector predictor candidate predicted based on a coded block that is neighboring in space to the motion vector predictor candidate list in the described order.

[Item 4]

A moving picture coding method for coding a moving picture using motion compensation in units of blocks acquired by dividing each picture of the moving picture, the moving picture coding method comprising:

deriving a plurality of motion vector predictor candidates by making a prediction based on a motion vector of one of coded blocks that are neighboring to a coding target block in space or time and constructing a motion vector predictor candidate list;

removing the motion vector predictor candidates having identity among the motion vector predictor candidates predicted based on a coded block that is neighboring in space from the motion vector predictor candidate list with at least one being left;

selecting a motion vector predictor from the motion vector predictor candidate list;

calculating a motion vector difference based on a difference between the selected motion vector predictor and the motion vector used for motion compensation; and coding information representing the selected motion vector predictor together with the motion vector difference.

[Item 5]

A moving picture coding method for coding a moving picture using motion compensation in units of blocks acquired by dividing each picture of the moving picture, the moving picture coding method comprising:

deriving a plurality of motion vector predictor candidates by making a prediction based on a motion vector of one of coded blocks that are neighboring to a coding target block in space or time and constructing a motion vector predictor candidate list;

removing the motion vector predictor candidates having a same motion vector value among the motion vector predictor candidates predicted based on a coded block that is neighboring in space from the motion vector predictor candidate list with one being excluded;

selecting a motion vector predictor from the motion vector predictor candidate list;

calculating a motion vector difference based on a difference between the selected motion vector predictor and the motion vector used for motion compensation; and coding information representing the selected motion vector predictor together with the motion vector difference.

[Item 6]

A moving picture coding program for coding a moving picture using motion compensation in units of blocks acquired by dividing each picture of the moving picture, the moving picture coding program causes a computer to perform:

deriving a plurality of motion vector predictor candidates by making a prediction based on a motion vector of one of coded blocks that are neighboring to a coding target block in space or time and constructing a motion vector predictor candidate list;

removing the motion vector predictor candidates having identity among the motion vector predictor candidates predicted based on a coded block that is neighboring in space from the motion vector predictor candidate list with at least one being left;

selecting a motion vector predictor from the motion vector predictor candidate list;

calculating a motion vector difference based on a difference between the selected motion vector predictor and the motion vector used for motion compensation; and coding information representing the selected motion vector predictor together with the motion vector difference.

[Item 7]

A moving picture coding program for coding a moving picture using motion compensation in units of blocks acquired by dividing each picture of the moving picture, the moving picture coding program causes a computer to perform:

deriving a plurality of motion vector predictor candidates by making a prediction based on a motion vector of one of coded blocks that are neighboring to a coding target block in space or time and constructing a motion vector predictor candidate list;

removing the motion vector predictor candidates having a same motion vector value among the motion vector predictor candidates predicted based on a coded block that is neighboring in space from the motion vector predictor candidate list with one being excluded;

selecting a motion vector predictor from the motion vector predictor candidate list;

calculating a motion vector difference based on a difference between the selected motion vector predictor and the motion vector used for motion compensation; and coding information representing the selected motion vector predictor together with the motion vector difference.

[Item 8]

A moving picture decoding device that decodes a bitstream in which a moving picture is coded using motion compensation in units of blocks acquired by dividing each picture of the moving picture, the moving picture decoding device comprising:

a decoding unit configured to decode information representing a motion vector predictor to be selected together with a motion vector difference;

a motion vector predictor candidate generating unit configured to derive a plurality of motion vector predictor candidates by making a prediction based on a motion vector of one of decoded blocks that are neighboring to a decoding target block in space or time and construct a motion vector predictor candidate list;

a motion vector predictor redundant candidate removing unit configured to remove the motion vector predictor candidates having identity among the motion vector predictor candidates predicted based on a decoded block that is neighboring in space from the motion vector predictor candidate list with at least one being left;

a motion vector predictor selecting unit configured to select a motion vector predictor from the motion vector predictor candidate list based on information representing the decoded motion vector predictor to be selected; and a motion vector calculating unit configured to calculate a motion vector used for motion compensation by adding the selected motion vector predictor and the motion vector difference together.

[Item 9]

A moving picture decoding device that decodes a bitstream in which a moving picture is coded using motion compensation in units of blocks acquired by dividing each picture of the moving picture, the moving picture decoding device comprising:

a decoding unit configured to decode information representing a motion vector predictor to be selected together with a motion vector difference;

a motion vector predictor candidate generating unit configured to derive a plurality of motion vector predictor candidates by making a prediction based on a motion vector of one of decoded blocks that are neighboring to a decoding target block in space or time and construct a motion vector predictor candidate list;

a motion vector predictor redundant candidate removing unit configured to remove the motion vector predictor candidates having a same motion vector value among the motion vector predictor candidates predicted based on a decoded block that is neighboring in space from the motion vector predictor candidate list with one being excluded;

a motion vector predictor selecting unit configured to select a motion vector predictor from the motion vector predictor candidate list based on information representing the decoded motion vector predictor to be selected; and a motion vector calculating unit configured to calculate a motion vector used for motion compensation by adding the selected motion vector predictor and the motion vector difference together.

[Item 10]

The moving picture decoding device according to item 8 or 9, wherein the motion vector predictor candidate generating unit adds a motion vector predictor candidate predicted based on a coded block that is neighboring in time and a motion vector predictor candidate predicted based on a coded block that is neighboring in space to the motion vector predictor candidate list in the described order.

[Item 11]

A moving picture decoding method for decoding a bitstream in which a moving picture is coded using motion compensation in units of blocks acquired by dividing each picture of the moving picture, the moving picture decoding method comprising:

decoding information representing a motion vector predictor to be selected together with a motion vector difference;

deriving a plurality of motion vector predictor candidates by making a prediction based on a motion vector of one of decoded blocks that are neighboring to a decoding target block in space or time and constructing a motion vector predictor candidate list;

removing the motion vector predictor candidates having identity among the motion vector predictor candidates predicted based on a decoded block that is neighboring in space from the motion vector predictor candidate list with at least one being left;

selecting a motion vector predictor from the motion vector predictor candidate list based on information representing the decoded motion vector predictor to be selected; and calculating a motion vector used for motion compensation by adding the selected motion vector predictor and the motion vector difference together.

[Item 12]

A moving picture decoding method for decoding a bitstream in which a moving picture is coded using motion compensation in units of blocks acquired by dividing each picture of the moving picture, the moving picture decoding method comprising:

decoding information representing a motion vector predictor to be selected together with a motion vector difference;

deriving a plurality of motion vector predictor candidates by making a prediction based on a motion vector of one of decoded blocks that are neighboring to a decoding target block in space or time and constructing a motion vector predictor candidate list;

removing the motion vector predictor candidates having a same motion vector value among the motion vector predictor candidates predicted based on a decoded block that is neighboring in space from the motion vector predictor candidate list with one being excluded;

selecting a motion vector predictor from the motion vector predictor candidate list based on information representing the decoded motion vector predictor to be selected; and calculating a motion vector used for motion compensation by adding the selected motion vector predictor and the motion vector difference together.

[Item 13]

A moving picture decoding program for decoding a bitstream in which a moving picture is coded using motion compensation in units of blocks acquired by dividing each picture of the moving picture, the moving picture decoding program causes a computer to perform:

decoding information representing a motion vector predictor to be selected together with a motion vector difference;

deriving a plurality of motion vector predictor candidates by making a prediction based on a motion vector of one of decoded blocks that are neighboring to a decoding target block in space or time and constructing a motion vector predictor candidate list;

removing the motion vector predictor candidates having identity among the motion vector predictor candidates predicted based on a decoded block that is neighboring in space from the motion vector predictor candidate list with at least one being left;

selecting a motion vector predictor from the motion vector predictor candidate list based on information representing the decoded motion vector predictor to be selected; and calculating a motion vector used for motion compensation by adding the selected motion vector predictor and the motion vector difference together.

[Item 14]

A moving picture decoding program for decoding a bitstream in which a moving picture is coded using motion compensation in units of blocks acquired by dividing each picture of the moving picture, the moving picture decoding program causes a computer to perform:

decoding information representing a motion vector predictor to be selected together with a motion vector difference;

deriving a plurality of motion vector predictor candidates by making a prediction based on a motion vector of one of decoded blocks that are neighboring to a decoding target block in space or time and constructing a motion vector predictor candidate list;

removing the motion vector predictor candidates having a same motion vector value among the motion vector predictor candidates predicted based on a decoded block that is neighboring in space from the motion vector predictor candidate list with one being excluded;

selecting a motion vector predictor from the motion vector predictor candidate list based on information representing the decoded motion vector predictor to be selected; and calculating a motion vector used for motion compensation by adding the selected motion vector predictor and the motion vector difference together.

What is claimed is:

1. A moving picture coding device that codes a moving picture using motion compensation in units of blocks acquired by dividing each picture of the moving picture, the moving picture coding device comprising:

a motion vector predictor candidate generating unit configured to derive a plurality of motion vector predictor candidates by making a prediction based on a motion vector of one of coded blocks that are neighboring to a coding target block in space or time and construct a motion vector predictor candidate list;

a motion vector predictor redundant candidate removing unit configured to compare whether values of vectors are the same among motion vector predictor candidates predicted from a coded block neighboring in space and remove the motion vector predictor candidates having the same values of vectors from the motion vector predictor candidate list with at least one being left without comparing whether or not a value of vector of a motion vector predictor predicted from a coded block that is neighboring in space and a value of vector of a motion vector predictor predicted from a coded block neighboring in time are the same;

a motion vector predictor candidate adding unit configured to repeatedly add the motion vector predictor candidate to the motion vector predictor candidate list until the number of motion vector predictor candidates reaches a predefined number if the number of the motion vector predictor candidates in the motion vector predictor candidate list is smaller than the predefined number, whereby the number of the motion vector predictor candidates in the motion vector predictor candidate list reaches the predefined number;

a motion vector predictor selecting unit configured to select a motion vector predictor from the motion vector predictor candidate list;

a differential vector calculating unit configured to calculate a motion vector difference based on a difference between the selected motion vector predictor and the motion vector used for motion compensation; and a coding unit configured to code information representing the selected motion vector predictor from the motion vector predictor candidate list having the predefined number of motion vector predictor candidates, together with the motion vector difference, wherein the motion vector predictor candidate adding unit repeatedly adds more than one (0,0) motion vectors allowing duplication as the motion vector predictor candidates.

2. A moving picture coding method that codes a moving picture using motion compensation in units of blocks acquired by dividing each picture of the moving picture, the moving picture coding method comprising:

deriving a plurality of motion vector predictor candidates by making a prediction based on a motion vector of one of coded blocks that are neighboring to a coding target block in space or time and constructing a motion vector predictor candidate list;

comparing whether values of vectors are the same among motion vector predictor candidates predicted from a coded block neighboring in space and removing the motion vector predictor candidates having the same values of vectors from the motion vector predictor candidate list with at least one being left without comparing whether or not a value of vector of a motion vector predictor predicted from a coded block that is neighboring in space and a value of vector of a motion vector predictor predicted from a coded block neighboring in time are the same;

repeatedly adding the motion vector predictor candidate to the motion vector predictor candidate list until the number of motion vector predictor candidates reaches a predefined number if the number of the motion vector predictor candidates in the motion vector predictor candidate list is smaller than the predefined number, whereby the number of the motion vector predictor candidates in the motion vector predictor candidate list reaches the predefined number;

selecting a motion vector predictor from the motion vector predictor candidate list;

calculating a motion vector difference based on a difference between the selected motion vector predictor and the motion vector used for motion compensation; and coding information representing the selected motion vector predictor from the motion vector predictor candidate list having the predefined number of motion vector predictor candidates, together with the motion vector difference, wherein repeatedly adding the motion vector predictor candidate to the motion vector predictor candidate list repeatedly adds more than one (0,0) motion vectors allowing duplication as the motion vector predictor candidates.

3. A non-transitory computer-readable medium having a moving picture coding program that codes a moving picture using motion compensation in units of blocks acquired by dividing each picture of the moving picture, the moving picture coding program causes the computer to perform:

deriving a plurality of motion vector predictor candidates by making a prediction based on a motion vector of one of coded blocks that are neighboring to a coding target block in space or time and constructing a motion vector predictor candidate list;

comparing whether values of vectors are the same among motion vector predictor candidates predicted from a coded block neighboring in space and removing the motion vector predictor candidates having the same values of vectors from the motion vector predictor candidate list with at least one being left without comparing whether or not a value of vector of a motion vector predictor predicted from a coded block that is neighboring in space and a value of vector of a motion vector predictor predicted from a coded block neighboring in time are the same;

repeatedly adding the motion vector predictor candidate to the motion vector predictor candidate list until the number of motion vector predictor candidates reaches a predefined number if the number of the motion vector predictor candidates in the motion vector predictor candidate list is smaller than the predefined number, whereby the number of the motion vector predictor candidates in the motion vector predictor candidate list reaches the predefined number;

selecting a motion vector predictor from the motion vector predictor candidate list;

calculating a motion vector difference based on a difference between the selected motion vector predictor and the motion vector used for motion compensation; and coding information representing the selected motion vector predictor from the motion vector predictor candidate list having the predefined number of motion vector predictor candidates, together with the motion vector difference, wherein repeatedly adding the motion vector predictor candidate to the motion vector predictor candidate list repeatedly adds more than one (0,0) motion vectors allowing duplication as the motion vector predictor candidates.

* * * * *